United States Patent

Ram et al.

[11] Patent Number: 5,991,389
[45] Date of Patent: Nov. 23, 1999

[54] PROGRAMMABLE SERVICE ARCHITECTURE FOR CALL CONTROL PROCESSING

[75] Inventors: Geetha R. Ram, Plano; Kent W. Smith, Allen; Keith W. Landau, Plano; Roger L. Thompson, McKinney, all of Tex.

[73] Assignee: Northern Telecom Limited, Quebec, Canada

[21] Appl. No.: 08/866,229

[22] Filed: May 30, 1997

Related U.S. Application Data

[60] Provisional application No. 60/020,713, Jun. 13, 1996.

[51] Int. Cl.$^6$ .................................................. H04M 3/42
[52] U.S. Cl. .......................... 379/230; 379/207; 379/242
[58] Field of Search .................................. 379/207, 219, 379/220, 221, 229, 230, 242, 243, 244, 245, 88.22

[56] References Cited

U.S. PATENT DOCUMENTS

| | | | |
|---|---|---|---|
| 4,878,240 | 10/1989 | Lin et al. | 379/88.22 |
| 5,418,844 | 5/1995 | Morrisey et al. | 379/207 |
| 5,426,694 | 6/1995 | Hebert | 379/242 |
| 5,517,563 | 5/1996 | Norell | 379/230 |
| 5,541,917 | 7/1996 | Farris | 379/230 |
| 5,546,453 | 8/1996 | Hebert | 379/242 |
| 5,553,127 | 9/1996 | Norell | 379/207 |
| 5,586,177 | 12/1996 | Farris et al. | 379/207 |
| 5,590,188 | 12/1996 | Crockett | 379/207 |
| 5,602,909 | 2/1997 | Carkner et al. | 379/207 |
| 5,610,977 | 3/1997 | Williams et al. | 379/207 |
| 5,822,422 | 10/1998 | Daase et al. | 379/242 |

FOREIGN PATENT DOCUMENTS

| | | |
|---|---|---|
| 0505092 | 9/1992 | European Pat. Off. . |
| 0620693 | 10/1994 | European Pat. Off. . |
| 2240905 | 8/1991 | United Kingdom . |
| 95/23483 | 8/1995 | United Kingdom . |
| 93/20639 | 10/1993 | WIPO . |
| 94/06252 | 3/1994 | WIPO . |
| 95/32577 | 11/1995 | WIPO . |

OTHER PUBLICATIONS

Yang et al, "The Design and Implementation of a Service Logic Execution Environment Platform," Globecom 93, vol. 3, Nov. 29, 1993, pp. 1911–1917.

*Primary Examiner*—Scott Wolinsky
*Attorney, Agent, or Firm*—Carr & Storm, L.L.P.

[57] ABSTRACT

An apparatus and method for providing a telephone operating company with the ability to rapidly deploy advanced services into a public switched telephone network includes a programmable switch matrix, a service control unit (SCU), and a media resource unit (MRU). The call processing of a call (associated with one or more ports on the programmable switch matrix) is controlled externally by the SCU when particular triggering criteria is met (i.e., the call requires or desires control by the SCU). Call control processing is achieved through a high-speed communications link between the programmable switch matrix and the SCU using a communications protocol defining a comprehensive set of primitives (instructions) for call manipulation and control at the programmable switch matrix. The SCU executes different service application software programs that operate within the SCU for different types of service calls that are under the control of the SCU. The MRU interconnects between the SCU and the programmable switch matrix to provide voice processing and message capabilities for connection to a service call via the programmable switch matrix.

27 Claims, 17 Drawing Sheets

CALL DISCRIMINATION MANAGER (CDM) SOFTWARE ARCHITECTURE

| ACTION | SCU ->> SWITCH MATRIX | SWITCH MATRIX ->>SCU | STATE TRANSITIONS FOR PARTY A | STATE TRANSITIONS FOR PARTY B |
|---|---|---|---|---|
| THE CALL TRIGGERS. THE SCU IS NOTIFIED OF A NEW CALL EVENT. | NEW CALL ACCEPTED (A) | NEW CALL | IDLE HELD → ANSWERED HELD | |
| SCU ASKS SWITCH MATRIX TO COLLECT DIGITS ON PARTY A | PLAY PPCD COLLECT DIGITS AND REPORT (A) | INSTRUCTION COMPLETED  DIGITS COLLECTED | ANSWERED HELD (REMAIN IN SAME STATE) | |
| SCU ASKS SWITCH MATRIX TO CONNECT PARTY A TO PARTY B | CONNECT (A,B) | ROUTE SELECTED | ANSWERED HELD → ANSWERED LINKED | IDLE HELD → SEIZED LINKED |
| SCU ASKS SWITCH MATRIX TO HOLD PARTY A | HOLD (A) | INSTRUCTION COMPLETED | ANSWERED LINKED → ANSWERED HELD | SEIZED LINKED → SEIZED HELD |
| -CONTINUED- | | | | |

FIG. 29a

| ACTION | SCU ->> SWITCH MATRIX | SWITCH MATRIX ->>SCU | STATE TRANSITIONS FOR PARTY A | STATE TRANSITIONS FOR PARTY B |
|---|---|---|---|---|
| PARTY B ANSWERS OR GOES OFF-HOOK. | | OFFHOOK (B) | ANSWERED HELD<br><br>REMAIN IN SAME STATE | SEIZED HELD<br>↓<br>ANSWERED HELD |
| SCU ASKS SWITCH MATRIX TO RECONNECT PARTIES A AND B | RECONNECT (A,B) | INSTRUCTION COMPLETED | ANSWERED HELD<br>↓<br>ANSWERED LINKED | ANSWERED HELD<br>↓<br>ANSWERED LINKED |
| SCU ASKS SWITCH MATRIX TO MUTE PARTY A | MUTE | INSTRUCTION COMPLETED | ANSWERED LINKED<br>↓<br>ANSWERED LISTENING | ANSWERED LINKED<br><br>REMAIN IN SAME STATE |
| SCU ASKS SWITCH MATRIX TO UNMUTE PARTY A | MUTE | INSTRUCTION COMPLETED | ANSWERED LISTENING<br>↓<br>ANSWERED LINKED | ANSWERED LINKED |
| -CONTINUED- | | | | |

FIG. 29b

| ACTION | SCU ->> SWITCH MATRIX | SWITCH MATRIX ->>SCU | STATE TRANSITIONS FOR PARTY A | STATE TRANSITIONS FOR PARTY B |
|---|---|---|---|---|
| PARTY B GOES ON-HOOK | | ONHOOK (B) | ANSWERED LINKED → ANSWERED HELD | ANSWERED LINKED → IDLE HELD |
| SCU ASKS SWITCH MATRIX TO PLAY MESSAGE TO PARTY A | PLAY MESSAGE (A, MSG) | INSTRUCTION COMPLETED | ANSWERED HELD → ANSWERED LINKED | IDLE HELD (REMAIN IN SAME STATE) |
| MESSAGE HAS FINISHED PLAYING | | MESSAGE PLAYED | ANSWERED LINKED → ANSWERED HELD | |
| SCU ASKS SWITCH MATRIX TO DISCONNECT PARTY A | DISCONNECT (A) | INSTRUCTION COMPLETED | ANSWERED HELD → IDLE HELD | IDLE HELD (REMAIN IN SAME STATE) |
| -END- | | | | |

*FIG. 29c*

PROGRAMMABLE SERVICE ARCHITECTURE FOR CALL CONTROL PROCESSING

CLAIM OF PRIORITY

This application claims priority from U.S. Provisional Patent Application No. 60/020,713 of Kent W. Smith et al., entitled "PROGRAMMABLE SERVICE ARCHITECTURE" filed Jun. 13, 1996.

CROSS-REFERENCE TO RELATED APPLICATIONS

The following co-pending United States Patent Applications filed concurrently with this application contain related information and are incorporated herein by reference:

U.S. patent application Ser. No. 08/865,887 of Geetha R. Ram et. al. filed may 30, 1997; and U.S. patent application Ser. No. 08/865,692 of Geetha R. Ram et. al. filed May 30, 1997.

TECHNICAL FIELD OF THE INVENTION

The present invention relates to an apparatus and method for call control processing in a telecommunications network and, in particular, to an apparatus and method of controlling the call processing of enhanced service calls.

BACKGROUND OF THE INVENTION

In the telecommunications network's classic structure, intelligence resides in the internals of the individual switching systems within the network. In this structure when a telecommunications operating company needs to evolve their network, keep up with standards or differentiate their products, they usually contract with the vendor of the switching equipment for new switch-based development. While this is excellent business for the switching equipment vendor, it requires the operating company to be locked into the particular vendor's delivery schedule and quality of output. With the complexity of switch-based software continually growing, updates and changes to the software required to implement a new service (or modify existing services) are taking longer to complete, and often degrades the quality of the processing. In the rapidly changing telecommunication marketplace success has a lot to do with introducing services quickly and with exceptional quality. Two existing enhancements to the classic telecommunications network help give the operating company independence from the switch vendors and improve service deployment. These include (1) Intelligent Networking (IN) or Advanced Intelligent Networking (AIN) and (2) programmable switching matrices.

Intelligent Networking is driven by standards that have defined (and include) components such as Service Control Points (SCP) and Service Switching Points (SSP) communicating via a common channel signaling system 7 (CCS7) infrastructure. The IN components and standards decouple service development from internal switch implementation and allows an operating company to develop services in isolation of the switch vendors' development and deployment schedules. The benefits of these standards and the resulting changes to the network architecture are that services can be written independently from the switch, implemented by third-parties or the operating company themselves, and work with switches manufactured by different vendors. The disadvantages of IN, however, are that the standards have been slow to evolve and the complexity is high thus requiring a phased implementation from switch vendors, and the functionality defined by the CCS7 messaging (e.g., TCAP) leaves little room for differentiation of service offerings.

Taking advantage of the slowness in which the IN standards have been defined, implemented and deployed in the switching network, some telephony equipment vendors have implemented stand-alone programmable switching matrices. These products have been used to prototype and deploy services into the public switch network. Examples of such services include voice dialing, televoting, and debit card services. These stand-alone systems are connected as a terminal appliance, typically via integrated services data network (ISDN), primary rate interfacing (PRI) or T1 connections, onto the existing backbone network as service overlay networks.

The advantages of stand-alone programmable switching matrices are the same as with the IN but there are several disadvantages. The standalone programmable switching matrices do not offer the reliability or the capacity required for optimal network implementation. Additionally, the different computing platforms added into the network to support these overlay systems introduce maintenance and network management complexities resulting in high operations and sustaining costs. Lastly, with these stand-alone overlay programmable switching matrices there is an inefficient use of resources as both systems are tied up for the duration of the service.

SUMMARY OF THE INVENTION

In accordance with the present invention, there is provided an apparatus for controlling and processing a service call in a telecommunications system. In one embodiment of the present invention, the apparatus includes a programmable switch matrix having at least two ports, a first port and a second port. The programmable switch matrix also includes one or more predetermined triggers for detecting when processing of a service call associated with the first port is desired to be controlled externally by a service control unit. A service node outputs an event notification message to the service control unit in response to the detection of the service call and receives one or more primitives (instructions) from the service control unit. Call processing circuitry within the programmable switch matrix connects the first port to the second port in response to the one or more primitives received by the programmable service node from the service control unit. The service control unit is located external to the programmable switch matrix and controls the programmable switch matrix and processing of the service call through a communications link between the programmable switch matrix and the service control unit.

In another embodiment of the present invention, the apparatus includes a service control unit having one or more application software programs for controlling call processing of the service call. A programmable switch matrix is provided having a plurality of ports, and at least a first port and a second port. The programmable switch matrix generates service control unit service call request when call control processing of the service call received on the first port is desired to be controlled by the one or more of the application software programs within the service control unit. An event notification message is generated and output by the programmable switch matrix to the service control unit in response to the service call request. The event notification message includes call information associated with the service call. One or more primitives (instructions) are received from the service control unit and the programmable switch matrix connects the first port to the second port in response to the one or more received primitives. The service control unit is located external to the programmable switch matrix and externally controls the programmable switch matrix and processing of the service call. A first data link provides a communication path between the programmable switch matrix and the service control unit for carrying the one or more primitives from the service control unit to the programmable switch matrix and for carrying the event notification message from the service control unit to the programmable switch matrix. The apparatus also includes a media resource unit for generating and outputting a message to at least one of the plurality of ports. A second data link between the media resource unit and the programmable switch matrix carries the message to the at least one of the plurality of ports and a third data link between the service control unit and the media resource unit is used for controlling the output of the message from the media resource unit.

In accordance with the present invention, there is provided a method of controlling and processing a service call in a telecommunications system. In another embodiment of the present invention, a service call is received on a first port of a switch matrix and it is determined from call information associated with the received call that processing of the received call should be controlled by a predetermined service application program. A new call event notification message is transmitted to a service control unit notifying the service control unit that the received call should be controlled by the service application program. The service control unit located externally to the switch matrix and includes the service application program. The service application program controls the processing of the received call. One or more primitives are transmitted from the service control unit to the switch matrix instructing the switch matrix to connect the first port to a second port of the switch matrix.

In yet another embodiment of the present invention, the method includes the steps of receiving a call on a first port of a switch matrix wherein the received call includes call information; performing in-switch call processing of the received call until a trigger is detected; triggering when the call information of the received call meets one or more predetermined trigger criteria within a trigger database; sending a first data message to a service control unit in response to the triggering, the first data message includes a first set of data defining a type of the received call and a second set of data defining an address of the first port. The service control unit is located external to the switch matrix. The method also includes the steps of sending a second data message from the service control unit to the switch matrix to notify the switch matrix that the first data message was received and that processing of the received call will be controlled by the service control unit; selecting a predetermined service application program to handle control processing of the received call in response to the call type data of the first message; executing the selected service application program, the selected service application program generating one or more instructions for performing one or more actions within the switch matrix; sending the one or more instructions to the switch matrix to control processing of the received call; and connecting the first port to a second port of the switch matrix in response to the one or more instructions.

In accordance with the present invention, there is also provided a service programming interface protocol for use between a switch matrix and an external service control unit having one or more service application programs for execution for controlling a service call received on one of a plurality of ports of the switch matrix. The service programming interface protocol includes a plurality of primitives for transmission from the service control unit to the switch matrix for controlling the switch matrix. The primitives include a bridge primitive for instructing the switch matrix to connect a plurality of predetermined ports to each other within the switch matrix, a collect digits and report primitive for instructing the switch matrix to receive a specified number of multifrequency digits at a predetermined port and transmit the received digits to the service control unit, a connect primitive for instructing the switch matrix to connect a predetermined first port of the switch matrix to another port of the switch matrix, a disconnect primitive for instructing the switch matrix to disconnect a predetermined first port of the switch matrix from another predetermined port of the switch matrix, and a new call accepted primitive for instructing the switch matrix that the processing of the service call will be controlled by the service control unit. The interface protocol also includes a plurality of event notification messages for transmission from the switch matrix to the service control unit to notify the service control units of one or more events occurring at the switch matrix. The plurality of event notification messages includes a digits collected event notification message for informing the service control unit that a specified number of digits have been collected from a predetermined port and the identity of the collected digits, an instruction completed event notification message for informing the service control unit that the switch matrix has completed one or more actions in response to one or more primitives previously received from service control unit, a new call event notification message for informing the service control unit that a triggering event has occurred for the received call and that the service call is to be controlled by the service control unit, an off-hook event notification message for informing the service control unit that a predetermined port is off-hook, and an on-hook event notification message for informing the service control unit that a predetermined port is on-hook.

In still yet another embodiment of the present invention, there is provided a method of communicating, via a communications link, between a switch matrix and an external service control unit having one or more service application programs for controlling a service call received on one of a plurality of ports of the switch matrix, The method includes the steps of instructing, through one or more primitives sent from the external service control unit to the switch matrix, the switch matrix to (1) connect a plurality of predetermined ports to each other within the switch matrix, (2) receive a specified number of multifrequency digits at a predetermined port and transmit the received digits to the service control unit, (3) connect a predetermined first port of the switch matrix to another port of the switch matrix, (4) disconnect a predetermined first port of the switch matrix from another predetermined port of the switch matrix, and further to instruct the switch matrix that the processing of the service call will be controlled by the service control unit. The method further includes the steps of informing, through one or more event notification messages sent from the switch matrix to the external service control unit, the service control unit that (1) a specified number of digits have been collected from a predetermined port and the identity of the collected digits, (2) the switch matrix has completed one or more actions in response to one or more primitives previously received from service control unit, (3) a triggering event has occurred for the received call and that the service call is to be controlled by the service control unit, (4) a predetermined port is off-hook, and (5) that a predetermined port is on-hook.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is made to the following description taken in conjunction with the accompanying drawings, wherein:

FIGS. 29a, 29b, and 29c illustrate a call state and transition example for an enhanced service call.

DETAILED DESCRIPTION OF THE INVENTION

Figure 1:
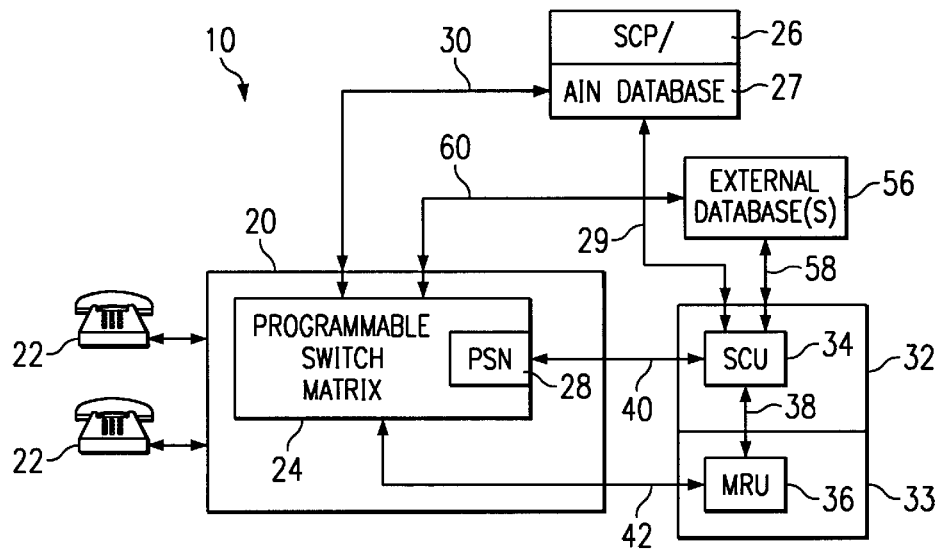
FIG. 1 is a schematic block diagram of the present invention that includes a programmable switch matrix and a service control unit.

With reference to the drawings, like reference characters designate like or similar elements throughout the drawings.

A. Distributed Programmable Service Architecture

Now referring to FIG. 1, there is illustrated, in accordance with the present invention, a distributed programmable service architecture 10 that includes a programmable switch matrix 24 embodied within a public switched telephone network (PSTN) 20. Connected to the PSTN 20 are multiple network user appliance terminals 22. As will be appreciated, user terminals 22 may be telephone sets (Plain Old Telephone Sets—POTS), mobile base stations (MBS), integrated services data networks (ISDN), private branch exchanges (PBX), and any other user terminals interconnected to the PSTN 20.

The PSTN 20 is representative of a telecommunications network infrastructure having a plurality of switching systems and other network elements which are interconnected by transmission facilities, whereby user terminals 22 (and users thereof) are able to communicate. The programmable switch matrix 24 includes a programmable service node (PSN) 28 that provides external programmability to the programmable switch matrix 24. The programmable switch matrix 24 is communicatively coupled via a communications link 40 to a service control unit (SCU) 34 within a service control platform 32. In addition, the programmable switch matrix 24 is communicatively coupled via a communications link 42 to a media resource unit (MRU) 36, respectively, within a media resource platform 33.

The programmable service architecture 10 characterizes a client-server type arrangement whereby enhanced telephony services may be deployed into the PSTN 20. The programmable switch matrix 24 functions as a conventional switching system that performs traditional call processing as an autonomous in-switch operation. The programmable service node (PSN) 28 provides a server mode operation in which call processing and hardware resources of the programmable switch matrix 24 (client) are controlled by the external service control platform 32, specifically the SCU 34 thereof. The programmable switch matrix 24 is preferably deployed in a tandem/toll office within the PSTN 20 which positioning allows it to be accessed by a larger subscriber base and billing of charges for service utilization may be readily effected with existing network capabilities.

The service control platform 32 provides functionality for implementing telephony services, wherein software applications (service software programs) defining such services are executed by the SCU 34 that control the call processing of a desired service call. The PSN 28 communicates with the SCU 34 over the communications link 40 utilizing a service programming interface signaling protocol. In the preferred physical embodiment, the communications link 40 includes an Ethernet link, but may include any other communications standards and hardware such as IEEE 802.3 (10BaseT), Fiber Distributed Data Interface (FDDI), Asynchronous Transfer Mode (ATM), and the like.

The media resource unit (MRU) 36 provides additional call processing capabilities and functions (enhanced services) which may not have been directly provisioned in the programmable switch matrix 24, including for example, voice messages or announcements, tone, interactive voice response, advanced and/or flexible voice recognition, voice record and store, fax server, and the like, that are provided to the PSTN 20. The MRU 36 interacts with calls connected via the communications link 42 to the programmable switch matrix 24 under the control of the SCU 34. The communications link 42 includes capabilities for voice/data communications, and may include DS1 digital trunks, or any other appropriate communications system. The MRU 36 and the SCU 34 communicate via a communications link 38 that may be similar to the communications link 40.

An optional service control point (SCP) 26 and/or AIN database 27 may be included within the programmable service architecture 10. The SCP may contain the AIN database 27, or the AIN database 27 may be physically separate. A communications link 30 is provided between the programmable switch matrix 24 and the SCP 26 and/or AIN database 27.

The AIN database 27 generally contains translation numbers (for a given trigger criteria) and/or routing information for a particular type of call that is queried when the programmable switch matrix 24 receives and triggers on a service call that requires (or desires) AIN service. Typically, AIN services include 1-800 translations, etc., and the AIN database 27 provides translation and routing information (i.e., provides the real number to switch matrix 24 for routing).

As will be appreciated, the programmable service architecture 10 may also include one or more external informational databases 56 interconnected between the SCU 34 via a communications link 58 and between the programmable switch matrix 24 via a communications link 60, respectively, for additional information capabilities if desired.

B. Programmable Switch Matrix and Service Node

1. Hardware

Figure 2:
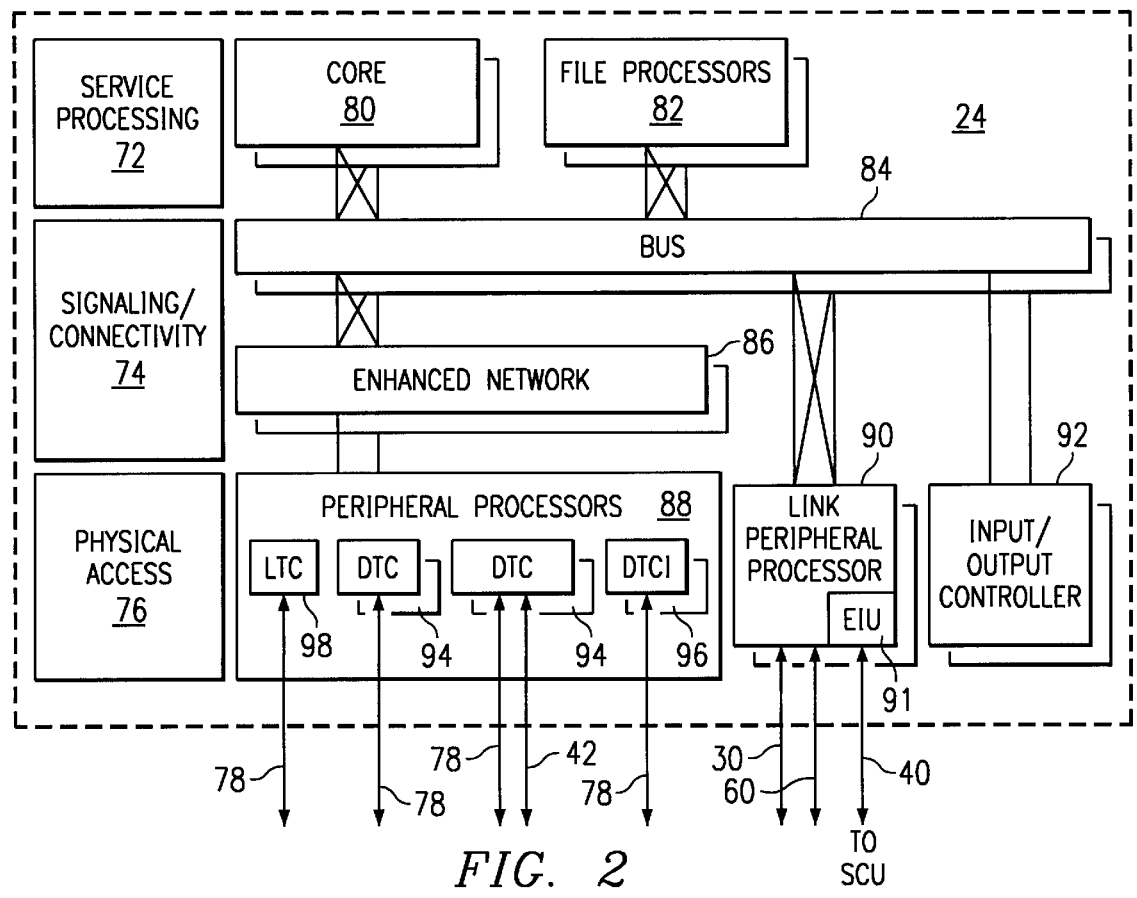
FIG. 2 is a more detailed schematic block diagram of the programmable switch matrix illustrated in FIG. 1.

Now referring to FIG. 2, there is shown a block diagram of the programmable switch matrix 24 in accordance with the present invention. Functionally, the programmable switch matrix 24 is divided into three layers: service processing 72, signaling and connectivity 74, and physical access 76. Although every layer includes many central processing units (CPUs), the service processing layer 72 as the top layer contains the processing for central call handling, system control, and system management. It also provides the higher-level functions associated with the wide variety of telecommunications services provided by the programmable switch matrix 24. The signaling and connectivity layer 74 contains the system's major internal messaging component and the call switching fabric. The physical access layer 76 provides terminations, signal processing, service-specific protocol handling, and multiplexing. It also provides interfaces and processors having access to external signaling and data networks, and allows lines and trunks carrying voice or data traffic to connect to the programmable switch matrix 24.

The physical access layer 76 includes a plurality of input/output lines or trunks 78 for receiving/transmitting voice or data. As will be appreciated, the trunks 78 are characterized by one or more physical connection lines for input/output. Generally, each trunk includes a plurality of ports (or channels, not shown) 79 if the trunk 78 carries time division multiplexed (TDM) signals (if there is no such multiplexing, each trunk may be fairly characterized as a port itself). As will be appreciated, the trunks 78 may carry types of data signals other than TDM, such as frequency division multiplexed (FDM) signals, and the like, or a combination thereof.

The main components of the service processing layer 72 include a core 80 and a plurality of file processors 82. The core 80 is the main computing resource and provides overall system control, conventional switched call routing, maintenance, and management functions. The core 80 includes duplicated, high capacity, single-chip microprocessors, with duplicated memory, communication buses and interfaces (not shown) to a bus 84. The file processors 82 enhance the programmable switch matrix's data management capabilities by providing secondary storage and archive functions and allowing both file and database access to their stored data. The file processor 82 typically includes three memory cards, a Small Computer Serial Interface (SCSI) card, and fiber-optic links to the bus 84, and generally support redundant hard disk drives and digital tape drives (not shown).

The main components of the signaling and connectivity layer 74 include the bus 84 and an enhanced network 86. The bus 84 is a high speed transaction bus that provides message transport functions for the distributed processors of the programmable switch matrix 24 on a peer-to-peer basis. The bus 84 consists of two load sharing planes, each plane having a CPU, memory, and a set of interfaces (not shown) to the core 80, the file processors 82, the enhanced network 86, etc. The enhanced network 86 handles call switching. It is a time division multiplexing (TDM) switch network that establishes connections between any of the trunks 78 or ports (voice and/or data channels) terminating on the programmable switch matrix 24. The enhanced network 86 is a non-blocking, single-stage switch that also provides connections for control messages exchanged between a plurality of peripheral processors 88 and the core 80.

The physical access layer 76 includes the peripheral processors 88, as well as one or more link peripheral processors 90 and one or more input/output controllers 92. The peripheral processors 88 provide an interface between the enhanced network (i.e., switching fabric) 86 in the signaling and connectivity layer 74 and the external environment of the programmable switch matrix 24 which, as a tandem office, typically is through digital trunks (providing anywhere from 1 to over 100,000 ports or channels depending on the size). The peripheral processors 88 are controlled by the core 80, and support it by providing some of the processing required for call handling, as well as the trunk interfaces. For example, once the core 80 has established digital connections among peripheral processors 88, they can pass voice and data traffic, as well as signaling and control messages among themselves without supervision from the core 80. The link peripheral processors 90 terminate a number of link types and implement a variety of protocols to connect the programmable switch matrix 24 to the external operations and signaling networks (via communications links 30, 40, 60, and other links between the programmable switch matrix 24 and other components or systems within the PSTN 20). Examples of these networks include CCS7 signaling links and Ethernet (IEEE 802.3) with TCP/IP and X.25/X.75 for packet switched data. The input/output controller 92 provides the interface between the bus 84 and a variety of serial devices (not shown) including video display terminals, magnetic tape drives, disk drives, data units, modems and printers. Preferably, the programmable switch matrix 24 is equipped with a plurality of six port (or more) conference circuits which are advantageous to support bridging to the MRU 36.

As will be appreciated, the programmable switch matrix 24 may be based on a DMS-250 programmable switch matrix designed and manufactured by Nortel, Inc.

As illustrated within FIG. 1, included within the programmable switch matrix 24 is the programmable service node (PSN) 28, sometimes referred to as the PSN switching system. The programmable service node is implemented by appropriate PSN application software embedded in the core 80. Execution or operation of the PSN application software thereby provides the functionality of the PSN 28. The PSN application software includes a finite state machine embodied in software which will be described in detail below.

Now referring back to FIG. 2, the peripheral processors 88, in accordance with the present invention, include one or more digital trunk controllers (DTC) 94 that provide trunk connections (and control thereof) to other machines or systems within or without the PSTN 20. The DTCs 94 provide trunking that may include per-trunk signalling (PTS) trunks, inter-machine trunks (IMT), and/or signalling system #7 (SS7) trunks, including TX (e.g. T0, T1, T2, etc.) trunks. In addition, one or more integrated services data network (ISDN) digital trunk controllers (DTCI) 96 are provided for ISDN trunking that may include primary rate interfacing (PRI) and/or basic rate interfacing (BRI). A DTC 94 or DTCI 96 connects the programmable switch matrix 24 to digital interoffice carriers and/or private branch exchanges (PBX), the MRU 36, etc. The DTCs 94 and DTCIs 96 include signal processing resources (not shown), for example, Universal Tone Receivers (UTRs) and Specialized Tone Receivers (STRs) that provide tone generation, tone reception, and digit collection. Another switch resource within the programmable switch matrix 24 is an announcement machine, such as Nortel's Enhanced Digital Recorded Announcement Machine (EDRAM) (not shown). This provides short announcements or messages that are played to one or more of the ports. The MRU 36 typically provides access to longer announcements and messages for bridging to one or more ports. The peripheral processors 88 also include one or more line trunk controllers (LTC) 98 that provide line connections to individual lines (such as user terminals 22) and/or trunk connections to smaller, local exchanges.

Now referring back to FIG. 1, the programmable switch matrix 24 (in conjunction with the programmable service node 28) connects to the SCU 34 through the communications link 40. Preferably, the communications link 40 is through an Ethernet link, but may include other defined communications links. The communications link 40 is provided by a pair of Ethernet interface units (EIU) 91 included within the link peripheral processor 90 of the programmable switch matrix 24. The EIUs 91 are configured in an active/standby arrangement. One link is active and carries live data. The other link is inactive, but dedicated, and configured to operate in the event the active link fails. In one embodiment, the physical media used for the communications link 40 is 10 Mbit/s Ethernet 10baseT. Typically, the EIUs 91, the communications link 40 and the SCU 34 are configured on a subnet dedicated to the programmable service node 28 application. This allows for isolation between the data messaging created by the programmable service node 28 application and other applications (e.g., billing) operating within the programmable switch matrix 24. As will be appreciated, the SCU 34 also includes a pair of EIUs for interfacing, or other appropriate hardware depending on the type of communications link 40 utilized.

Figure 3:
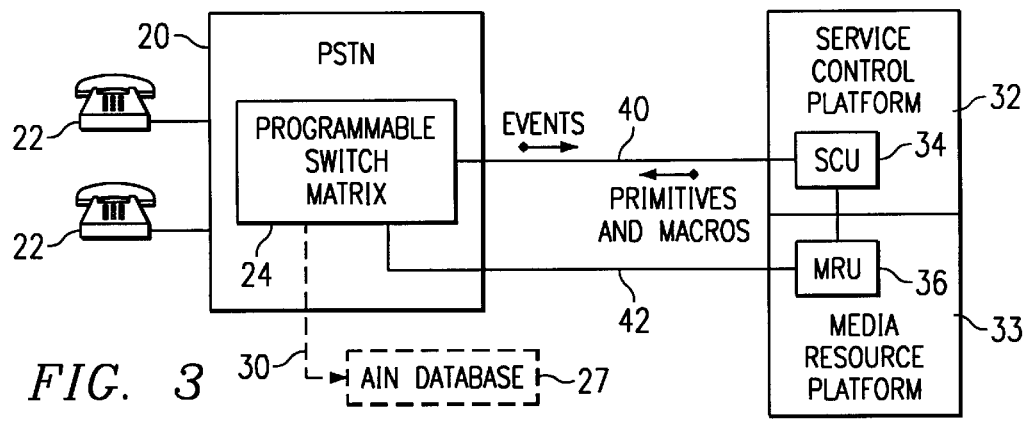
FIG. 3 is a simplified block diagram of the present invention.

Now referring to FIG. 3, there is shown a simplified illustration of the present invention. A service call associated with a specific port (port or trunk member), sometimes referred to as an "agent," that is generated by one of the user terminals 22 is received by the programmable switch matrix 24. If the service call is a "conventional" call, the programmable switch matrix 24 processes the call in accordance with conventional call processing techniques. If the service call is identified as a call that requires (or desires) specialized call control processing, the call enters what is identified as a "server mode." In the server mode, the call or agent (port or trunk member associated with the call) is controlled by the SCU 34. Accordingly, the SCU 34 provides instructions to the programmable switch matrix 24 (via the programmable service node 28) to control the processing of the call or agent. As will be appreciated, other additional ports or trunk members may be associated with a call. These may also be characterized as "agents" even though the additional port(s) or trunk member(s) are not the initiator of the service call request, but are involved in the service call. Instructions received from the SCU 34 intended to control any of the resources within the programmable switch matrix are sent by the core 80 to the enhanced network 86 and the appropriate peripheral processor 88 through the bus 84 using internal messaging (see FIG. 2).

The service communications link 40 provides a mechanism for the transport of data messages to and from the programmable switch matrix 24 and the SCU 34. When a call or agent is entering the service mode, and while in this mode, the programmable switch matrix 24 and the SCU 34 communicate with one another through messages called primitives, macros, and event notifications, defined below.

A primitive is transmitted from the SCU 34 to the programmable switch matrix 24. A primitive is an instruction that controls the programmability of the programmable switch matrix 24 and controls the call or agent processing. A macro is a plurality of primitives sent in one message. An event notification provides status information regarding a port (or trunk member), i.e. agent, involved in a service call in response to primitives and/or macros, or in response to a peripheral event on the port. An event notification is transmitted from the programmable switch matrix 24 to the SCU 34. Primitives and event notifications are described in more detail later.

All required (or desired) service calls are handled according to the agent. No actions are performed on the service call as a whole. Instead, the primitives and event notifications relate to a specific agent, and all actions are performed on the designated agent. This architecture provides flexibility and does not rely on any assumptions about the call. For conventional in-switch call processing (a non-service call), call supervision and processing is based on the originating and terminating agents. In the programmable service node application, there is no concept of an originator or terminator. Each agent is independent of one another and a group of agents may be a part of a service being driven by the SCU 34. The present invention allows the SCU 34 to control individual agents and mix and match agents as a service call progresses.

Once in the server mode, the conventional call processing architecture is bypassed for that particular call. Accordingly, a master-slave relationship is created wherein the SCU 34 is the master and the programmable switch matrix 24 is the slave performing actions in response to instructions from the SCU 34.

The programmable switch architecture 10 allows and supports co-existence with AIN servicing and service calls associated with AIN triggering and the AIN database 27. A service call may trigger on an AIN trigger or an SCU trigger. As will be appreciated, the AIN triggers and SCU triggers may be provisioned within the programmable switch matrix 24. If a service call invokes an SCU trigger, the SCU 34 is notified and thereafter controls processing of the call. If the service call invokes an AIN trigger, the AIN database 27 (and/or SCP 26) provides a translation number (and/or simple routing information) to the switch matrix 24 for routing the call to the appropriate trunk and port (to eventually connect with the real number). It will be understood that the AIN database may determine via a link 29 that the service call should be controlled by the SCU 34. This allows the capability of updating the AIN database 27 with information directing the switch matrix 24 to have the SCU 34 control the service call instead of functioning through the AIN servicing. Since AIN servicing is rather simplistic, the present invention allows new and enhanced services to be added (through the use of the SCU 34) to the typical AIN services. Moreover, the addition of services to the AIN database requires switch software modifications within the programmable switch matrix 24. The present invention does not require such switch software modification to add new services.

As will be appreciated, the present invention supports flexible network configurations that may include one or more programmable switch matrices 24 and/or SCUs 34. Examples of such configurations include, single switch matrix—single SCU, single switch matrix—multiple SCUs (i.e., the programmable switch matrix is controlled by services executing on multiple SCUs), multiple switch matrices—single SCU, and multiple switch matrices—multiple SCUs.

Figure 4:
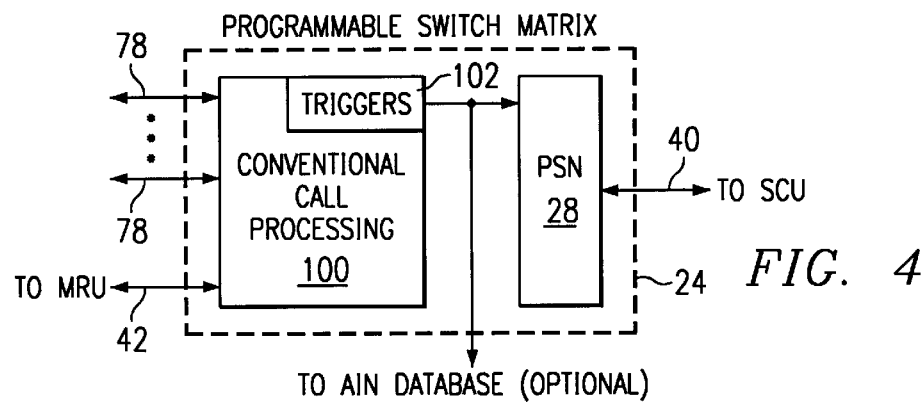
FIG. 4 is a functional block diagram of the programmable switch matrix.

Now referring to FIG. 4, there is shown a functional block diagram of the programmable switch matrix 24, including the programmable service node (PSN) 28. As described earlier, the PSN 28 comprises the PSN application software (typically executing within the core 80). Included in the programmable switch matrix 24 is conventional in-switch call processing circuitry (and may include software) 100 and one or more (or database of) triggers 102 (typically configured in the software) for detecting or identifying when a particular service call requires (or desires) call control processing from the SCU 34. If no such triggering has been detected or identified, the service call proceeds through the conventional call processing circuitry 100. In general terms, the conventional call processing circuitry 100 provides a switching matrix for routing calls between various trunks 78 and ports etc. (and possibly 42). If the service call triggers (i.e. meets the triggering criteria), the processing of the call proceeds under the control of the SCU 34 whereby the SCU 34 sends instructions to the programmable switch matrix 24 (via the PSN 28) for controlling the call processing (by controlling and programming the switching matrix, i.e., the conventional call processing circuitry 100) of that particular service call (unless the SCU 34 rejects control of the call).

2. Software

Figure 5:
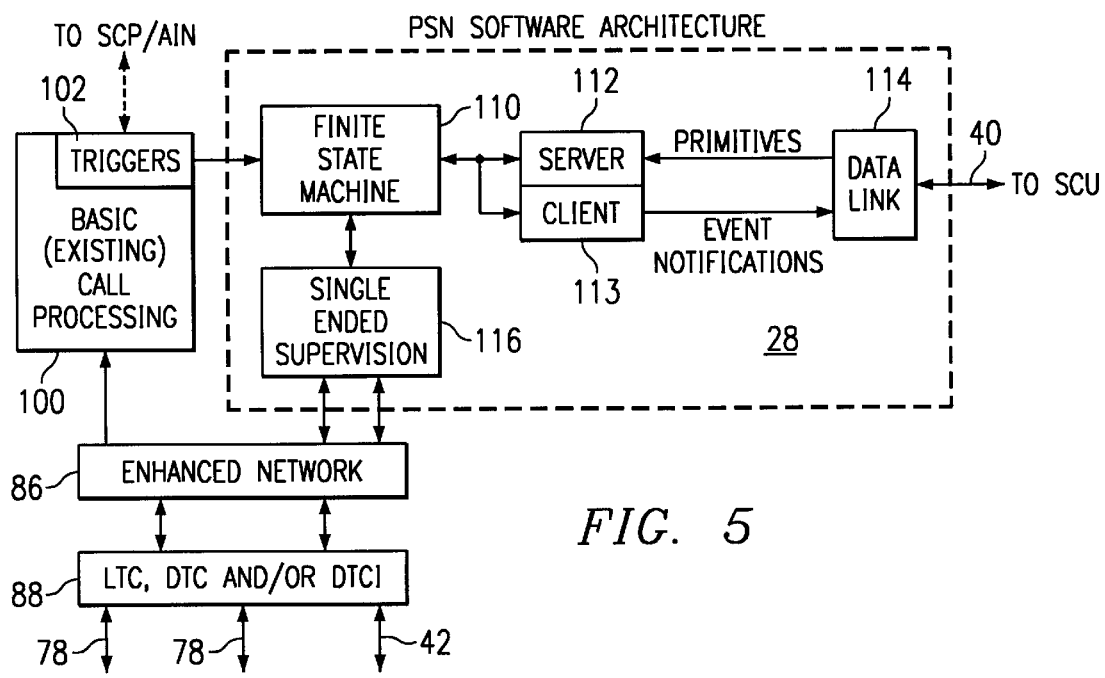
FIG. 5 is a functional block diagram of the software architecture of a programmable service node of the present invention.

Now referring to FIG. 5, there is illustrated the software architecture of the PSN 28 in accordance with the present invention. A datalink 114 functions to transmit and receive communications (messages, including primitives and event notifications) between the PSN 28 and the SCU 34. The datalink 114 provides a transport mechanism (i.e., transport layer) for sending/receiving messages to/from the SCU 34 over the communications link 40. A server 112 is provided which checks the validity of the message from the SCU 34 and sends the message to the appropriate user application (application layer). A client 113 is also provided which receives a message from the user application (application layer) and sends the message to the transport layer (datalink 114) for transmission to the SCU 34. In other words, the server 112 receives messages from the transport layer and transfers them to the application layer while the client 113 receives messages from the application layer and transfers them to the transport layer. The transport layer, or Service Programming Interface (SPI) includes the specific primitives and event notifications that are transmitted between the SCU 34 and the PSN 28, and are described in more detail later.

Within the software architecture of the PSN 28, there are additional functional elements including a finite state machine (FSM) 110 and a single-ended supervision functional unit 116. The FSM 110 defines the states, events and transitions for the PSN 28 in a preferred embodiment, and provides the functionality to receive instructions (primitives) from the SCU 34 regarding a particular port (or agent), perform the instructions, and send event notifications to the SCU 34. The FSM 110 is described in more detail further below. The single-ended supervision 116 provides single-ended supervision (port B answers, port B reports, not port A) of trunks and ports involved in a service call instead of double-ended supervision (port B answers, port A reports). As will be appreciated, in the preferred embodiment, single-ended supervision is utilized, however, double-ended supervision may be used if desired. Single-ended supervision allows call halves (i.e., originating and terminating halves) to be controlled independently of each other.

C. Service Control Unit (SCU)

1. Hardware

Figure 6:
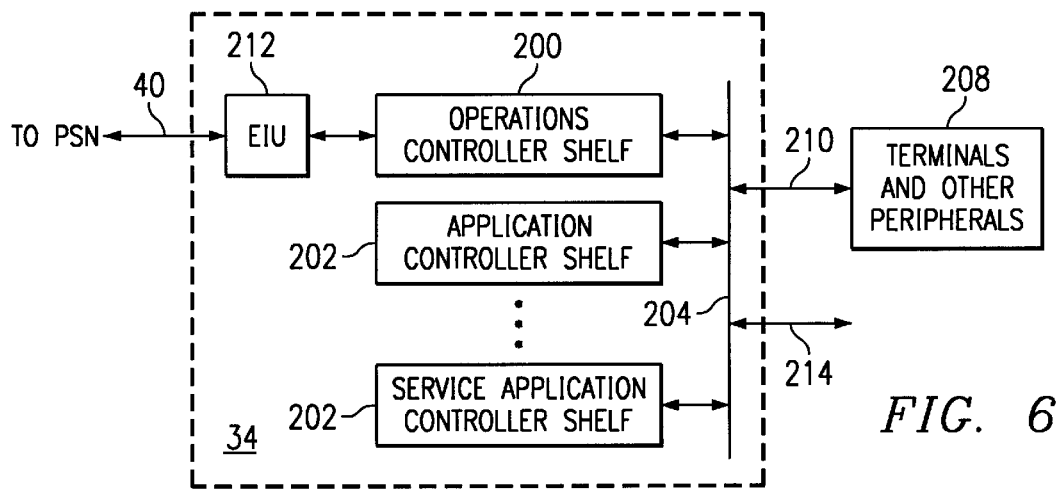
FIG. 6 is a schematic block diagram of the service control unit.

Now referring to FIG. 6, there is shown a block diagram of the SCU 34. The components of the SCU 34 include an operations controller shelf 200, one or more service application controller shelves 202, a local area network (LAN) 204 for interconnecting the operations controller shelf 200 and the service application controller shelf 202 and for providing communications with outside terminals and other peripherals 208 through a communications link 210. The SCU also includes a pair of interface units 212 (may be EIUs or the like) for providing the communications link 40 to the PSN 28. As will be appreciated, the LAN 204 may be redundant to ensure that no single failure in the LAN 204 affects operation of the SCU 34.

The operations controller shelf 200 contains hardware and software resources to provide centralized operations, administration and management (OAM) on all components within the SCU 34. The operations controller shelf 200 also provides data interfaces for remote access to the OAM system. Processes of the operations controller shelf 200 communicate with all service application controller shelves 202, and may be connected to the switch OAM system and any operating company's operational support system (OSS). The operations controller shelf 200 includes hardware and software for performing the following functions: monitoring the service application controller shelves 202 to ensure sanity, detecting and correcting faults, handling logs, alarms, controller shelf and card resource management, diagnostics, and operation measurements, providing one common location for the performance of system level administration for all components in the SCU 34, supporting printing facilities for the SCU 34, providing modem access capabilities, providing access capability to the user access and security interface, and supporting software installation and upgrades.

Generally, the operations controller shelf 200 includes hardware subsystems (not shown) such as one or more service processors for providing general computing capabilities, one or more input-output processors for I/O processing, and mass storage (including RAM, tapes, disks, and small computer serial interfaces (SCSI)).

The service application controller shelf 202 (or service controller unit) contain the hardware and software resources required to deliver telephony services applications. Each service application controller shelf 202 contains hardware to connect to network switches, MRUs 36, and other external resources such as voice response units and external databases 56. The service application controller shelves 202 include hardware subsystems (not shown) including a master service processor for providing general computing capabilities, and data storage. The master service processor is typically a commercially available single-board computer with a UNIX-based operating system (or other desired operating system), and includes a plurality of serial links for ASCII terminal access, etc., a SCSI controller for communication with a disk or DAT drive, and an attachment unit interface (AUI) for connection to the LAN 204.

Typically, the service application controller shelves 202 are interconnected with one or more MRUs 36 for access to signal and voice processors capable of performing, among other things, speech recognition which includes both speaker-trained and speaker-independent recognition, speech record and playback which provides announcement and message capabilities to support interactive dialogue design, and speech concatenation which allows longer messages to be formed by combining voice prompts with user-recorded information.

The redundant LAN 204 allows the operations controller shelf 200 and service application controller shelf 202 to communicate with each other and with any LAN-connected devices, such as the terminals and other peripherals 208, such as terminals gaining access to the OAM system of SCU 34. Additionally, the LAN 204 may be connected to other processors required for applications such as database systems. The LAN 204 may be connected into a wide area network (WAN), represented by line 214, allowing remote access to the SCU 34 from any device on the WAN 214.

The terminals and other peripherals 208 provide a means for users to edit/modify/delete/add service application software programs within the service application controllers 202.

As will be appreciated, the functionality of the media resource unit (MRU) 36 within the service control platform 32 (see FIG. 1) may be provided by one or more of the service application controller shelves 202. Such functionality would be provided by T1 (or DS1, or other appropriate data communications) digital trunks as part of the communications link 42 and including signal and voice processing capabilities within the MRU 36.

2. Software

Figure 7:
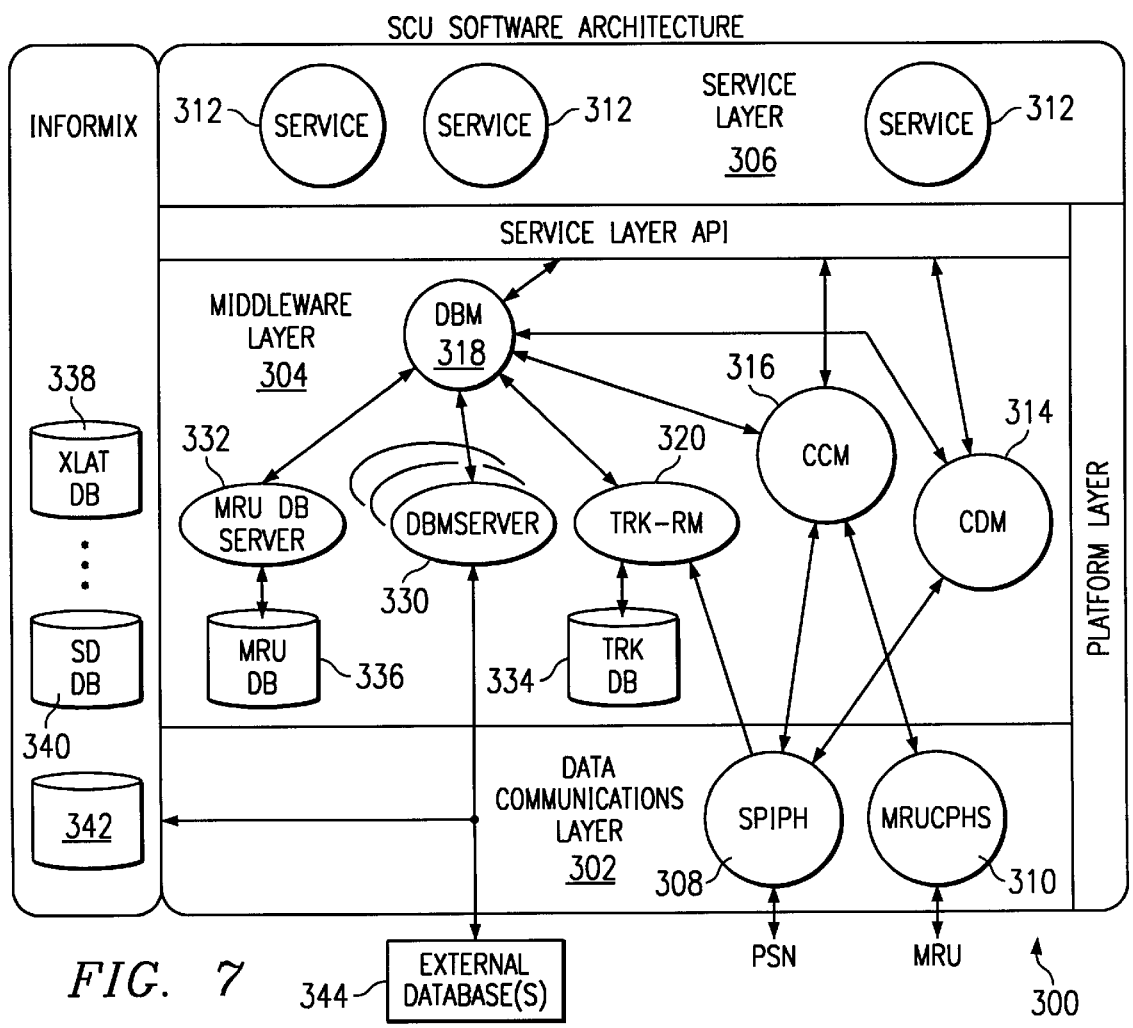
FIG. 7 is a functional block diagram of the software architecture of the service control unit of the present invention.

Now referring to FIG. 7, there is illustrated the software architecture 300 of the SCU 34 in accordance with the present invention. This software architecture provides for the development and execution of service applications (i.e. service applications software programs) on the SCU 34 to control call processing within the programmable switch matrix 24. In general terms, the SCU software 300 functions to discriminate service calls (i.e., identifying the service call, determining which service application should handle the call, and getting the call to the appropriate processor that is executing the particular service application) and process the call (i.e., interacting with the PSN 28 and/or MRU 36, interacting with external databases if desired, and implementing service logic). The SCU software 300 is grouped into three layers: a data communications layer 302, a middleware layer 304 and a service layer 306. Distribution of software into layers allows for easier software maintenance by isolating the functionality.

The data communications layer 302 includes a service programming interface (SPI) protocol handler (SPIPH) 308 for controlling data communications between components of the SCU 34 and the PSN 28. When a message (i.e., event notification) is received from the PSN 28, the SPIPH 308 decodes the message and routes it to one or more of the other components (i.e. see FIG. 7) in the middleware layer 304 depending on whether that particular component is identified as one to receive a particular event notification message (in the preferred embodiment, call-control events are routed to the CCM 316, non-call-control events to the CDM 314, and agent-data to the TRK-RM 320). When a message (i.e., primitive) is sent to the PSN 28 from the SCU 34, it is encoded by the SPIPH 308 and transmitted to the PSN 28. Messaging between the SCU 34 and the PSN 28 uses the service programming interface (SPI) and is described in more detail further below.

Similarly, the data communications layer 302 includes an MRU control protocol handler for SCU (MRUCPHS) 310 for controlling data communications between the SCU 34 and the MRU 36. When a message (i.e., MRU event notification) is received from the MRU 36, the MRUCPHS 310 decodes the message and routes it to one or more of the other components (i.e. see FIG. 7) in the middleware layer 304 depending on whether that particular component is identified as one to receive a particular MRU event notification message in the middleware layer 304 (in the preferred embodiment, call-control events are routed to the CCM 316). When a message is sent to the MRU 36 from the SCU 34, it is encoded by the MRUCPHS 310 and transmitted to the MRU 36.

The service layer 306 contains one or more service application software programs 312. The service layer 306 may also contain a process for simultaneous processing of a plurality of service application software programs 312, i.e., running more than one process (service application software program) at a time. The service application software programs 312 implement call handling logic for a desired customer service. As will be appreciated, customers can create and modify, as desired, the service application software programs 312 for their own custom applications. This is accomplished by creating the applications software off-line and downloading to the SCU 34. Such applications may include 1-800 call forward (a call made to an 800 number is forwarded to another number in the network), pre-paid debit card calling (a caller may make any number of calls as long as his/her billing has not exceeded some pre-set dollar value), foreign long-distance call-back operations and personal number service (caller dials one number to get to the called party who may be at one of several locations), and similar services and the like.

The middleware layer 304 includes four main components: a call distribution manager (CDM) 314, a call control manager (CCM) 316, a database manager (DBM) 318 and a trunk resource manager (TRK-RM) 320. The middleware layer 304 handles service call discrimination and routing, database queries and responses, as well as some management of databases. As will be appreciated, the data communications layer 302 and the middleware layer 304 may be executed simultaneously (i.e., running multiple instances) on each of the service applications controller units 202 within the SCU. In addition, the service application software programs 312 for each service applications controller unit 202 may also be duplicated (multiple instances), and/or each controller unit 202 may have different service applications programs 312 or may have one or more duplicated on some and not on others.

The call discrimination manager (CDM) 314 initiates service call discrimination and balances distribution across all available processors in the SCU 34. It also provides first point of contact between the PSN 28 and the SCU 34. Upon receiving a New Call event notification from the PSN 28, the CDM 314 determines the service application to control processing of the call based on call criteria. Upon selecting the service application, the CDM 314 allocates or directs the call to the appropriate service application software program 312 that will control the call and perform the service. If there exist multiple instances of the same service applications software program 312 spread out across numerous service applications controllers 202, then the CDM 314 uses an algorithm to fairly distribute, or balance, new calls (needing the same servicing) across the multiple instances.

The CDM 314 is sometimes called an "arbitrator" and is identified by a particular address, its IP address. The arbitrator receives all New Call Event notifications (sent to its IP address) from a particular PSN 28 and processes the new service request and passes the new call to the appropriate service application. The arbitrator then informs the PSN 28 (through a call control primitive) of the IP address (sometimes referred to as port service information or return address) of the service application handling the call (i.e., agent/port). The PSN 28 then sends all subsequent events related to the call to this return address unless the SCU 34 updates the IP address to which events should be directed. In other words, each component within the SCU 34 (i.e., service application, etc.) has its own IP address to which the PSN 28 sends appropriate event notifications.

Figure 8:
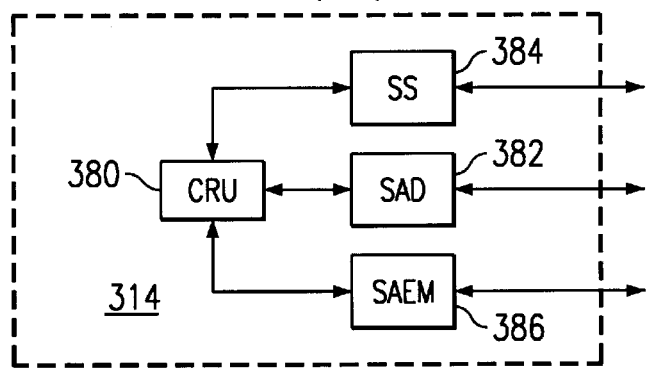
FIG. 8 illustrates the software architecture and message flow within the call distribution manager shown in FIG. 7.

Now referring to FIG. 8, there is illustrated a more detailed description of the software architecture and message flow within the CDM 314. The CDM 314 includes a call routing unit (CRU) 380, a service application discriminator (SAD) 382, a switch supervisor (SS) 384, and a service application environment manager (SAEM) 386. The CRC 380 routes the New Call to the various components of the CDM 314 before routing the New Call to the appropriate service application software program 312. Upon receiving the New Call, the CRC 380 routes it to the SAD 382 to determine which service application software program 312 should process the New Call. The SAD 382 determines the correct service application software program 312 to handle the New Call. The SAD 382 queries one of the databases (via the DBM 312) for service application information, and this information is inserted in the Application ID and Service ID fields in the New Call event notification, and the New Call is directed back to the CDM 314.

The SS 384 monitors other CDMs 314 processing on other service applications controller units 202. Each CDM 314 is typically responsible for controlling one or more PSNs 28 (i.e., processing the PSN's New Calls). If one CDM 314 were to go out of service, one of the other CDMs 314 is dynamically designated to take control over call distribution/redistribution. The SAEM 386 monitors the service application software programs 312. Several different service applications 312 may be available to process the different types of calls. In addition, their may be multiple instances of the same service application 312 executing within the SCU 34. The SAEM 386 communicates with the service applications 312, thereby providing information to the CDM 314 on the provisioning and availability of the service applications 312.

Now referring back to FIG. 8, the CCM 316 utilizes the knowledge of all active agents and traffic messages relating to each agent to map event notifications (both PSN 28 and MRU 36) back to the correct call instance. The CCM 316 handles requests from the service layer 306 (i.e. service applications 312) to send primitives to the PSN 28 and instructions to the MRU 36, including updating the appropriate data structures with new information, invoking a primitive builder to gather data to build the primitive data before being sent to the PSN 28, and gathering data to build the MRU message before being sent to the MRU 36. The CCM 316 also handles event notifications from the PSN 28/MRU 36 and updates any call changes and determines which service to send each event received from the SPIPH 308 or MRUCPHS 310. In addition, the CCM 316 retrieves trunk information from a trunk database and handles any signaling propagation necessary for a service call. The CCM 316 stores information about each agent (port) and each resource on a given service application controller unit 202, provides information for insertion into the primitives/instructions for the PSN 28 (or MRU 36) before being sent to the SPIPH 308 (or MRUCPHS 310), and performs predetermined signaling event propagation and/or signaling event translation (i.e., from SS7 to PTS) to services from knowledge of telephony.

The call control manager (CCM) 316 includes a primitive builder (PB) 322, a MRU instruction builder (MRU-IB) 324, and a signaling manager (SM) 326 (not shown). The PB 322 builds primitives for transmission to the PSN 28. As will be described further below, primitives contain one or more parameters and/or fields containing information needed to instruct the PSN 28 to perform a given action. The PB 322 locates accurate information (from the service application program 312 running in the service layer) to place in any required fields and/or parameters that are valid in the SPI protocol and are accurate for correct processing/control of the service call on the PSN 28. Similar to the PB 322, the MRU-IB 324 builds instructions for transmission to the MRU 36. The MRU-IB 324 locates accurate information (from the service application program 312 running in the service layer) to place in any required fields and/or parameters that are valid in the MRU protocol and are accurate for correct processing/control of the service call with respect to the functioning of the MRU 36. Likewise, the SM 326 builds SS7 parameters for primitives transmitted to the PSN 28. The SM 326 locates accurate information (from the service application program 312 running in the service layer) relating to SS7 signaling information parameters for placement in any required fields and/or parameters that are valid in the SS7 TR 394 protocol and are accurate for correct processing/control of the service call on the PSN 28.

The database manager (DBM) 318 is a single point of contact for all database needs of the SCU 34. The DBM 318 provides a front-end for a plurality of database servers: a database management (DBM) server 330, a MRU database (MRU-DB) server 332, and the trunk resource manager (TRK-RM) 320. It coordinates the dispatch of database requests (e.g., query, insert, update, delete) and the reception of database responses (e.g., response, query response). As will be appreciated, the SCU 34 may include one or more databases. In addition, external databases may be used in combination with the SCU 34. Generally, the DBM 318 receives a database request from a requesting client, forwards the database request to the appropriate database (to the server for that database), receives database responses from the respective database, and forwards the database response to the requesting client.

Figure 9:
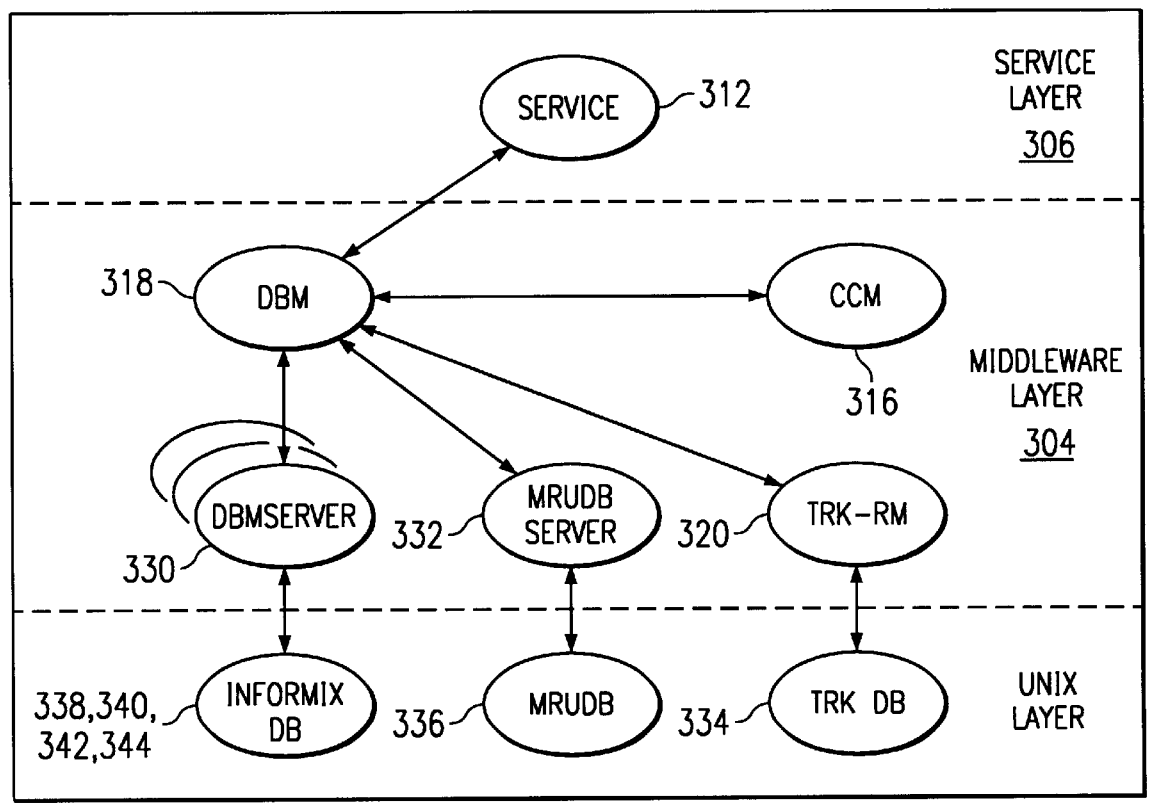
FIG. 9 illustrates a functional flow of a request for data from the service application to a database.

Illustrated in FIG. 8 are a trunk resource database (TRK-DB) 334 associated with the TRK-RM 320, an MRU database (MRU-DB) 336 associated with the MRU-DB server 332, and a translations database (XLAT-DB) 338, a service discrimination database (SD-DB) 340, one or more customer-specific databases 342 (internal to the SCU 34), and one or more external databases 344, all associated with the DBM server 330. The MRU-DB 336 provides MRU data information while the TRK-DB 334 provides PSN trunk (port) information. The XLAT-DB 338 provides routing data, the SD-DB 340 provides service identification information, the customer-specific databases 342 provide user-specific information for service applications, and the external databases 344 may provide any other appropriate type of information and may be similar to, or may include the external databases 56 (illustrated in FIG. 1). Now referring to FIG. 9, pointed arrows 1 through 6 are used to illustrate a typical functional flow of a request for (and receipt of) data from the service application 312 to the MRU-DB 336.

Now referring back to FIG. 7, the trunk resource manager (TRK-RM) 320 controls and maintains accurate PSN datafill on the SCU 34 and processes queries from the DBM 318 for trunk information within the trunk database (TRK-DB) 334. The TRK-RM 320 may also be provided with input/output capabilities to allow user viewing and editing of the database information within the TRK-DB 334 through a graphical user interface (not shown). Upon receipt of agent-data event notifications that contain initial or changed status and/or data (trunk information) from the PSN 28, the TRK-RM 320 updates the TRK-DB 336 with the appropriate information. Typically, the TRK-RM 320 updates its own copy of the TRK-DB 336 and broadcasts the updates to any other TRK-DBs 336 residing within the SCU 34. When New Call event notifications are sent to the CCM 316, the CCM 316 immediately sends a query to the DBM 318 to retrieve information about each agent involved in the service call. This results in a query from the TRK-RM 320 to the TRK-DB 336 and subsequent retrieval of information and response back from the TRK-DB 336 to the DBM 318 (and to the CCM 316).

D. Service Programming Interface (SPI)

The present invention includes a service programming interface (SPI) that provides the message-based signaling communications, or protocol, between the programmable switch matrix 24 and the SCU 34. The protocol provides both instructions in the form of primitives and macros that effectively enable the SCU 34 to control processing of service calls on the programmable switch matrix 24 and event notifications that are reported to the SCU 34 from the programmable switch matrix 24. Primitives and event notifications are made up of one or more parameters and each parameter contains one or more bytes of information. A primitive (or call control command) is sent to the programmable switch matrix 24 from the SCU 34 to control the flow and manipulation of a service call, and it may affect one or more ports involved in the service call. The programmable switch matrix 24 generates and transmits event notification messages to notify the SCU 34 of events on one or more ports that are involved in a service call. The events that occur at the programmable switch matrix 24 are in response to an SCU instruction message (primitive) or as a result of a peripheral event on a call port. Preferably, an event notification reports one and only one port event at a time to the SCU 34. These instructions and event notifications are packaged into a message, and sent back and forth between the programmable switch matrix 24 and the SCU 34.

1. Primitives

A primitive is an instruction that is sent from the SCU 34 to the programmable switch matrix 24. In the present invention, there are two types of primitives: call control primitives and non-call-related primitives. A call control primitive is an instruction that controls call flow and may affect one or more ports in a call.

Figure 10:
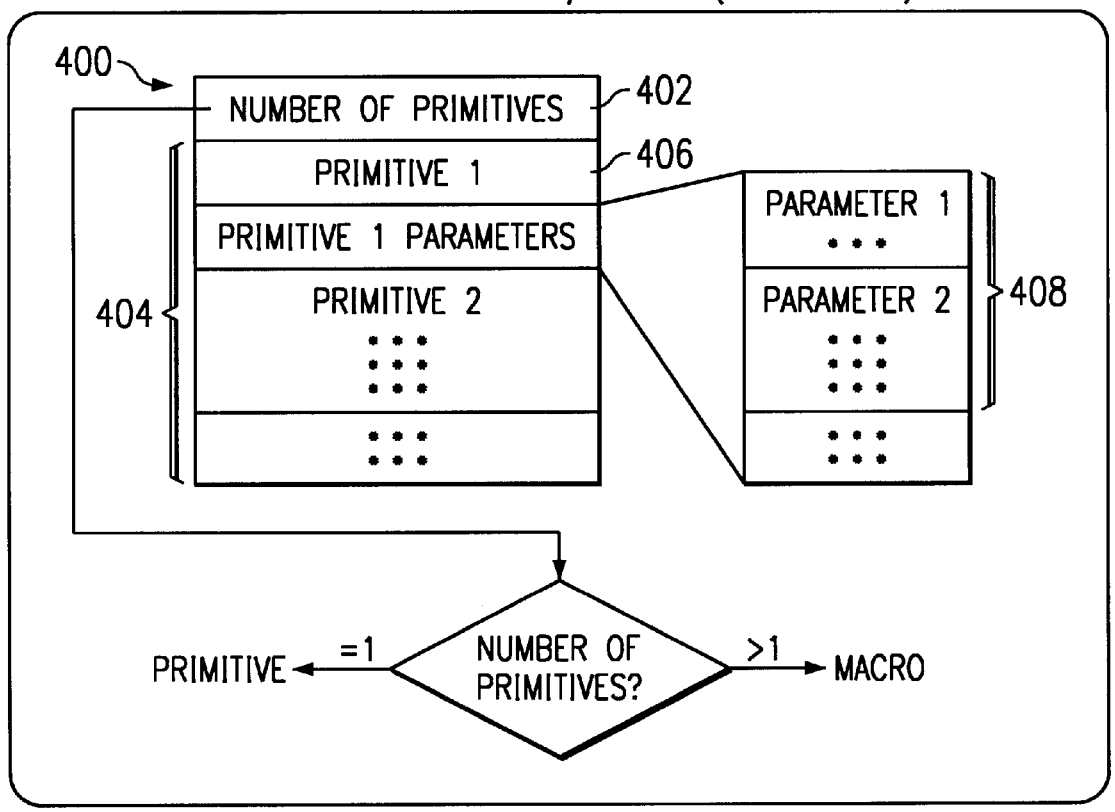
FIG. 10 illustrates packaging of an instruction message (primitive)

Now referring to FIG. 10, there is illustrated a format for a message 400 from the SCU 34 to the programmable switch matrix 24 containing call control instruction information. The message 400 includes a primitives number field 402 and a primitives field 404. The data within the primitives number field 402 indicates the number of primitives that are packaged in the message 400. If the number is greater than one than the message 400 is described as a macro. The primitives field 404 is where the one or more primitives, the exact number being specified in field 402, are positioned within the instruction message 400. Associated with each primitive is a unique identifier 406 of the particular primitive, and one or more parameters 408 holding appropriate information for that primitive.

In accordance with one embodiment of the present invention, the following describes primitives that the SCU 34 utilizes in instruction messages to control call processing within the programmable switch matrix 24 (via the programmable service node (PSN) 28). For each primitive, one or more informational parameters are included in the message. The description of each of the following primitives also includes an identification of particular parameters associated with the primitive. Parameters, and their content, are described in more detail further below.

A Bridge primitive instructs the PSN 28 to bridge or conference (i.e connect) specified ports at the PSN 28 and, optionally, a message which may be either announcements or tones that are non-interruptible. This primitive makes use of the conference circuit resource in the PSN 28 to bridge multiple parties that are associated with the specified ports. If a message is also to be bridged to the ports, then a Message Info parameter is included with this primitive. The message to be bridged may already be playing to one of the parties or it may be a new one that is yet to be started. If the message is already playing on one of the ports, then it is bridged to the other ports. If the message has not yet been started, then the message is bridged and subsequently started. Parameters for the Bridge primitive include:

Session ID: (described further below);
Instruction Tag: (described further below);
Port Information: Identifies the respective ports to be bridged. A minimum of either two ports are required if the Message Information parameter is not sent or one port is required if the Message Information parameter is sent; and
Message Information: Contains the ID of a message which is to bridge to the ports. Required only in the case that this message is also to be bridged to the multiple parties. The message may or may not be already playing when the Bridge primitive is received by the PSN 28.

A Collect Digits & Report primitive instructs the PSN 28 to collect a specified amount of dual tone multifrequency (DTMF) digits at a given port and report the collected digits to the SCU 34. If the port is currently involved in a connection, then it is held whereby the voice path between this port and the connected port is cut in both directions to allow for the digits to be collected on this port. Parameters for the Collect Digits & Report primitive includes include:

Session ID: (described further below);
Instruction Tag: (described further below);
Port Information: Identifies the port on which the digits should be collected;
Digit Collection: Identifies the digits to collect;
Billing Information: Contains information to update the port's billing records;
Port Service Information: Identifies the return address used to report primitive responses and event notifications to the SCU 34 for the port that is to collect the digits; and
Control Information: Contains information concerning what actions to perform when primitives have been successfully processed on a given port.

A Connect primitive instructs the PSN 28 to connect a given port in the call to an available member (port) of another specified trunk agency. The terminating agent is specified by the external trunk group number. An idle member of the given trunk group is identified and the port is connected to this trunk member. The signalling information (that is contained in the Signalling Information parameter) is outpulsed on the destination trunk member. Also, voice path in both directions is established for this two party call. Parameters for the Connect primitive include:

Session ID: (described further below);
Instruction Tag: (described further below);
Port Information: Identifies the port for connection;
Destination Trunk Group: Identifies the destination trunk;
Billing Information: Contains information to update the billing records of the original port and the destination port. This information may also be provided in one or two Billing Information parameters;
Port Service Information: Identifies the return address used to report primitive responses and event notifications to the SCU 34 for the original port and the destination port. This information may also be provided in one or more Port Service Information parameters;
Bearer Capability: Is used if the SCU 34 overwrites the original port's bearer capability; Signaling Information: Contains information for one of the following: (i) digits to outpulse if the port is a per-trunk signaling (PTS) port; (ii) IAM message parameters if the port is a Signaling System 7 (SS7) ISUP port; or (iii) SETUP message parameters if the port is an ISDN primary rate (PRI) port; and
Control Information: Contains information concerning what actions to perform when primitives have been successfully processed on a given port.

A Disconnect primitive instructs the PSN 28 to disconnect a specified port from a call in which the port is currently active. Parameters for the Disconnect primitive include:

Session ID: (described further below);
Instruction Tag: (described further below);

Port Information: Identifies the port to disconnect;

Billing Information: Contains information to update the billing records of the port;

Port Service Information: Identifies the return address used to report primitive responses and event notifications to the SCU 34 for the port; and Signalling Information: Identifies the cause for the disconnection or release. This parameter includes one of the following: (i) REL message parameter if the port is an SS7 ISUP port; or (ii) DISC/REL message parameters if the port is an ISDN PRI port.

An Error Detected primitive is sent by the SCU 34 to the PSN 28, when the SCU 34 has detected a fatal, non-fatal, or non-service affecting error for a port in the server mode. Parameters for the Error Detected primitive include:

Session ID: (described further below);

Instruction Tag: (described further below);

Port Information: Identifies the port on which the error occurred;

Error Type: Identifies the error is fatal or non-fatal;

Error Cause: Identifies the reason or cause of the error:

Port Status: Indicates the status of the port that is in error;

Instruction ID: Identifies the instruction in error; and

Parameter ID: Identifies the parameter in error.

A Flow Control primitive is sent by the SCU 34 to the PSN 28 to initiate flow control based on specified duration and gap indices. The parameters of the Flow Control primitive include:

Instruction Tag: (described further below);

Flow Control: Contains information indicating the maximum length of time the rate of New Call events may be controlled (duration), and indicating the severity of the control or the minimum length of time between consecutive PSN calls allowed while the control is effective (gap).

A Hold primitive instructs the PSN 28 to put a specified port on hold (i.e., cut the voice path in both directions with the connected party). Parameters for the Hold primitive include:

Session ID: (described further below);

Instruction Tag: (described further below);

Port Information: Identifies the port to be put on hold;

Billing Information: Contains information to update the port's billing records; and Port Service Information: Identifies the return address used to report primitive responses and event notifications to the SCU 34 for the port; and Control Information: Contains information concerning what actions to perform when primitives have been successfully processed on a given port.

A Monitor primitive instructs the PSN 28 to monitor a specified port for given digits and/or tones using the specialized tone receiver (STR) with which the programmable switching matrix 24 is equipped. Parameters for the Monitor primitive include:

Session ID: (described further below);

Instruction Tag: (described further below);

Port Information: Identifies the port to monitor;

Monitor Mask: Contains information indicating the tones/digits to monitor. Bits are set to start or cancel monitoring for the appropriate tone/digit;

Billing Information: Contains information to update the port's billing records;

Port Service Information: Identifies the return address used to report primitive responses and event notifications to the SCU 34 for the port; and Control Information: Contains information concerning what actions to perform when primitives have been successfully processed on a given port.

A Mute primitive instructs the PSN 28 to cut or re-establish (mute/non-mute) the voice path between a given port and connected party in the direction of the port to the connected party. For example, in a call from A to B where A and B are talking, Mute (A) cuts the voice path from A to B, but the voice path from B to A is not affected in anyway. This means that A can hear B, but B cannot hear A. If the voice path is already cut in the specified direction, then receiving a Mute primitive will un-mute the connection or re-establish the voice path between the two ports. Parameters for the Mute primitive include:

Session ID: (described further below);

Instruction Tag: (described further below);

Port Information: Identifies the port to mute (if currently un-muted) or un-mute (if currently muted);

Billing Information: Contains information to update the port's billing records;

Port Service Information: Identifies the return address used to report primitive responses and event notifications to the SCU 34 for the port; and Control Information: Contains information concerning what actions to perform when primitives have been successfully processed on a given port.

A New Call Accepted primitive instructs the PSN 28 that a new call event notification was accepted and the port specified in the new call event notification will be controlled by the SCU 34 with further instructions. Parameters for the New Call Accepted primitive include:

Session ID: (described further below);

Instruction Tag: (described further below);

Port Information: Identifies the port that was accepted;

Billing Information: Contains information to update the port's billing records;

Port Service Information: Identifies the return address used to report primitive responses and event notifications to the SCU 34 for the port; and Control Information: Contains information concerning what actions to perform when primitives have been successfully processed on a given port.

A New Call Rejected primitive instructs the PSN 28 that a new call event notification was rejected and that the port specified in the new call event notification will not be controlled by the SCU 34. In this case the port will be routed to a PSN failure treatment. Parameters for the New Call Rejected primitive include:

Port Information: Identifies the port that was rejected; and

Billing Information: Contains information to update the port's billing records.

A Play Message primitive instructs the PSN 28 to connect a specified port to a message which may include either an announcement or a tone. The message being played is generally uninterruptible by the port. Parameters for the Play Message primitive include:

Session ID: (described further below);

Instruction Tag: (described further below);

Port Information: Identifies the port to play the message to;

Message Information: Identifies the message to play;

Billing Information: Contains information to update the port's billing records;

Port Service Information: Identifies the return address used to report primitive responses and event notifications to the SCU 34 for the port; and Control Information: Contains information concerning what actions to perform when primitives have been successfully processed on a given port.

A Play Prompt, Collect Digits & Report primitive instructs the PSN 28 to play a message (i.e., an announcement or a tone) and initiate digit collection on a specified port. Generally, the message may be interruptible and as soon as the first digit is dialed, the message stops and the digit collection on the port continues. Parameters for the Play Prompt, Collect Digits & Report primitive include:

Session ID: (described further below):
Instruction Tag: (described further below);
Port Information: Identifies the port to play the message to and collect digits from;
Digit Collection: Indicates the digits to collect;
Message Information: Identifies the message to play;
Billing Information: Contains information to update the port's billing records;
Port Service Information: Identifies the return address used to report primitive responses and event notifications to the SCU 34 for the port; and
Control Information: Contains information concerning what actions to perform when primitives have been successfully processed on a given port.

A Reconnect primitive instructs the PSN 28 to reestablish a connection between any two ports in a service call. Parameters for the Reconnect primitive include:

Session ID: (described further below);
Instruction Tag: (described further below);
Port Information: Identifies the "from" port (port A) in the connection;
Port Information: Identifies the "to" port (port B) in the connection;
Billing Information: Contains information to update the port's billing records;
Port Service Information: Identifies the return address used to report primitive responses and event notifications to the SCU 34 for the port; and
Control Information: Contains information concerning what actions to perform when primitives have been successfully processed on a given port.

A Set Billing Record primitive instructs the PSN 28 to update billing records for a specified port with given information. This primitive may be received at any time during the call to update the appropriate billing information for the given port. Parameters for the Set Billing Record primitive include:

Session ID: (described further below);
Instruction Tag: (described further below);
Billing Information: Contains information to update the port's billing records;
Port Service Information: Identifies the return address used to report primitive responses and event notifications to the SCU 34 for the port; and
Control Information: Contains information concerning what actions to perform when primitives have been successfully processed on a given port.

A Stop Message primitive instructs the PSN 28 to stop playing a message that is currently playing to one or more specified ports. If the port is connected only to the message and no other port, then the port is held. If the port is connected to other ports in addition to the message (i.e., was bridged to several other ports and the message), then it remains connected to the other ports and the bridged ports no longer hear the message. Parameters for the Stop Message primitive include:

Session ID: (described further below);
Instruction Tag: (described further below);
Port Information: Identifies the port that the message is played to;
Message Information: Identifies the message to be stopped;
Billing Information: Contains information to update the port's billing records;
Port Service Information: Identifies the return address used to report primitive responses and event notifications to the SCU 34 for the port; and
Control Information: Contains information concerning what actions to perform when primitives have been successfully processed on a given port.

A Transmit SigInfo primitive instructs the PSN 28 to transmit signaling information on a specified port. Parameters for the Transmit SigInfo primitive include:

Session ID: (described further below);
Instruction Tag: (described further below);
Port Information: Identifies the port to transmit signaling information on;
SigInfo Mask: Gives control to the SCU 34 over which of the optional SS7/PRI messages are reported to the SCU 34 in the Signaling Event notification;
Signaling Information: Contains information for one of the following: (i) digits to outpulse if the port is a per-trunk signaling (PTS) port; (ii) any SS7 message if the port is a Signaling System 7 (SS7)ISUP port; or (iii) any PRI message if the port is an ISDN primary rate (PRI) port;
Billing Information: Contains information to update the port's billing records;
Port Service Information: Identifies the return address used to report primitive responses and event notifications to the SCU 34 for the port; and
Control Information: Contains information concerning what actions to perform when primitives have been successfully processed on a given port.

In addition to sending messages having the individual call control primitives described above, the SCU 34 may send multiple primitives in a single message. These primitive instructions collectively are called macros. Following are some examples of macros.

If there are five parties in a service call at any given time, then a "take down call" macro can be implemented. This macro consists of five "Disconnect" primitives, one for each party in the call. Upon execution of this macro, the entire five party call is taken down. Another example would be the "Preempt" macro. Consider a call with parties A and B talking. The goal is for another party C to preempt this call, thus leaving B connected to a message and A now talking to C. This macro can be implemented by sending two primitives, namely a "Reconnect" primitive for A to C followed by a "Play Message" primitive for B.

It will be understood that execution of one primitive may or may not be completed by the PSN 28 before initiating execution of the next. For example, if a macro consists of a "Play Message" primitive followed by a "Connect" primitive, then the message (i.e., announcement) is started on the specified port. Immediately after, a "Connect" primitive is executed that aborts the message being played and connects the port to another destination trunk member.

2. Event Notifications

Figure 11:
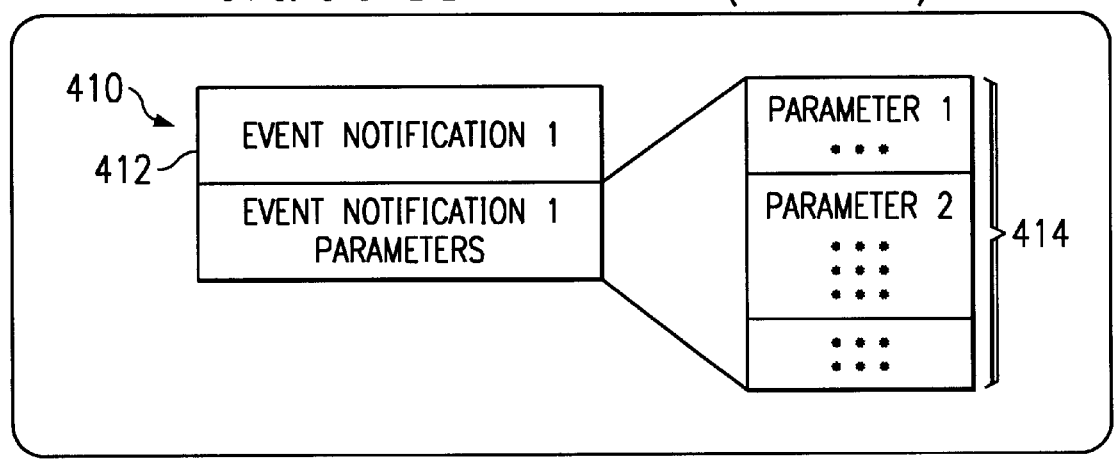
FIG. 11 illustrates packaging of an event notification.

FIG. 11 illustrates a format for a message 410 from the PSN 28 to the SCU 34 containing event notification information. The message 410 includes an event notification field 412 containing an identifier of the event, and a parameters field 414 containing one or more parameters holding appropriate information for the particular event.

The PSN 28 uses event notification messages to notify the SCU 34 of events on the port(s) that are involved in a service call. The events that occur at the programmable switch matrix 24 may be in response to the SCU 34 primitive/macro instruction or as a result of a peripheral event on a port. An event notification message is used to report a port event to the SCU 34 in response to a primitive. Accordingly, each primitive in a macro will have its own corresponding event notification message reported to the SCU.

In accordance with one embodiment of the present invention, the following describes event notification messages that are sent by the PSN 28 to the SCU 34. For each event notification, one or more informational parameters are included in the message. The description of each of the following event notifications also includes an identification of particular parameters associated with the event notification. Parameters, and their content, are described in more detail further below.

A Digits Collected event notification message is reported to the SCU 34 when (i) the PSN 28 has collected the specified number of digits from the specified port, (ii) an end delimiter has been dialed by the user on the specified port, or (iii) the digit collection has timed out. This event notification is sent in response to the following primitives received from the SCU 34: Collect Digits & Report; and Play Prompt, Collect Digits & Report. Parameters for the Digits Collected event notification include:

Session ID: (described further below);
  Instruction Tag: (described further below);
  Port Information: Identifies the port on which digits were collected; and
  Digits Collected: Indicates the digits that were collected.

An Error Detected event notification message is reported to the SCU 34 when the PSN 28 detects an error. Examples include an error detected while parsing an incoming message from the SCU 34, unavailable resources on the PSN 28 to complete the execution of the received instruction, internal processing and resource errors on the PSN 28, hardware failures, force releases, etc. The Error Detected event notification may be sent in response to any SCU primitive. This notification may also be received from the SCU to report a non-fatal error. Parameters for the Error Detected event notification include:

Session ID: (described further below);
  Instruction Tag: (described further below);
  Port Information: Identifies the port on which the error occurred;
  Error Cause: Identifies the cause for error;
  Port Status: Indicates the status of the port that is in error;
  Instruction ID: Identifies the instruction in error; and
  Parameter ID: Identifies the parameter in error.

An Instruction Completed event notification message is reported to the SCU 34 when the PSN 28 has completed action on a received primitive. This event notification is sent in response to any of the following primitives received from the SCU 34: Bridge, Collect Digits & Report, Disconnect, Hold, Monitor, Mute, Play Message, Play Prompt, Reconnect, Reset Switch, Set Billing Record, Set IP Address, Stop Message, Transmit SigInfo. Parameters for the Instruction Completed event notification include:

Session ID: (described further below);
  Instruction Tag: (described further below);
  Port Information: Identifies the port on which the specified instruction was executed;
  Error Type: Indicates whether a fatal or non-fatal error has occurred;
  Port Status: Indicates the status of the port; and
  Instruction ID: Identifies the instruction that was executed.

A Message Played event notification message is reported to the SCU 34 when the message on a specified port has ended (i.e., finished playing). This event notification is sent in response to the Play Message primitive received from the SCU 34. Parameters for the Message Played event notification include:

Session ID: (described further below);
  Instruction Tag: (described further below); and
  Port Information: Identifies the port on which the message was played.

A New Call event notification message is reported to the SCU 34 when an agent (port) is to be controlled by the SCU 34 (by triggering). Parameters for the New Call event notification include:

Switch ID: Identifies the programmable switch matrix;
  Port Information: Identifies the port(s) in a call when it is determined that the call is to be controlled by the SCU 34. This parameter consists of the port information for all the ports that are currently involved in this call and may be provided in one or more Port Information parameters;
  Digits Collected: Indicates the digits collected information up to this point in the service call. Examples of this type of information include automatic number identification (ANI), authorization code (Authcode), personal identification number (PIN), account code, called number, international digits (i.e., the facility code, country code and the language digit), etc.;
  Point In Call: Indicates the time when it was determined that the SCU 34 should be queried;
  Access Type: Identifies the type of the port(s) and the trunk type;
  Call Type: Indicates the type of call;
  Bearer Capability: Indicating the bearer capability of the call;
  Signaling Information: Includes information concerning either (i) an SS7 message if the port is a SS7/ISUP port, or (ii) a PRI message if the port is an ISDN/PRI port.
  Flow Control Encountered: Indicates that flow control is active and identifies the source (PSN or SCU) that initiated the flow control.
  Serving Translations Scheme: Identifies the serving translations scheme of the service call.

An Off-Hook event notification message is reported to the SCU 34 when a specified port goes off-hook or answers. Parameters for the Off-Hook event notification include:

Session ID: (described further below);
  Instruction Tag: Contains a value indicating this is an asynchronous event notification (described further below);
  Port Information: Identifies the port that went off-hook or answered; and
  Signaling Information: Includes either (i) an answer message (ANM) if the port is a SS7/ISUP port, or (ii) a CONNECT message if the port is an ISDN/PRI port.

A On-Hook event notification message is reported to the SCU 34 when a specified port goes on-hook or is released. Parameters for the On-Hook event notification include:

Session ID: (described further below);

Instruction Tag: Contains a value indicating this is an asynchronous event notification (described further below);

Port Information: Identifies the port that went on-hook or released; and

Signaling Information: Includes either (i) release (REL) message if the port is a SS7/ISUP port, or (ii) disconnect (DISC) message if the port is an ISDN/PRI port.

A Route Not Available event notification message is reported to the SCU 34 when none of the trunk members (or ports) of a specified terminating trunk group are idle. This event notification is sent in response to the "Connect" primitive. Parameters for the Route Not Available event notification include:

Session ID: (described further below);

Instruction Tag: (described further below); and

Port Information: Identifies the port to which the terminator was supposed to be connected.

A Route Selected event notification message is reported to the SCU 34 when a valid terminating trunk group is identified and a member (port) of that terminating trunk group is found idle and that member is seized. This event notification is sent in response to the "Connect" primitive. Parameters for the Route Available event notification include:

Session ID: (described further below);

Instruction Tag: (described further below);

Port Information: Identifies the port to which the terminating trunk agency is connected; and Port Information: Identifies the new terminating trunk agency/port.

A Signaling Event event notification message is reported to the SCU 34 when a port involved in a service call receives a signaling message on its peripheral. Parameters for the Signaling Event event notification may include:

Session ID: (described further below);

Instruction Tag: Contains a value indicating this is an asynchronous event notification (described further below);

Port Information: Identifies the port on which the signaling information was received; and Signaling Information: Includes one of the following: (i) indicates the digits were outpulsed on the PTS trunk agent, (ii) any SS7 message (other than ANM and REL) if the port is a SS7/ISUP port, and (iii) any PRI message (other than CONNECT and DISC) if the port is an ISDN/PRI port.

A Tone Detected event notification message is reported to the SCU 34 when a specified tone/digit is detected on the given port. This event notification is sent in response to the "Monitor" primitive. Parameters for the Tone Detected event notification include:

Session ID: (described further below);

Instruction Tag: (described further below);

Port Information: Identifies the port on which the tone/digit was detected;

Tone Detected: Indicates the tone or digit that was detected.

3. Parameters

The following is a description of parameters which are generally applicable to primitive and/or event notification messages. Any parameter having application to specific message will be described below in relation to the respective primitive or event notification.

The Access Type parameter is utilized in the "New Call" event notification and contains the originating trunk information. It will be understood that the Access Type field for indicating the access type of the port may be encoded as follows:

| Bit Pattern | Indication |
| --- | --- |
| 0 0 0 0 0 | Unused (Spare) |
| 0 0 0 0 1 | PTS FGD |
| 0 0 0 1 0 | SS7 FGD |
| 0 0 0 1 1 | DAL 4-wire |
| 0 0 1 0 0 | DAL 2-wire |
| 0 0 1 0 1 | PRI |
| 0 0 1 1 0 to 1 1 1 1 1 | Unused (Spare) |

As will be appreciated, other Access types and bit patterns may be utilized to describe the access format of the call.

The Bearer Capability parameter contains the bearer capability information. This parameter includes a Bearer Capability field for indicating the speed and type of information that is to be carried by the call. It will be understood that the Bearer Capability parameter may be encoded as follows:

| Bit Pattern | Indication |
| --- | --- |
| 0 0 0 0 | Not Used |
| 0 0 0 1 | Speech |
| 0 0 1 0 | 64K data |
| 0 0 1 1 | 64k X25 |
| 0 1 0 0 | 56k Data |
| 0 1 0 1 | Data Unit |
| 0 1 1 0 | 64K Restricted |
| 0 1 1 1 | 3.1 kHz |
| 1 0 0 0 | 7 kHz |
| 1 0 0 1 | Voice Data |
| 1 0 1 0 | 64K Rate Data |
| 1 0 1 1 to 1 1 1 1 | Spare values |

As will be appreciated, other speed and information type descriptions may be included depending on the data communications utilized, and other bit patterns may also be used.

The Billing Information parameter contains the billing information for the port in the service call. This parameter may be used to update multiple billing record fields for a port. Parameter contents may include:

Port Information Field: Identifies the port whose billing records are to be updated. The external trunk group number and the trunk member number are specified in the port information.

Number of Billing Information field: Indicates the number of billing information sub-parameters to follow. Each billing information sub-parameter consists of the billing info type and the billing information contents.

Billing Information Type field: Indicates how to interpret the billing information contents. Each application may define its own set of types. The billing information contents are interpreted depending upon the type. The following are examples of billing information types:

| Bit Pattern | Indication |
| --- | --- |
| 0 0 0 0 0 0 0 0 | Unknown |
| 0 0 0 0 0 0 0 1 | Call Reference ID |

| Bit Pattern | Indication |
|---|---|
| 0 0 0 0 0 0 1 0 to<br>1 1 1 1 1 1 1 1 | Spare Values |

Billing Information Contents field: Includes the billing information to place in the billing record.

The Call Reference ID (CRID) parameter is used for the transport of a call reference identifier. The CRID is encoded in a variable length digits field with the digits encoded in telephony binary coded decimal (TBCD) format. The valid range of digits for the CRID parameter is 1 to 9 digits. Parameter contents may include:

Number of Digits field: Indicating the number of CRID digits. Valid values include 1 to 9.

1 to 9 Digit fields: Each containing one digit in the TBCD format (for dual tone multifrequency (DTMF), which may be encoded as follows:

| Bit Pattern | Indication |
|---|---|
| 0 0 0 0 | Filler |
| 0 0 0 1 | Digit 1 |
| 0 0 1 0 | Digit 2 |
| 0 0 1 1 | Digit 3 |
| 0 1 0 0 | Digit 4 |
| 0 1 0 1 | Digit 5 |
| 0 1 1 0 | Digit 6 |
| 0 1 1 1 | Digit 7 |
| 1 0 0 0 | Digit 8 |
| 1 0 0 1 | Digit 9 |
| 1 0 1 0 | Digit 0 |
| 1 0 1 1 | * |
| 1 1 0 0 | # |
| 1 1 0 1 | D |
| 1 1 1 0 | E |
| 1 1 1 1 | F |

The Call Type parameter contains the call type for the call when the PSN 28 determines that the call is to be controlled by the SCU 34. The contents are definable by the applications. This parameter includes a Call Type field giving information on the type of call being made. Each application may define its own call type based on the application's needs. Values given below are examples of call types:

| Bit Pattern | Indication |
|---|---|
| 0 0 0 0 0 0 | Undetermined |
| 0 0 0 0 0 1 | Onnet |
| 0 0 0 0 1 0 | Offnet |
| 0 0 0 0 1 1 | Public Speed |
| 0 0 0 1 0 0 | Private Speed |
| 0 0 0 1 0 1 | Hotline Speed |
| 0 0 0 1 1 0 | N00 |
| 0 0 0 1 1 1 | Zero Plus - Onnet |
| 0 0 1 0 0 0 | Zero Plus - Offnet |
| 0 0 1 0 0 1 | INTOA |
| 0 0 1 0 1 0 to<br>1 1 1 1 1 1 | Spares |

The Control Information parameter includes information relating to the action(s) to be taken if and when a primitive was successfully processed. Parameter contents include:

Trunk Group Number field: Identifies the trunk group number (plurality of bits);

Trunk Member Number field: Identifies the member of the trunk group number (plurality of bits); and Send Instruction Completed Events field: A boolean for indicating whether the should or should not send any "Instruction Completed" event notification when an instruction is completed (1 bit, "1"—send all "Instruction Completed" events, "0" —do not send any "Instruction Completed" events).

The Destination Trunk Group parameter contains the external trunk group number of the trunk to which a call should be routed. The call terminates to an idle member of this trunk group. Parameter contents may include:

Trunk Group Number field: Identifies the external trunk group number (plurality of bits).

The Digit Collection parameter contains information required to collect digits on a specified port. Parameter contents may include:

Minimum digits field: Contains the minimum number of digits to collect.

Values may be between 0 to 45, for example:

| Bit Pattern | Indication |
|---|---|
| 0 0 0 0 0 0 | Minimum number to collect is 0 |
| 0 0 0 0 0 1 | Minimum number to collect is 1 |
| ... | |
| 0 0 1 1 0 0 | Minimum number to collect is 12 |
| ... | |
| 1 0 1 1 1 0 to<br>1 1 1 1 1 1 | Unused (Spare Values) |

Maximum Digits field: Contains the maximum number of digits to collect. Values may be between 0 to 45, for example:

| Bit Pattern | Indication |
|---|---|
| 0 0 0 0 0 0 | Maximum number to collect is 0 |
| 0 0 0 0 0 1 | Maximum number to collect is 1 |
| ... | |
| 0 1 0 1 0 0 | Maximum number to collect is 20 |
| ... | |
| 1 0 1 1 1 0 to<br>1 1 1 1 1 1 | Unused (Spare Values) |

End Delimiter field: Contains the delimiter and if the delimiter is dialed the digit collection will stop. If the delimiter is dialed as the very first digit then the digit collection will stop immediately. The delimiter digit values may include:

| Bit Pattern | Indication |
|---|---|
| 0 0 0 | no delimiter specified |
| 0 0 1 | * |
| 0 1 0 | # |
| 0 1 1 | * and # |
| 1 0 0 to 1 1 1 | Spare |

First Digit Timer field: Specifies the time to wait until the first digit is dialed. Valid values may be between 2 to 30 seconds, for example:

| Bit Pattern | Indication |
|---|---|
| 0 0 0 0 0 0 | Unused (Spare) |
| 0 0 0 0 0 1 | Unused (Spare) |
| 0 0 0 0 1 0 | Timer Value = 2 second |
| ... | |
| 0 1 1 1 1 0 | Timer Value = 30 seconds |

-continued

| Bit Pattern | Indication |
| --- | --- |
| 0 1 1 1 1 1 to<br>1 1 1 1 1 1 | Unused (Spare) |

Inter Digit Timer field: Specifies the inter digit timer value, i.e., the time to wait when collecting the second and subsequent digits. Values may be between 1 to 20 seconds, for example:

| Bit Pattern | Indication |
| --- | --- |
| 0 0 0 0 0 0 | Unused (Spare) |
| 0 0 0 0 0 1 | Timer Value = 1 second |
| . . . | |
| 0 1 0 1 0 0 | Timer Value = 20 seconds |
| 0 1 0 1 0 1 to<br>1 1 1 1 1 1 | Unused (Spare) |

Discard Buffered Digits field: Is a boolean which if true indicates that if the PSN 28 had been buffering any digits prior to receiving this parameter, then the digits should be discarded and digit collection should start all over again.

The Digits Collected parameter contains the digits collected or received on the port/agent. The digits contained in this parameter are in the TBCD format. Also, included is a Count field which specifies the number of digits included in this parameter. Parameter contents may include:

Type of Digits field: Contains information about the digits collected, for example, encoded as given below. The type of digits is known when the collected digits are sent in the New Call event notification. When this parameter is sent in the Digits Collected event notification, a value of "Unknown" is used.

| Bit Pattern | Indication |
| --- | --- |
| 0 0 0 0 0 0 0 0 | Unknown |
| 0 0 0 0 0 0 0 1 | Called Party Address |
| 0 0 0 0 0 0 1 0 | Calling Patty Address (ANI) |
| 0 0 0 0 0 0 1 1 | Caller Interaction |
| 0 0 0 0 0 1 0 0 | Routing Number |
| 0 0 0 0 0 1 0 1 | Billing Number |
| 0 0 0 0 0 1 1 0 | Destination Number |
| 0 0 0 0 0 1 1 1 | Local Access and Transport Area (LATA) |
| 0 0 0 0 1 0 0 0 | Carrier Identification |
| 0 0 0 0 1 0 0 1 | Referral Number |
| 0 0 0 0 1 0 1 0 | True Billing Number |
| 0 0 0 0 1 0 1 1 | Alternate Preferred Carrier |
| 0 0 0 0 1 1 0 0 | Preferred INC |
| 0 0 0 0 1 1 0 1 | Primary Preferred Carrier |
| 0 0 0 0 1 1 1 0 | Personal ID Number (PIN) |
| 0 0 0 0 1 1 1 1 | Authorization Code |
| 0 0 0 1 0 0 0 0 | TCM |
| 0 0 0 1 0 0 0 1 | Second Alternate Preferred Carrier |
| 0 0 0 1 0 0 1 0 | Business Customer ID |
| 0 0 0 1 0 0 1 1 | Hop-off Office |
| 0 0 0 1 0 1 0 0 | Outpulse Number |
| 0 0 0 1 0 1 0 1 | Originating Station (DN) |
| 0 0 0 1 0 1 1 0 | MCCS Card Number |
| 0 0 0 1 0 1 1 1 | Account Code Number |
| 0 0 0 1 1 0 0 0 | COSOVE Number |
| 0 0 0 1 1 0 0 1 | Generic Digits Number |
| 0 0 0 1 1 0 1 0 | Dialed Digits Number |
| 0 0 0 1 1 0 1 1 | Facility Code |
| 0 0 0 1 1 1 0 0 | Country Code |
| 0 0 0 1 1 1 0 1 | Language Digit |

-continued

| Bit Pattern | Indication |
| --- | --- |
| 0 0 0 1 1 1 1 0 to<br>1 1 1 1 1 1 1 1 | Spare Values |

Nature of Number field: Includes information about the nature of the number (digits) collected, and may be encoded as follows:

| Bit Pattern | Indication |
| --- | --- |
| 0 0 0 0 0 0 0 0 | Not Applicable |
| 0 0 0 0 0 0 0 1 | International |
| 0 0 0 0 0 0 1 0 | National |
| 0 0 0 0 0 0 1 1 | Network Specific |
| 0 0 0 0 0 1 0 0 to<br>1 1 1 1 1 1 1 1 | Spare Values |

Number of Digits field: Contains the number of digits that are sent in this parameter. This number may be as low as 1 and as high as 45.

Encoding Scheme field: Contains the scheme used to encode the digits that are sent in this parameter and may be encoded as follows:

| Bit Pattern | Indication |
| --- | --- |
| 0 0 0 0 | Unknown |
| 0 0 0 1 | Binary Coded Decimal (BCD) |
| 0 0 1 0 to<br>1 1 0 1 | Spare Values |
| 1 1 1 0 | Telephony Binary Coded Decimal (TBCD) |
| 1 1 1 1 | Spare |

Numbering Plan field: Contains information about the numbering plan, and may be encoded as follows:

| Bit Pattern | Indication |
| --- | --- |
| 0 0 0 0 | Unknown or Not Applicable |
| 0 0 0 1 | ISDN Numbering Plan (E.164) |
| 0 0 1 0 | Telephony Numbering Plan (E.163) |
| 0 0 1 1 | Data Numbering Plan (X.121) |
| 0 1 0 0 | Telex Numbering Plan (F.69) |
| 0 1 0 1 | Maritime Mobile Numbering Plan (E.120,211) |
| 0 1 1 0 | Land Mobile Numbering Plan (E.212,213) |
| 0 1 1 1 to<br>1 1 0 1 | Spare Values |
| 1 1 1 0 | Private |
| 1 1 1 1 | Reserved |

1st to nth Digit field: Each containing one digit that may be encoded in the TBCD format (for dual tone multi-frequency (DTMF)).

The Digits To Outpulse parameter contains the digits to be outpulsed on a per-trunk signaling (PTS) trunk agent. Parameter contents may include: Number of Digits field: Contains the number of digits that are to be outpulsed on this port. Generally, the range for this field is 1 to 23.

1st to nth Digit field: Contains the n digits, and may be encoded in the TBCD format (for DTMF), or encoded as follows for multifrequency (MF):

| Bit Pattern | Indication |
| --- | --- |
| 0 0 0 0 | Filler |
| 0 0 0 1 | Digit 1 |
| 0 0 1 0 | Digit 2 |
| 0 0 1 1 | Digit 3 |
| 0 1 0 0 | Digit 4 |
| 0 1 0 1 | Digit 5 |
| 0 1 1 0 | Digit 6 |
| 0 1 1 1 | Digit 7 |
| 1 0 0 0 | Digit 8 |
| 1 0 0 1 | Digit 9 |
| 1 0 1 0 | Digit 0 |
| 1 0 1 1 | Key pulse triple prime (KP3) and start translation triple prime (ST3P) |
| 1 1 0 0 | Key pulse prime (KPP) and start translation prime (STP) |
| 1 1 0 1 | Key pulse (KP) and STKP |
| 1 1 1 0 | Key pulse double prime (KP2) and start translation double prime (ST2P) |
| 1 1 1 1 | start translation (ST) |

If multiple Digits To Outpulse parameters are contained in a message, then multiple streams of digits are outpulsed on the agent/port, each stream being contained in one parameter of type Digits to Outpulse.

The Digits Outpulsed parameter provides information about the digits that were outpulsed on a PTS trunk agent. This is especially useful in multi-stage outpulsing. This parameter is included in the "Signaling Event" event notification message to inform the SCU 34 that all the digits were outpulsed on the trunk agency. This parameter includes a Digits Outpulsed field which may be encoded as follows:

| Bit Pattern | Indication |
| --- | --- |
| 0 0 0 | Unknown |
| 0 0 1 | all streams outpulsed |
| 0 1 0 to 1 1 1 | Spare |

The Error Cause parameter contains the cause of an error that was detected in the PSN 28. Parameter contents may be encoded as follows:

| Bit Pattern | Indication |
| --- | --- |
| 0 0 0 0 0 0 0 0 | NIL Error Cause |
| 0 0 0 0 0 0 0 1 | Header decode failure |
| 0 0 0 0 0 0 1 0 | Bad macro tag |
| 0 0 0 0 0 0 1 1 | Unrecognized primitive |
| 0 0 0 0 0 1 0 0 | Missing mandatory parameter |
| 0 0 0 0 0 1 0 1 | Mandatory parameter decode failure |
| 0 0 0 0 0 1 1 0 | Optional parameter decode failure |
| 0 0 0 0 0 1 1 1 | Parameter contents out of range |
| 0 0 0 0 1 0 0 0 | Primitive userclass mismatch |
| 0 0 0 0 1 0 0 1 | Maximum primitive exceeded |
| 0 0 0 0 1 0 1 0 | Missing mandatory Siginfo parameter |
| 0 0 0 0 1 0 1 1 | One or more agents in the primitive are not SN agents |
| 0 0 0 0 1 1 0 0 | Port not in table PSNROUTE |
| 0 0 0 0 1 1 0 1 | Agent not supported |
| 0 0 0 0 1 1 1 0 | Port down due to WARM restart |
| 0 0 0 0 1 1 1 1 | Primitive invalid for current port state |
| 0 0 0 1 0 0 0 0 | Unexpected message |
| 0 0 0 1 0 0 0 1 | STR not available (affects the Monitor primitive) |
| 0 0 0 1 0 0 1 0 | UTR not available |
| 0 0 0 1 0 0 1 1 | Conference circuit not available |
| 0 0 0 1 0 1 0 0 | No IDLE message |
| 0 0 0 1 0 1 0 1 | Primitive extension block not available |
| 0 0 0 1 0 1 1 0 | Scratchpad extension block not available |
| 0 0 0 1 0 1 1 1 | Software Resources unavailable |
| 0 0 0 1 0 0 0 0 | Message failure |
| 0 0 0 1 0 0 0 1 | Software error |
| 0 0 0 1 0 0 1 0 | Not minimum number ports to Bridge |
| 0 0 0 1 0 0 1 1 | Maximum ports to Bridge exceeded |
| 0 0 0 1 1 1 0 0 | Bearer capacity incompatible |
| 0 0 0 1 1 1 0 1 | Message index not in table PSNMSGIX |
| 0 0 0 1 1 1 1 0 | Unsupported signaling type |
| 0 0 0 1 1 1 1 1 | Duplicate message |
| 0 0 1 0 0 0 0 0 | Bad agent state |
| 0 0 1 0 0 0 0 1 | Termination failure |
| 0 0 1 0 0 0 1 0 | Abnormal exit |
| 0 0 1 0 0 0 1 1 | Message not playing |
| 0 0 1 0 0 1 0 0 | Tone duration unsupported |
| 0 0 1 0 0 1 0 1 | Prompt failure |
| 0 0 1 0 0 1 1 0 | Digit collection failure |
| 0 0 1 0 0 1 1 1 | Q764 protocol problem |
| 0 0 1 0 1 0 0 0 | Invalid duration gap |
| 0 0 1 0 1 0 0 1 | Unexpected FC message |
| 0 0 1 0 1 0 1 0 | Agent not in Table TRKGRP |

The Error Type parameter contains information identifying whether a detected error is fatal or non-fatal, and may be encoded as follows:

| Bit Pattern | Indication |
| --- | --- |
| 0 0 | Non Fatal Error |
| 0 1 | Fatal Error |

Fatal errors are defined as errors that are so severe that they do not allow normal call processing to proceed on the port. If the error that is detected is non-fatal, then the PSN 28 does not take any action other than report this error to the SCU 34. If the error that is detected is fatal, then the PSN 28 reports the error to the SCU 34 and takes down the associated port.

The Flow Control Information parameter contains programmable time periods for control of Duration and Gap. Duration refers to the maximum amount of time the flow controls is effective at the PSN 28 and Gap refers to the maximum rate at which "New Call" event notifications may be sent to the SCU 34 while the control is effective. This parameter includes:

Control Duration field: Contains the amount of time the flow control is effective at the PSN 28, and may be encoded as follows:

| Bit Pattern | Indication |
| --- | --- |
| 0 0 0 0 | Not Used |
| 0 0 0 1 | 1 second |
| 0 0 1 0 | 2 seconds |
| 0 0 1 1 | 4 seconds |
| 0 1 0 0 | 8 seconds |
| 0 1 0 1 | 16 seconds |
| 0 1 1 0 | 32 seconds |
| 0 1 1 1 | 64 seconds |
| 1 0 0 0 | 128 seconds |
| 1 0 0 1 | 256 seconds |
| 1 0 1 0 | 512 seconds |
| 1 0 1 1 | 1024 seconds |
| 1 1 0 0 | 2048 seconds |
| 1 1 0 1 to 1 1 1 1 | Spare |

Control Gap field: Contains the maximum rate at which the New Call event notifications may be sent to the SCU 34, and may be encoded as follows:

| Bit Pattern | Indication |
| --- | --- |
| 0 0 0 0 | Remove Gap Control |
| 0 0 0 1 | 0.1 second |
| 0 0 1 0 | 0.3 second |
| 0 0 1 1 | 0.5 second |
| 0 1 0 0 | 1 second |
| 0 1 0 1 | 2 seconds |
| 0 1 1 0 | 5 seconds |
| 0 1 1 1 | 10 seconds |
| 1 0 0 0 | 15 seconds |
| 1 0 0 1 | 30 seconds |
| 1 0 1 0 | 50 seconds |
| 1 0 1 1 | 80 seconds |
| 1 1 0 0 | 120 seconds |
| 1 1 0 1 | 300 seconds |
| 1 1 1 0 | 600 seconds |
| 1 1 1 1 | Stop all calls |

The Flow Control Encountered parameter contains information that informs the SCU 34 that the flow control is active and identifies the source that initiated the flow control, and may be encoded as follows:

| Bit Pattern | Indication |
| --- | --- |
| 0 | Flow control initiated by SCU |
| 1 | Flow control initiated by PSN |

The Instruction ID parameter contains the identifier of the primitive that was received from the SCU 34. This parameter may be encoded, for example, as follows:

| Bit Pattern | Indication |
| --- | --- |
| 0 0 0 0 0 0 0 0 | Unknown |
| 0 0 0 0 0 0 0 1 | Bridge |
| 0 0 0 0 0 0 1 0 | Collect Digits & Report |
| 0 0 0 0 0 0 1 1 | Connect |
| 0 0 0 0 0 1 0 0 | Disconnect |
| 0 0 0 0 0 1 0 1 | Hold |
| 0 0 0 0 0 1 1 0 | Monitor |
| 0 0 0 0 0 1 1 1 | Mute |
| 0 0 0 0 1 0 0 0 | New Call Accepted |
| 0 0 0 0 1 0 0 1 | New Call Rejected |
| 0 0 0 0 1 0 1 0 | Play Message |
| 0 0 0 0 1 0 1 1 | Play Prompt, Collect Digits & Report |
| 0 0 0 0 1 1 0 0 | Query Port |
| 0 0 0 0 1 1 0 1 | Reconnect |
| 0 0 0 0 1 1 1 0 | Reset Switch |
| 0 0 0 0 1 1 1 1 | Set Billing Record |
| 0 0 0 1 0 0 0 0 | Set Port Service Information |
| 0 0 0 1 0 0 0 1 | Stop Message |
| 0 0 0 1 0 0 1 0 | Transmit SigInfo |
| 0 0 0 1 0 0 1 1 | Heartbeat |
| 0 0 0 1 0 1 0 0 | Query time of Day |
| 0 0 0 1 0 1 0 1 | Error Detected |
| 0 0 0 1 0 1 1 0 | Port Status |
| 0 0 0 1 0 1 1 1 | Flow Control |
| 0 0 0 1 1 0 0 0 to 1 1 1 1 1 1 1 1 | Spare Values |

Instruction Tag parameter contains the tag associated with respective primitive instructions and event notifications. For primitives that are sent from the SCU 34, the SCU 34 generates an Instruction Tag and sends it to the PSN 28 in this parameter. When a response for this primitive is generated by the PSN 28, the PSN 28 includes this tag in the response so that the SCU 34 may correlate the response with the primitive request that it had sent earlier. For asynchronous event notifications (e.g., On-Hook, Off-Hook and Signalling Event) generated by the PSN 28, the Instruction Tag is hard-coded to #01. For event notifications that are generated by the PSN 28 that require a reply from the SCU 34 (e.g., New Call, Query Port from the Audit application), the PSN 28 sends a nil Instruction Tag. This parameter may include, and may be encoded, as follows:

| Bit Pattern | Indication |
| --- | --- |
| 0 0 0 0 0 0 0 0 | nil instruction tag |
| 0 0 0 0 0 0 0 1 | Asynchronous Event Notification from the PSN |
| 0 0 0 0 0 0 1 0 to 1 1 1 1 1 1 1 1 | Valid tags for primitives from the SCU |

The Message Information parameter contains the Message ID and the Cycles/Tone Duration information. The Message ID may be a value that is used to index into a PSN message table which returns either an index into an Announcement table (if the message ID corresponds to an announcement) or a Tone table (if the message ID corresponds to a tone). This parameter may comprise two bytes to provide the following content:

Message ID field: Identifies the particular message.

Cycles field: Identifies the number of cycles the message should be played, if the Message ID corresponds to an announcement, and may be encoded as follows:

| Bit Pattern | Indication |
| --- | --- |
| 0 0 0 0 0 0 0 0 | Play Announcement indefinitely |
| 0 0 0 0 0 0 0 1 | Play Announcement for 1 cycle |
| ... | |
| 0 0 0 1 1 1 1 0 | Play Announcement for 30 cycles |
| 0 0 0 1 1 1 1 1 to 1 1 1 1 1 1 1 1 | Play Announcement indefinitely |

Tone Duration field: Specifies the duration of the tone if the Message ID corresponds to a tone, and may be encoded as follows:

| Bit Pattern | Indication |
| --- | --- |
| 0 0 0 0 0 0 0 0 | Play the Tone forever. |
| 0 0 0 0 0 0 0 1 | Invalid |
| 0 0 0 0 0 0 1 0 | Invalid |
| 0 0 0 0 0 0 1 1 | Play the Tone for 3 seconds |
| ... | |
| 1 1 1 1 1 1 1 1 | Play the Tone for 255 seconds |

The values for the cycles or tone duration may be set to any value when the Message Information parameter is sent in the Stop Message primitive. The Stop Message primitive only cares about the message ID (i.e., to stop the appropriate message on the PSN) in the Message Information parameter.

The Monitor Mask parameter is a bitmap of monitor values. Each bit in this bitmap indicates the digit or tone to monitor or not monitor for a port. Each bit has two values— "0" indicating cancel the monitor or "1" indicating to start monitor. Parameter contents may include:

Tone Bitmap field: Containing three bits, each bit is a boolean for respective BBF, Octothorpe, and Asterisk monitoring. If the boolean is true then the port is monitored for the appropriate tone/digit. If the boolean is false then the appropriate tone/digit monitoring on that port is cancelled.

Octothorpe Duration field and Asterisk duration field: Indicates the duration in 100 milliseconds for which the octothorpe/asterisk has to be detected before it is reported as a valid tone/digit to the SCU 34. For example, a duration of 5 for an Asterisk implies that the user has to hold down the asterisk for 500 msecs before it is detected as a valid asterisk by the PSN 28 and reported to the SCU 34. Note for BBF that the SF Tone Duration, the signalling type (MF/DTMF), the minimum digits to collect before a blue box fraud is declared and the partial dial timer values are all determined from a lookup table.

The Parameter ID parameter contains the identifier of the parameter (and the identifier of the sub-parameter if the parameter is composed of sub parameters). It is returned to the SCU 34 in case the decoding of the parameter resulted in an error. This parameter may include:

Parameter ID field: Used to identify the parameter in error, and may be encoded as follows:

| Bit Pattern | Indication |
| --- | --- |
| 0 0 0 0 0 0 0 0 | Unknown |
| 0 0 0 0 0 0 0 1 | Bearer Capability |
| 0 0 0 0 0 0 1 0 | Billing Information |
| 0 0 0 0 0 0 1 1 | CallP Data Control |
| 0 0 0 0 0 1 0 0 | Call Reference Identifier |
| 0 0 0 0 0 1 0 1 | Control Information |
| 0 0 0 0 0 1 1 0 | Destination Trunk Group |
| 0 0 0 0 0 1 1 1 | Digit Collection |
| 0 0 0 0 1 0 0 0 | Digits Collected |
| 0 0 0 0 1 0 0 1 | Digits Outpulsed |
| 0 0 0 0 1 0 1 0 | Digits To Outpulse |
| 0 0 0 0 1 0 1 1 | Error Cause |
| 0 0 0 0 1 1 0 0 | Flow Control Information |
| 0 0 0 0 1 1 0 1 | Flow Control Encountered |
| 0 0 0 0 1 1 1 0 | Instruction ID |
| 0 0 0 0 1 1 1 1 | Instruction Tag |
| 0 0 0 1 0 0 0 0 | Message Information |
| 0 0 0 1 0 0 0 1 | Monitor Mask |
| 0 0 0 1 0 0 1 0 | Parameter ID |
| 0 0 0 1 0 0 1 1 | Port Count |
| 0 0 0 1 0 1 0 0 | Port Information |
| 0 0 0 1 0 1 0 1 | Port Service Information |
| 0 0 0 1 0 1 1 0 | Port Status |
| 0 0 1 0 1 1 1 1 | Reset Reason |
| 0 0 0 1 1 0 0 0 | Session ID |
| 0 0 0 1 1 0 0 1 | SigInfo Mask |
| 0 0 0 1 1 0 1 0 | Signaling Information |
| 0 0 0 1 1 0 1 1 | Switch ID |
| 0 0 0 1 1 1 0 0 | Time of Day |
| 0 0 0 1 1 1 0 1 | Tone Detected |
| 0 0 0 1 1 1 1 0 to 1 0 0 0 0 0 0 1 | Spare Values |
| 1 0 0 0 0 0 1 0 | UCS Points In Call |
| 1 0 0 0 0 0 1 1 | UCS STS |
| 1 0 0 0 0 1 0 0 to 1 1 1 1 1 1 1 1 | Spare Values |

Sub Parameter ID field: Used to identify the parameter in error, and may be encoded as follows:

| Bit Pattern | Indication |
| --- | --- |
| 0 0 0 0 0 0 0 0 | Unknown |
| 0 0 0 0 0 0 0 1 | Message Type |
| 0 0 0 0 0 0 1 0 | Digits Outpulsed |
| 0 0 0 0 0 0 1 1 | Digits To Outpulse |
| 0 0 0 0 0 1 0 0 | PTS Off-Hook |
| 0 0 0 0 0 1 0 1 | PTS On-Hook |
| 0 0 0 0 0 1 1 0 to 1 1 1 1 1 1 1 1 | Spare |

The Point In Call parameter contains the point in the call when all criteria were met and the PSN 28 determined that the call is to be controlled by the SCU 34. Parameter contents may include:

Point In Call field: Contains the point in the call, when the PSN determines that the call is a service call and needs to be controlled by the SCU. It is encoded as follows:

| Bit Pattern | Indication |
| --- | --- |
| 0 0 0 0 0 | Not Used |
| 0 0 0 0 1 | Orig Null |
| 0 0 0 1 0 | Authorize Orig Attempt |
| 0 0 0 1 1 | Collect Information |
| 0 0 1 0 0 | Analyze Information |
| 0 0 1 0 1 | Select Route |
| 0 0 1 1 0 | Authorize Call Setup |
| 0 0 1 1 1 | Send Call |
| 0 1 0 0 0 | Orig Alerting |
| 0 1 0 0 1 | Orig Active |
| 0 1 0 1 0 | Orig Suspended |
| 0 1 0 1 1 | Term Null |
| 0 1 1 0 0 | Authorize Termination |
| 0 1 1 0 1 | Select Facility |
| 0 1 1 1 0 | Present Call |
| 0 1 1 1 1 | Term Alerting |
| 1 0 0 0 0 | Term Active |
| 1 0 0 0 1 | Term Suspended |
| 1 0 0 1 0 to 1 1 1 1 1 | Spare Values |

Trigger Criteria field: It is encoded as follows:

| Bit Pattern | Indication |
| --- | --- |
| 0 0 0 0 0 0 0 0 | Feature activator |
| 0 0 0 0 0/0 0 1 | Vertical Service Code |
| 0 0 0 0 0 0 1 0 | Customized Access |
| 0 0 0 0 0 0 1 1 | Customized Intercom* |
| 0 0 0 0 0 1 0 0 | NPA |
| 0 0 0 0 0 1 0 1 | NPA_NXX |
| 0 0 0 0 0 1 1 0 | NXX |
| 0 0 0 0 0 1 1 1 | NXX_XXXX |
| 0 0 0 0 1 0 0 0 | NPA_NXXXXXX* |
| 0 0 0 0 1 0 0 1 | Country_Code_NPA_NXXXXXX* |
| 0 0 0 1 0 0 0 0 | Offhook Immed |
| 0 0 0 1 1 0 0 0 | Net Busy |
| 0 0 0 1 1 0 1 1 | Orig Called Party Busy |
| 0 0 0 1 1 1 0 1 | Orig No Answer |
| 0 0 1 0 0 0 0 0 | Orig Feature Activator |
| 0 1 1 0 0 0 0 0 | Channel Setup PRI CLID |
| 0 1 1 0 0 0 0 1 | Channel Setup PRI Addr |
| 0 1 1 0 0 0 1 0 | Channel Setup PRI N00 |
| 0 1 1 0 0 0 1 1 | Channel Setup PRI Intl |
| 0 1 1 0 0 1 0 0 | Specific Digit String Info* |
| 0 1 1 0 0 1 0 1 | Specific Digit String ANI* |
| 0 1 1 0 0 1 1 0 | Specific Digit String N00* |
| 0 1 1 0 0 1 1 1 | Specific Digit String CIC |
| 0 1 1 0 1 0 0 0 | Shared Interoffice CIC |
| 0 1 1 0 1 0 0 1 | Shared Interoffice Info. |
| 0 1 1 0 1 0 1 0 | Shared Interoffice ANI |
| 0 1 1 0 1 0 1 1 | Shared Interoffice Addr |
| 0 1 1 0 1 1 0 0 | Shared Interoffice N00 |
| 0 1 1 0 1 1 0 1 | Shared Interoffice Intl |
| 0 1 1 0 1 1 1 0 to 1 1 1 1 1 1 1 1 | Unused (Spare) |

The Port Information parameter contains the port information for an agent (or call). Parameter contents include:

Trunk Group Number field: Identifies the trunk group number (plurality of bits); and Trunk Member Number field: Identifies the member of the trunk group number (plurality of bits).

The Port Service Information parameter contains port service information and Service Programming Interface (SPI) information. The SCU 34 provides this information to the PSN 28. The port service information includes the return address used to send the event notification messages back to the SCU 34 (to the right address and port). The SPI number identifies the SPI version for the specified agent (or call). Parameter contents may include:

Port Information field: Contains the trunk group number (plurality of bits) and trunk member number (plurality of bits) of the port whose port service information is to be updated. The external trunk group number and the trunk member number are specified in the port information field.

Port Service Information field: Contains the port service information (e.g. return address) sent by the SCU 34 which is eventually used to return the event notification messages. This field may be a table of 4 bytes; for example, an return address of 47.122.64.153 is stored as 4 bytes—byte 1 is 47, byte 2 is 122, byte 3 is 64 and byte 4 is 153.

Port Number field: Contains the transport layer port number associated with the port service information.

SPI field: Contains the SPI version number for the specified agent.

Generally ranging from 1–15 (4 bits).

The Port Status parameter contains the status of the port/agent. It also contains information which indicates whether the port is currently being controlled by the SCU 34. Parameter contents may include:

Agent Status field: Contains the agent status of the port, and may be encoded as follows:

| Bit Pattern | Indication |
|---|---|
| 0 0 0 0 | Idle |
| 0 0 0 1 | Seized |
| 0 0 1 0 | Answered |
| 0 0 1 1 | ManBusy |
| 0 1 0 0 | Lockout |
| 0 1 0 1 | System Busy |
| 0 1 1 0 | PM Busy |
| 0 1 1 1 | Unknown |
| 1 0 0 0 to 1 1 1 1 | Spare Values |

Port In Service Call field: Indicates if the port is not currently a part of a service call or the port that is currently being serviced by the SCU 34. It may be encoded as:

| Bit | Indication |
|---|---|
| 0 | Port not a part of a service call |
| 1 | Port is a part of a service call. |

Connection Bitmap field: Is a bitmap where each bit indicates the connection status of the agent. The bits are used to represent the connection states as specified below, and may be encoded as follows:

Bit 0: Muted

Values: 0 = port is un-muted, 1 = port is muted
Bit 1: Held

Values: 0 = port is not held, 1 = port is held
Bit 2: Collecting Digits

Values: 0 = port is not collecting digits
1 = port is in the process of collecting digits Bit 3: Monitoring for Tones Values: 0 = port is not monitoring for tones
1 = port is monitoring for tones
Bit 4: Listening to Message Values: 0 = port is not listening to a message
1 = port is listening to message
Bit 5: Linked to an Agent Values: 0 = port is not linked to another agent
1 = port is linked to another agent
Bit 6: Bridged to multiple agents Values: 0 = port is not bridged to two or more agents
1 = port is bridged to two or more agents
Bit 7: Spare The Reset Reason parameter contains the reason why a restart was performed on the PSN 28. It informs the SCU 34 of the type of reset that is required at the SCU 34. This parameter may be encoded as follows and may include:

| Bit Pattern | Indication |
|---|---|
| 0 0 0 0 | Unknown |
| 0 0 0 1 | Warm Restart performed on the PSN |
| 0 0 1 0 | Cold Restart performed on the PSN |
| 0 0 1 1 | Reload Restart performed on the PSN |
| 0 1 0 0 | PSN has just come into service |
| 0 1 0 1 | Arbitrator Heartbeat has failed |
| 0 1 1 0 to 1 1 1 1 | Spare Values |

The Serving Translation Scheme parameter contains the serving translations scheme (STS) of the service call. This information is sent to the SCU 34 in the "New Call" event notification message. Parameter contents include:

Count field: Includes the number of digits in the STS, generally 1 to 3.

Digits 1, 2, 3 field: Depending on the number in the Count field, this field contains the digits (1 to 3), and may be encoded in the TBCD format.

The Session ID parameter contains a session identifier (ID). The session ID is generated by the SCU 34 to associate the different ports involved in a service call to a particular session. Upon receipt of the Session ID parameter, the PSN 28 does not perform any error checking. It merely re-transmits this value in the event notification message. Parameter contents include:

SCU ID field: Contains a unique one byte ID generated by the SCU 34.

Session ID field: Contains a unique 3 byte ID generated by the SCU 34.

The Signaling Information parameter contains the signalling information in the standard format that is applicable to the signaling type of the port. This parameter may be used to receive/send signalling information from/to the SCU 34. Depending upon the primitive/event notification in which this parameter is sent/received and the signaling type of the associated port, its contents are different. In general, the contents contain parameters that are encoded in the standard format. For PTS agents, there are no standards used. For SS7 agents, the parameters are encoded based on the TR444 and GR394, and for PRI agents the TR1268 and ITU-T Q.931 is used to define the parameters. Signaling Information parameter contents may include:

Signaling Type field: Contains the type of signaling that the port is using, and may be encoded as follows:

| Bit Pattern | Indication |
| --- | --- |
| 0 0 | PTS (4 Wire) |
| 0 1 | PTS (2 Wire) |
| 1 0 | SS7 |
| 1 1 | PRI |

Message Contents field: Contains the message contents in the standard format (SS7 or PRI). The appropriate content in respect of the SS7 and PRI types of signaling is identified in the primitives and event notifications, having the Signaling Information parameter.

PTS Message Type field: Contains the message type for a PTS message, and may be encoded as follows:

| Bit Pattern | Indication |
| --- | --- |
| 0 0 0 0 0 0 0 0 | Unknown |
| 0 0 0 0 0 0 0 1 | Digits To Outpulse |
| 0 0 0 0 0 0 1 0 | Digits To Outpulse With Bearer Capability |
| 0 0 0 0 0 0 1 1 | PTS Off-Hook |
| 0 0 0 0 0 1 0 0 | PTS On-Hook |
| 0 0 0 0 0 1 0 1 | Digits Outpulse |
| 0 0 0 0 0 1 1 0 to 1 1 1 1 1 1 1 1 | Spare |

PTS SigInformation Message field: Contains the PTS SigInformation message and depends on the PTS Message Type.

The SigInfo Mask parameter allows the SCU 34 to control which of the optional SS7/PRI messages are reported to the SCU 34 in the "Signaling Event" event notification message. This parameter consists of a bit map where each bit indicates the connection status of the agent, and may be encoded as follows:

Bit 0: ACM/Alert

Values: 0 = Do not send ACM (for SS7 port) or Alert (for PRI port) message to the SCU.
1 = Send ACM (for SS7 port) or Alert (for PRI port) message to the SCU.

Bit 1: COT/Call Proc

Values: 0 = Do not send COT (for SS7 port) or Call processing (for PRI port) message to the SCU.
1 = Send COT (for SS7 port) or Call processing (for PRI port) message to the SCU.

Bit 2: CPG/FAC

Values: 0 = Do not send CPG (for SS7 port) or FAC (for PRI port) message to the SCU.
1 = Send CPS (for SS7 port) or FAC (for PRI port message to the SCU.

Bit 3: FAA

Values: 0 = Do not send FAA (for SS7 port) message to the SCU.
1 = Send FAA (for SS7 port) message to the SCU.

Bit 4: FAR/Progress

Values: 0 = Do not send FAR (for SS7 port) or Progress (for PRI port) message to the SCU.
1 = Send FAR (for SS7 port) or Progress (for PRI port message to the SCU.

Bit 5: FRJ/RLC

Values:. 0 = Do not send FRJ (for SS7 port) or RLC (for PRI port) message to the SCU.
1 = Send FRJ (for SS7 port) or RLC (for PRI port message to the SCU.

Bit 6: PAM

Values: 0 = Do not send PAM (for SS7 port) message to the SCU.
1 = Send PAM (for SS7 port) message to the SCU.

Bit 7: RES

Values: 0 = Do not send RBS (for SS7 port) message to the SCU.
1 = Send RES (for SS7 port) message to the SCU.

Bit 8: SUS

Values: 0 = Do not send SUS (for SS7 port) message to the SCU.
1 = Send SUS (for SS7 port) message to the SCU.

Bit 9: Spare

The Switch ID parameter contains the switch identifier of the PSN 28. A valid range may be 0 to 127 (1 byte (8 bits)).

The Time of Day parameter contains the time of the day and is returned in the "Current Time of Day" event notification to the SCU 34. Parameter contents may include:

Year field: Contains the year.

Day In The Year field: Contains the day of the year.

Hour field: Contains the hour,

Minute field: Contains the minute.

Second field: Contains the second.

Ahead Of GMT field: Contains a boolean that if true, this field indicates that the switch time is ahead of the Greenwich Mean Time (GMT). The switch time is behind the GMT if this field is set to false.

Difference From GMT field: Contains the time difference between the time specified by the "hour, minute and second" fields above and the Greenwich Mean Time (GMT).

The Tone Detected parameter contains the tone or digit that was detected on a given port/agent by the PSN 28. Its contents may be encoded as follows:

| Bit Pattern | Indication |
| --- | --- |
| 0 0 0 | tone/digit monitoring aborted |
| 0 0 1 | asterisk detected |
| 0 1 0 | octothorpe detected |
| 0 1 1 | SF tone detected |
| 1 0 0 | BBF tone detected |
| 1 0 1 | BBF digits detected |
| 1 1 0 | BBF not possible on this port |
| 1 1 1 | Unused (Spare) |

The above-described parameters describe one embodiment of the parameters utilized in the Service Programming Interface (SPI) of the present invention. As will be appreciated, other parameters may be used as desired, and other encoding schemes may be used by those of ordinary skill in the art.

4. Non-Call Related Primitives and Event Notifications

The following are non-call related primitives and event notifications which do not control a call topology or flow. They may be used for general non-call related activities, like administration and auditing purposes.

A Heartbeat primitive is sent to the PSN 28 from the SCU 34 to indicate the arbitrator is alive and well. If this message is not received within a predefined time, then the PSN 28 will start polling the arbitrator with an In Service message.

A Query Port primitive instructs the PSN 28 to query the status of a port on the PSN 28. This instruction may also be sent from the PSN 28 to query the status of a port on the SCU 34. This message is bidirectional. Parameters for the Query Port primitive include:

Session ID: (described above);

Instruction Tag: (described above); and

Port Information: Identifies the port whose status is requested.

A Query Time of the Day primitive instructs the PSN 28 to return the time of day. Parameters for the Query Port primitive include: Instruction Tag: (described above).

A Reset Switch primitive is sent to the PSN 28 by the SCU 34, if the SCU 34 wants to reset certain ports that are being serviced. The ports to be reset are associated with a particular IP address. If the IP address information is missing, then all ports that are serviced by the PSN 28 are taken down. Parameters for the Reset Switch primitive include:

Instruction Tag: (described above);

IP Address Information: Contains the IP address information of any SCU 34 that is no longer in service and require that the ports serviced by the identified IP address be idled (e.g. torn down); and Return IP Address Information: Contains the IP address information of the SCU to which an Instruction Completed response is sent.

A Set IP Address primitive instructs the PSN 28 to update either the arbitrator's IP address or a specified port's Port Service Information with the given data. The new Port Service Information is used to send event notifications and primitive responses for the port. This primitive may be received at any time during the call to update the appropriate Port Service Information for the port. Parameters include:

Instruction Tag: (described above); and

Port Service Information: Identifies the new return address used to report primitive responses and event notifications to the SCU 34 for the port or the arbitrator's IP address.

A Current Time of the Day event notification returns the current time-of-day tot he SCU 34. This message is sent in response to the Query Time of Day primitive or when the time is changed on the PSN 28. Parameters for the Current Time of the Day event notification include:

Current Time of Day: Contains the current time-of-day; and

Instruction Tag: (described above).

An In Service event notification is reported to the SCU 34 when the PSN 28 comes into service (e.g., after reset). Also, this message is sent to the SCU 34 when the arbitrator heartbeat fails. Parameters for the In Service event notification include:

Reset Reason: Identifies the reason the arbitrator is being requested (for example, because of a restart, heartbeat failure, or the system is coming into service).

A Port Status event notification is reported to the SCU 34 in response to the Query Port primitive from the SCU 34. Parameters for the Port Status event notification include:

Session ID: (described above);

Instruction Tag: (described above);

Port Information: Identifies the port whose status is requested; and

Port Status: Identifies the status of the port.

E. Operation

In operation, an agent (i.e. a terminal or a trunk) associated with a call originating at a port in the programmable switch matrix 24 is made available to the SCU 34 by the PSN 28 entering a "server mode" of operation. In server mode, the agent participates in a client-server relationship with the SCU 34 whereby the call is under complete control of the SCU 34. The SCU 34 provides all the instructions on how the agent is to proceed. The programmable switch matrix 24 (and PSN 28) is not responsible for making deterministic decisions or taking actions upon a trunk which involves knowledge of services or predetermined reactions, as is the case with traditional call processing in typical switching systems. The service programming interface (SPI) (between the programmable switch matrix 24 and the SCU 34) provides the SCU 34 with a set of call control primitives for the control and manipulation of calls within the programmable switch matrix 24. Thereby, the SCU 34 has the ability to invoke within the PSN 28 such functions as digit collection, routing, playing announcements, call termination and bridging, specialized tone monitoring, out pulsing, and audio control over one or more parties when the call is in the server mode. From time to time, when external (i.e., peripheral) events occur at the programmable switch matrix 24 for any party that is involved in the SCU-controlled call, the SCU 34 is notified of these events by the PSN 28. After server mode entry, the agent remains under the control of the SCU 34 until (a) the SCU 34 instructs the PSN 28 to disconnect the agent, (b) a peripheral event causes the agent to go on-hook, or (c) the agent is idled due to a fatal error at the PSN 28. It is noted that the agent never goes back to in-switch traditional call processing once it enters the server mode.

At the programmable switch matrix 24, an agent for a port (i.e., trunk) may be sent to the SCU 34 (thereby entering the server mode) upon encountering a trigger during processing of a call. Triggers may be employed through either a trigger database provisioned in the PSN 28 that contains SCU triggers and/or Carrier Advanced Intelligent Network (CAIN) triggers.

With respect to entering through the trigger database 102 (illustrated in FIGS. 4 and 5), triggering is the process that the programmable switch matrix 24 uses to identify an agent requiring SCU 34 or SCP 26 handling. Triggering is based on points in call (PIC), trigger detection points (TDPs), call criteria and the trigger database datafill located in the programmable switch matrix 24. A PIC is defined as a call processing event, examples of which are originate, and collect digits and analyze. PICs are subdivided or further qualified to provide more discrete definitions of particular points in the call. For example, the "originate" PIC is qualified to distinguish it as an off-hook origination. The "collect digits and analyze" PIC is qualified by the kind of digits that the programmable switch matrix 24 expects to collect at that particular point in the dialing plan, such as an authorization code, a personal identification number (PIN), or an account code. Each qualified PIC has associated with it a trigger detection point (TDP) which indicates the need to check a call's criteria for a trigger. Each trigger has its own set of criteria. When the criteria are met, the programmable switch matrix 24 (including the PSN 28) performs the action defined by the trigger database, i.e., send the call to the SCU 34 or send the call to a treatment (e.g. SCP 26).

During internal programmable switch matrix 24 switch call processing, TDPs are encountered. When a TDP is encountered, the PSN 28 accesses its trigger database tables with the call criteria available at that TDP. The trigger database 102 contains tables that contain the information required to assign, arm and deploy triggers. They define a set of criteria to be met and actions to be taken when those criteria are met. Within the trigger database tables, call related information is checked against the trigger criteria. If the trigger criteria are met, call processing continues according to the action defined within the trigger database. If the trigger criteria are not met, the programmable switch matrix 24 continues controlling the call with traditional (conventional) switching system call processing.

In the present invention, the trigger database 102 tables contain two methods of triggering to the SCU 34. One method includes Query immediately to the SCU (QuerySCU). QuerySCU suspends the normal switch call processing in the programmable switch matrix 24, causes entry into the server mode, and sends a New Call event notification message to the SCU 34. As will be appreciated, the trigger database 102 may contain numerous triggers to invoke the QuerySCU.

The second way a call agent can be sent to the SCU is via the CAIN SCP 26. In a conventional fashion, the trigger database 102 determines that the call is a CAIN call and therefore, sends the call to the SCP 26. The SCP 26 performs processing and determines that the call is an SCU call. The SCP 26 informs the PSN 28 through a Transaction Capabilities Application Protocol (TCAP) message containing predetermined encoding indicating the call should be connected to the SCU 34. Upon receipt of the SCP "Connect to SCU" TCAP message, the programmable switch matrix 24 enters the server mode for that call and sends a New Call event notification message to the SCU 34.

Server mode operation of the PSN 28 (and programmable switch matrix 24 for that call) is implemented by a finite state machine (FSM) around which the Service Programming Interface (SPI) protocol has been designed. The finite state machine comprises states, events, and allowable transitions between the states responsive to the events. For instance, the PSN 28 receives a primitive instruction (event) requiring some action be taken in respect of a certain port which is in a particular state. The results of performing this action typically results in transition of the port into another state. However, an event may or may not be valid depending upon the state of the port at that time. The finite state machine based implementation is well suited to define operation in such an event-response processing environment.

1. Finite State Machine

Figure 12A:
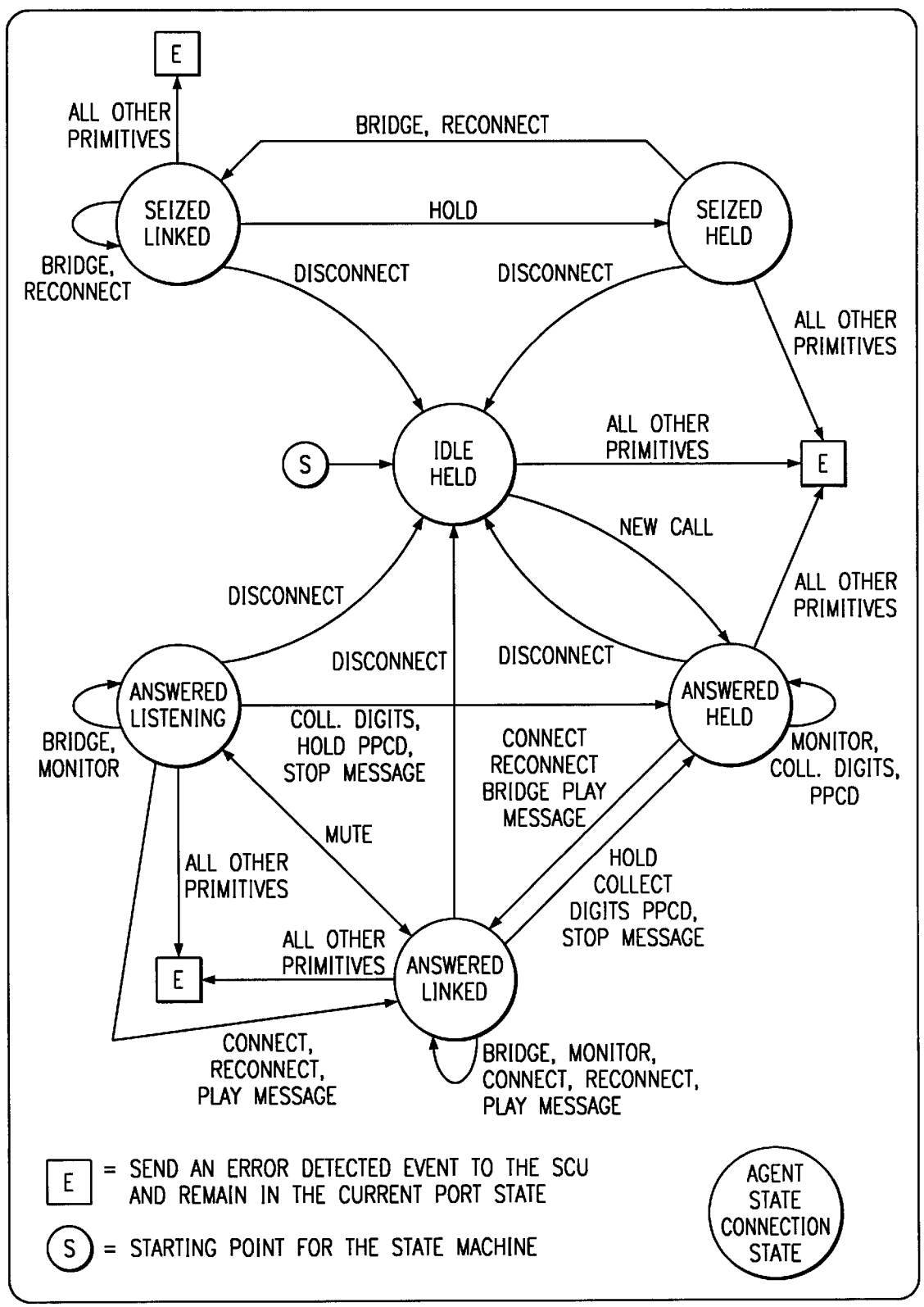
FIGS. 12a, 12b and 12c illustrate a finite state machine which manifests operation of the programmable service node.
Figure 12B:
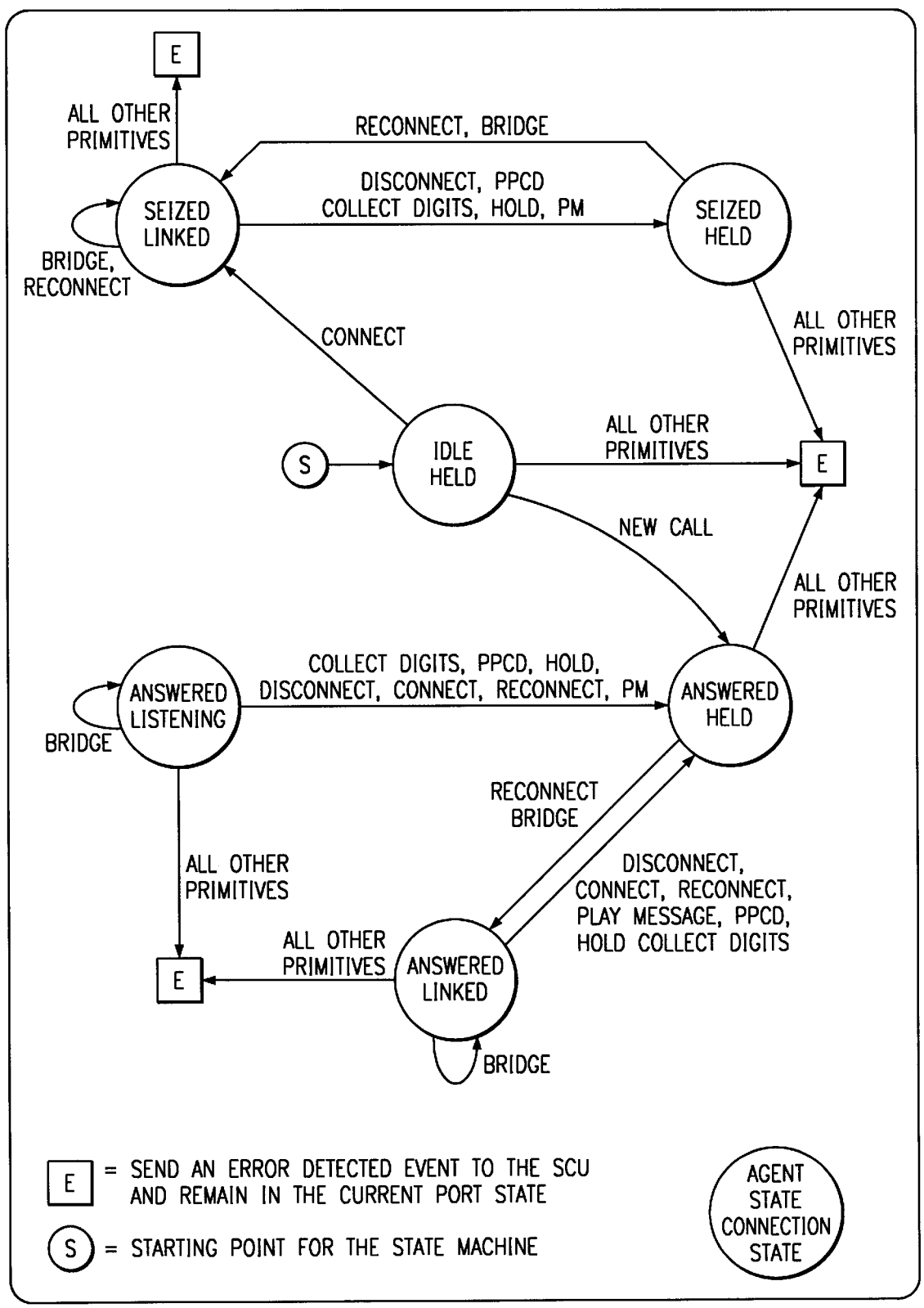
Figure 12C:
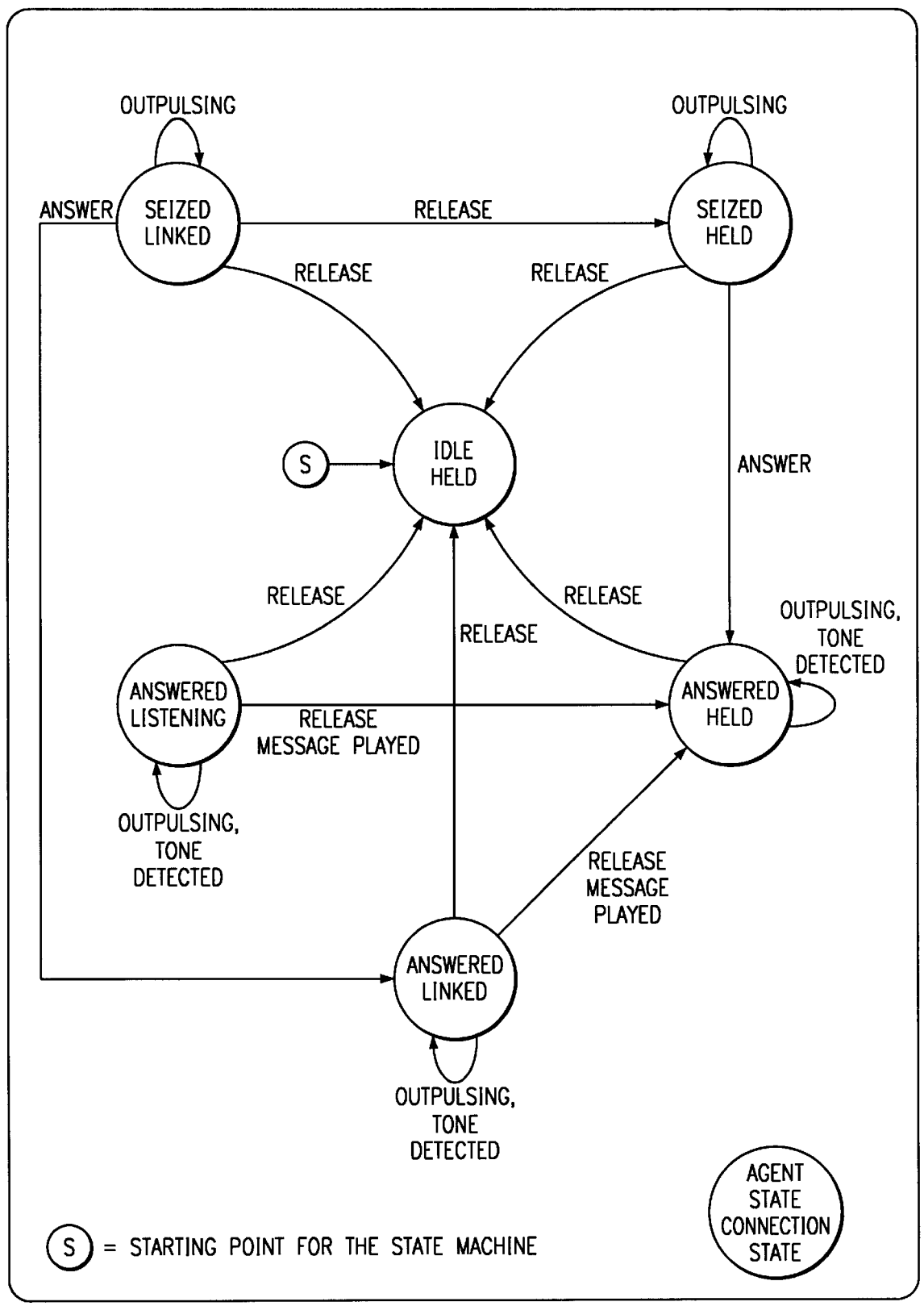

Now referring to FIG. 12a, 12b, and 12c, there is illustrated the finite state machine (FSM) 110 (illustrated in FIG. 5) in accordance with the present invention. FIGS. 12a and 12b describe, the explicit and the implicit state transitions, respectively, within the PSN 28 in response to primitives received from the SCU 34. FIG. 12c illustrates state transitions upon receipt of peripheral events. The combination of FIGS. 12a–c illustrate the complete port state transitions of the FSM 110.

A port, in this particular embodiment of the FSM 110, corresponds to a trunk member and generally to communication coupling with a party in a call. The port state may be defined by a combination of two states, namely an Agent state and a Connection state. Instructions (primitives) received from the SCU 34, as well as the peripheral events on that port, are termed Events.

The Agent state describes the state of the port/agent at any given time. It does not describe the connection status of the agent. The port/agent may be in one of three Agent states: IDLE—the port is in an idle state; SEIZED—the port is in a seized and ringing state; and ANSWERED—the port is in a seized and answered state.

The Connection state is defined as the state of the connection that the agent/port is involved in at any given time. The port/agent may be in one of three Connection states: HELD—the port has no voice path between itself and the port to which it is connected (for example, in a port A to port B connection, A and B cannot hear each other); LINKED—the port has a two-way voice path between itself and the port to which it is connected (in a port A to port B connection, A and B can hear each other); and LISTENING—the port has one-way voice path between itself and the port to which it is connected (in a port A to port B connection, port A may be able to hear port B but port B cannot hear port A, etc).

As will be appreciated, the FSM 110 applies to any party in a service call (i.e., the originator, terminator, etc.). Hence, each port has an instance of the FSM 110 running on its behalf.

The state changes for a port depend upon the current state of that port. For example, when port A enters the server mode it is in an ANSWERED/HELD (agent/connection) state. When it is subsequently connected to port B, for instance, through an instruction sent by the SCU 34, the state of port A changes to ANSWERED/LINKED; this is known as a state transition. The state of port B is SEIZED/LINKED and remains so until port B answers, and the state of port B then changes to ANSWERED/LINKED.

When an event is received for a port, depending upon the state of the port, a corresponding Action Processor is invoked. Action Processors are software procedures which when executed carry out the specific actions within the PSN 16 required by the instructions received from the SCU 34 or by peripheral events. Action processors control every aspect of the call processing at the programmable switch matrix 24 for calls in server mode.

Illustrated in FIG. 12a are explicit port transitions. An explicit state transition is a transition that occurs in direct response to the receipt of a primitive from the SCU 34. The primitive may be received from the SCU 34 in connection with a port, when the port is in any port state (which is the combination of agent and connection states). Upon receipt of the primitive, one of the following actions occur. The primitive is valid for the port in its current state. Hence, the primitive is executed in this state. As a result of this execution, there may or may not be a state change for the port. Or, the primitive is invalid for the port in its current state. The primitive is not executed. The port remains in its current state. The SCU 34 is notified of the error that was detected in the Error Detected event notification message. It is noted that the Set Billing Record and Transmit SigInfo primitives do not cause any state changes and are valid in all but the IDLE/HELD state. The Query Port and Error Detected primitives are valid in all the states and also do not cause state changes. Hence, these four primitives have not been illustrated in FIG. 12a. Furthermore, the New Call is an event notification rather than an SCU primitive. This starts the first state transition out of the IDLE/HELD state for the port that enters the server mode.

Illustrated FIG. 12b are implicit state transitions. An implicit state transition is a transition that occurs as in indirect response to the receipt of a primitive from the SCU 34. For example, in a two party call where parties A and B are linked (i.e., talking), a Disconnect primitive on port A causes an explicit state transition from the ANSWERED/LINKED state to the IDLE/HELD state for Party A, as shown in FIG. 12a. Moreover, the Disconnect primitive causes an implicit (or indirect) state transition for port B from ANSWERED/LINKED to ANSWERED/HELD state, as shown in FIG. 12b.

FIG. 12c illustrates state transitions upon receipt of peripheral events that are generated in the peripheral subsystem of the programmable switch matrix 24, for example, the peripheral processors 88 of the programmable switch matrix 24 shown in FIG. 2. These events are generally classified into the release, digits collected, outpulsing, tone detected and message played event type. A release event is any peripheral event that indicates the port has been released, disconnected or idled. An answer event indicates that the port has answered or gone off-hook. A digits collected event reports the digits that were collected on the port. An outpulsing event indicates that digits and/or other signaling information is being transmitted/received on this port. A tone detected event reports the tone/digit that was detected on the port. A message played event reports that the announcement/tone connected to a port has finished playing.

After describing above the operation of the PSN 28 in terms of the FSM 110, the following description together with reference to FIGS. 13–28 will illustrate the event/response/notification relationship between the PSN 28 and the SCU 34 with respect to the service programming interface message flow.

The SCU 34 transmits instructions (i.e., primitives/macros) to the PSN 38 which controls the flow of the call (as will be appreciated, a message may include a single primitive or a macro). In response to these instruction messages, the PSN 28 performs the requested action (through the programmable switch matrix 24) and also transmits event notification messages to the SCU 34. The PSN 28 may also transmit event notification messages in response to peripheral events that occur on a port in the programmable switch matrix 24 such that the SCU 34 may update its database. The message protocol is designed so that when an instruction message is transmitted from the SCU 34 to the PSN 28, the PSN 28 responds with a reply (event notification message) for the instruction—immediately or after completing one or more actions on the PSN 28 (within the programmable switch matrix 24). And when the PSN 28 transmits an event notification message to the SCU 34, the SCU 34 may send a reply back in response to the event notification.

2. Message Flow

Figure 13:
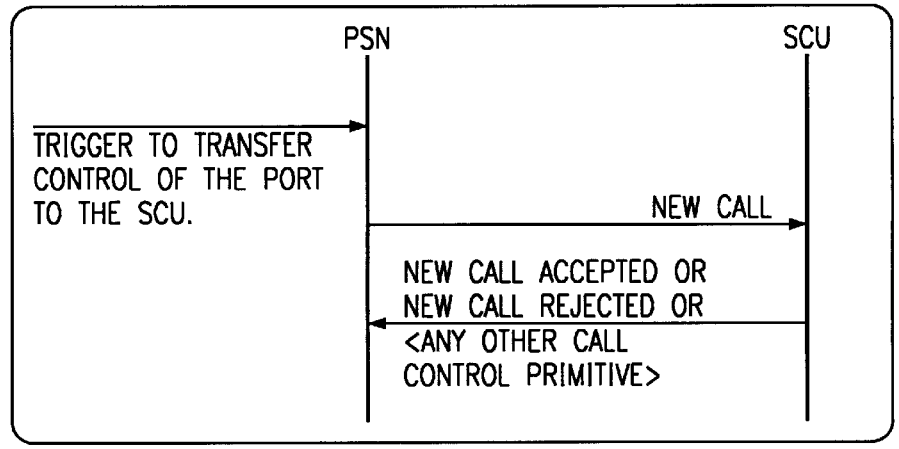
FIG. 13 illustrates a message flow for a New Call event notification.

Now referring to FIG. 13, there is illustrated a New Call event notification message flow. After the PSN 28 determines through the triggering process that the call requires (or desires) control by the SCU 34 (i.e., becomes a service call), a New Call event notification message is sent to the SCU 34. In addition, an Event Timer is started. In response to the New Call event notification message, the SCU 34 sends the New Call Accepted primitive or the New Call Rejected primitive, and/or any other call control primitives. The New Call Rejected primitive is sent if the SCU 34 does not want to (or cannot) control the call, and wants the PSN 28 to route the call to the PSNF treatment. The New Call Accepted primitive is sent if the SCU 34 has accepted this call and will control the call thereafter. Any other call control primitives may be sent if the SCU 34 has accepted the call and will control the call thereafter. Upon receipt of any of these primitives, the PSN Event Timer is cancelled.

Figure 14:
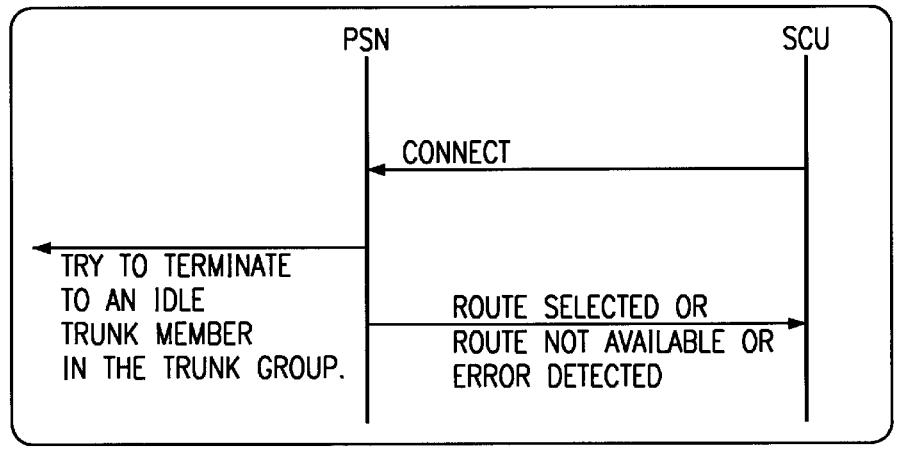
FIG. 14 illustrates a message flow for a Connect primitive.

Now referring to FIG. 14, there is illustrated a Connect primitive message flow. The SCU 34 sends a Connect primitive instruction to the PSN 28 when it wants to route a call to an idle trunk member. As a result of performing this instruction, the PSN 28 responds with a Route Selected or Route Not Available event notification message. The Route Selected event notification is sent if an idle member of the trunk group is located and the call is terminated onto this trunk member (i.e. port A is connected to port B, etc.). The Route Not Available event notification is sent if no member of the trunk group is found to be idle, i.e., a terminating trunk member is not found. As will be appreciated, the PSN 28 may also send an Error Detected event notification message if an error is detected (e.g., an error in the incoming instruction, an error due to unavailable resources, etc.). The Error Detected event notification may be sent in response to any primitive instruction for which an error may be detected.

Figure 15:
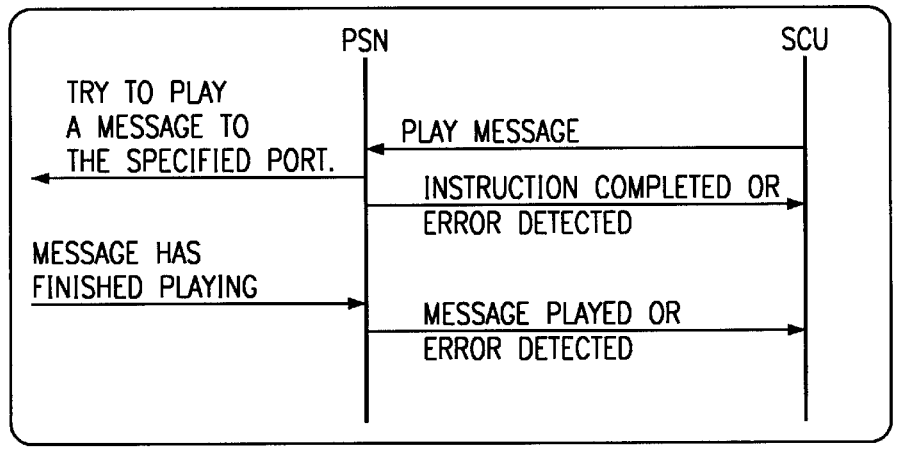
FIG. 15 illustrates a message flow for a Play Message primitive.

Now referring to FIG. 15, there is illustrated a Play Message primitive message flow. The Play Message primitive instruction is sent to the PSN 28 when the SCU 34 wants a message (i.e., an announcement or a tone) played to a specified port. The PSN 28 plays the message (using resources within the programmable switch matrix 24 or without the matrix, such as the MRU 36, etc.) on the port and sends an Instruction Completed event notification message to the SCU 34. When the message has finished playing, the PSN 28 also responds with a Message Played event notification message. The PSN 28 may also send an Error Detected event notification message if an error is detected.

Figure 16:
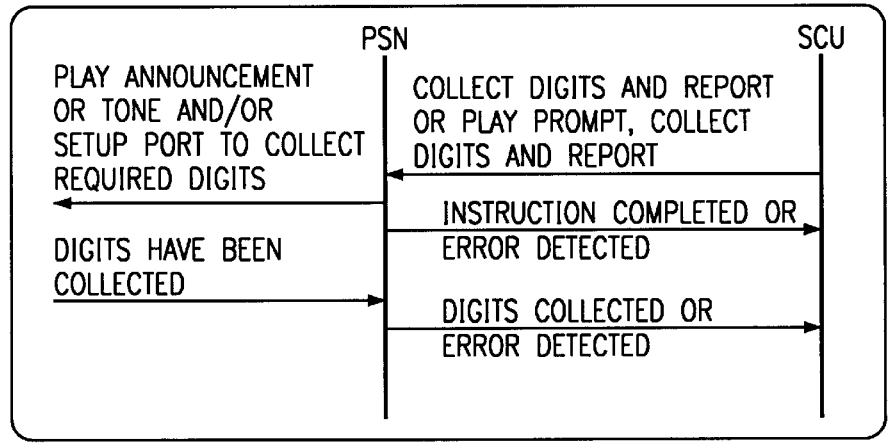
FIG. 16 illustrates a message flow for Collect Digits & Report, and Play Prompt, Collect Digits & Report primitives.

Now referring to FIG. 16, there is illustrated a message flow for the Collect Digits & Report primitive and the Play Prompt, Collect Digits & Report primitive. The SCU 34 sends the Collect Digits & Report or the Play Prompt, or a Collect Digits and Report primitive instruction to the PSN 34 for collection of a specific amount of digits on the given port. The latter is sent to play a message (i.e., a tone or an announcement) prior to the collection of the first digit on the port. The message played in this case is generally interruptible. Upon receipt of either of these primitives, the PSN 28 begins digit collection and sends back an Instruction Completed event notification message to the SCU 34. After completing these instructions, the PSN responds with the Digits Collected event notification if the digit collection is successfully started and some/all the digits are collected or the digit collection has timed out. The PSN 28 may also send an Error Detected event notification message if an error is detected.

Figure 17:
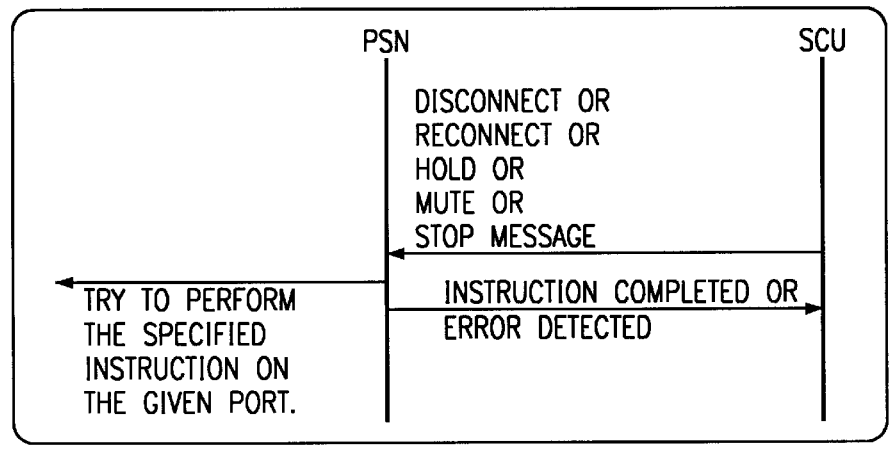
FIG. 17 illustrates a message flow for Disconnect, Reconnect, Hold, Mute And Stop Message primitives.

Now referring to FIG. 17, there is illustrated a message flow for the Disconnect, Reconnect, Hold, Mute and Stop Message primitive instructions. The Disconnect primitive instruction is sent to the PSN 28 when the SCU 34 wants to disconnect (or remove) a given port from the service call. The Hold primitive instruction is sent to hold a given port and the Mute primitive instruction is sent to mute a given port. The Reconnect primitive instruction is sent when the SCU 34 wants to reestablish a connection between any two ports in the service call. The Stop Message primitive instruction is sent when the SCU 34 wants to stop playing the message that is currently being played on the specified port. After receiving any one of the above primitives, the PSN 28 has the option of responding with an Instruction Completed event notification message if the received instruction is successfully completed (e.g., the port is put on hold successfully). The PSN 28 may also send an Error Detected event notification message if an error is detected.

Figure 18:
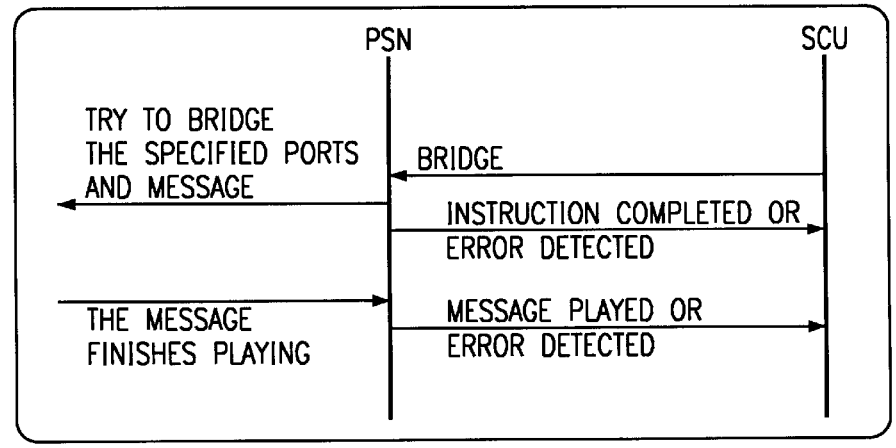
FIG. 18 illustrates a message flow for a Bridge primitive.

Now referring to FIG. 18, there is illustrated a Bridge primitive message flow. The Bridge primitive instruction is sent to the PSN 28 when the SCU 34 wants to bridge (or conference in) several ports (and maybe even a message) in the service call. In response to the Bridge primitive, the PSN 28 has the option of sending to the SCU 34 the Instruction Completed event notification message upon successfully bridging all the ports (and optionally the message). If a message is bridged, then after the message has finished playing, the Message Played event notification message is sent to the SCU 34. The PSN 28 may also send an Error Detected event notification message if an error is detected.

Figure 19:
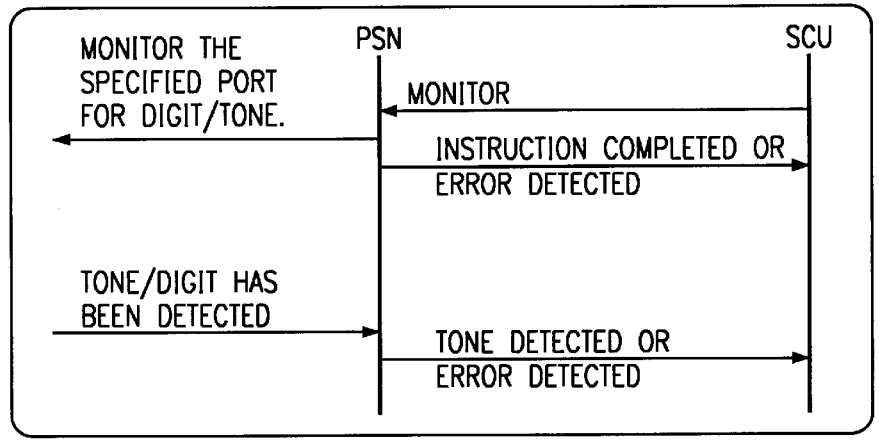
FIG. 19 illustrates a message flow for a Monitor primitive.

Now referring to FIG. 19, there is illustrated a message flow for the Monitor primitive. The SCU 34 sends the Monitor primitive instruction to the PSN 34 when for monitoring a specified port for a given tone/digits. When the PSN 34 receives the Monitor primitive, the port is monitored (begins monitoring) for the specified tone/digits and returns an Instruction Completed event notification message to the SCU 34. Upon completion of this instruction, the PSN 34 responds with the Tone Detected event notification message if the specified tone/digit is detected. The PSN 28 may also send an Error Detected event notification message if an error is detected (i.e., if there is a problem starting tone detection (e.g., STR is unavailable)).

Figure 20:
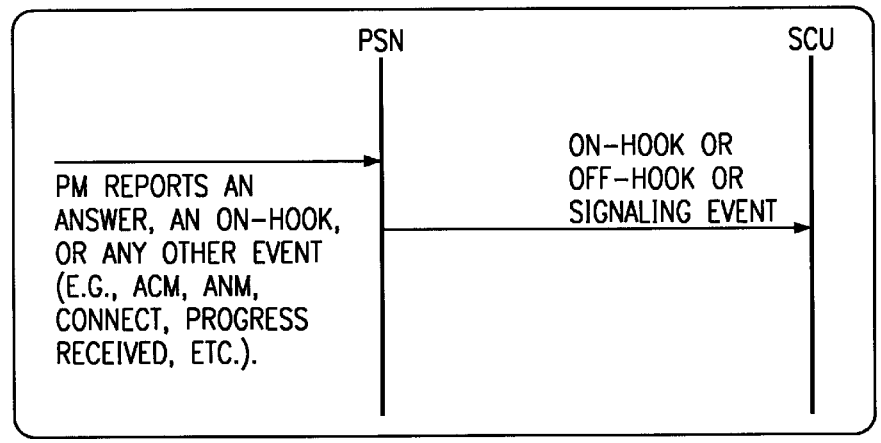
FIG. 20 illustrates a message flow for a signaling event notification, including an on-hook and off-hook.

Now referring to FIG. 20, there is illustrated a message flow for the On-Hook, Off-Hook and Signaling Event event notification messages. When a port in a service call goes on-hook, the PSN 28 sends the On-Hook event notification to the SCU 34. When a port in a service call goes off-hook or answers, the PSN 28 sends an Off-Hook event notification to the SCU 34. When a port in a service call receives signaling information on its peripheral from the network, it is reported to the SCU 34 in the Signaling Event event notification. The SCU 34 updates its internal information after receiving the On-Hook, Off-Hook, or Signaling Information event notifications. The SCU 34 generally does not send a reply in response to receiving these event notification messages.

Figure 21:
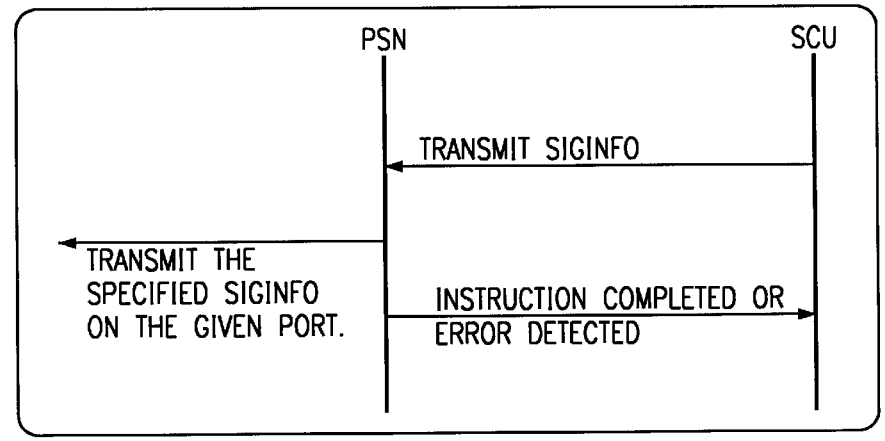
FIG. 21 illustrates a message flow for a Transmit SigInfo primitive.

Now referring to FIG. 21, there is illustrated a Transmit SigInfo primitive message flow. The Transmit SigInfo primitive instruction is sent to the PSN 28 when the SCU 34 wants to transmit some signaling information on a specified port (to be sent over the network). The PSN 28 responds with the Instruction Completed event notification if the received instruction is successfully completed (i.e., the signalling info is successfully transmitted). The PSN 28 may also send an Error Detected event notification message if an error is detected.

Figure 22:
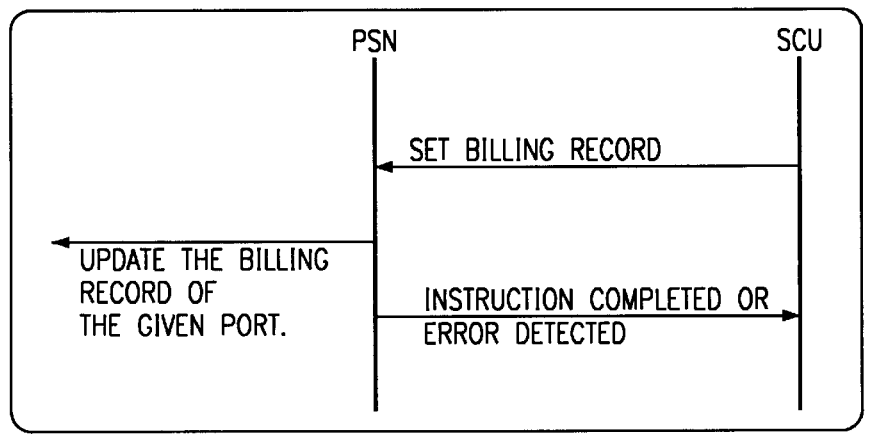
FIG. 22 illustrates a message flow for a Set Billing Record primative.

Now referring to FIG. 22, there is illustrated a Set Billing Record message flow. The Set Billing Record primitive instruction is sent to the PSN 28 when the SCU 34 wants to update the billing record of a given port in the service call. The PSN 28 updates the billing record associated with the given port and sends an Instruction Completed event notification message to the SCU 34. However, if an error is detected, and the incoming request cannot be processed, then the Error Detected event notification message is returned to the SCU 34.

Another way to update the billing record of a given port without sending the above primitive is to include the Billing Information parameter with other primitives that are sent for this port. The Billing Information parameter is optional in the primitives other than Set Billing Record primitive. For example the Billing Information parameter may be sent in the Hold primitive for the port. In that case, the port will not only be held, but its billing record will also be updated appropriately.

Figure 23:
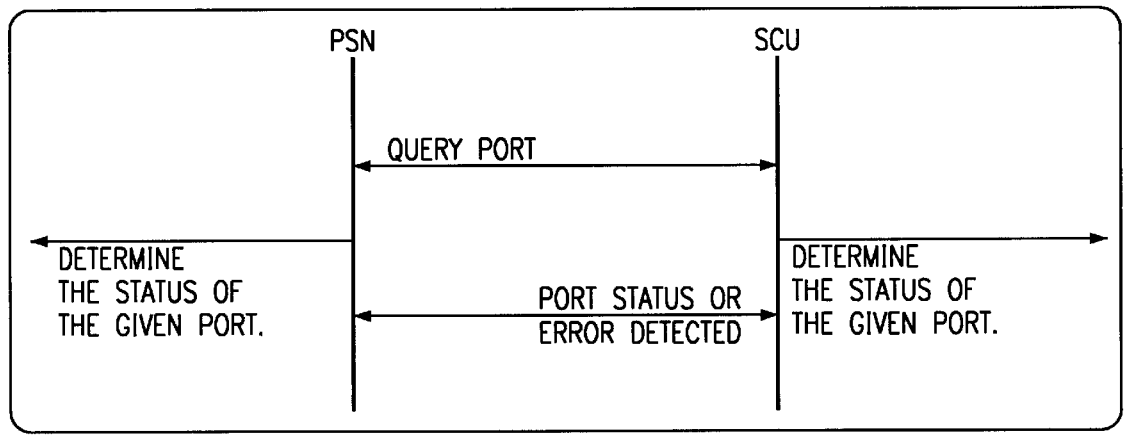
FIG. 23 illustrates a message flow for a Query Port primitive.

Now referring to FIG. 23, there is illustrated a Query Port primitive message flow. The Query Port primitive instruction is sent to the PSN 28 when the SCU 34 wants to determine the status of a port in the PSN 28 (in the programmable switch matrix 24). In response, the PSN 28 sends a Port Status event notification message containing the status of the port to the SCU 34. The PSN 28 may also send an Error Detected event notification message if an error is detected. In addition, Query Port may also be sent by the PSN 28 to determine the status of the port on the SCU 34. The SCU 34 returns the status of the port in the Port Status message.

Figure 24:
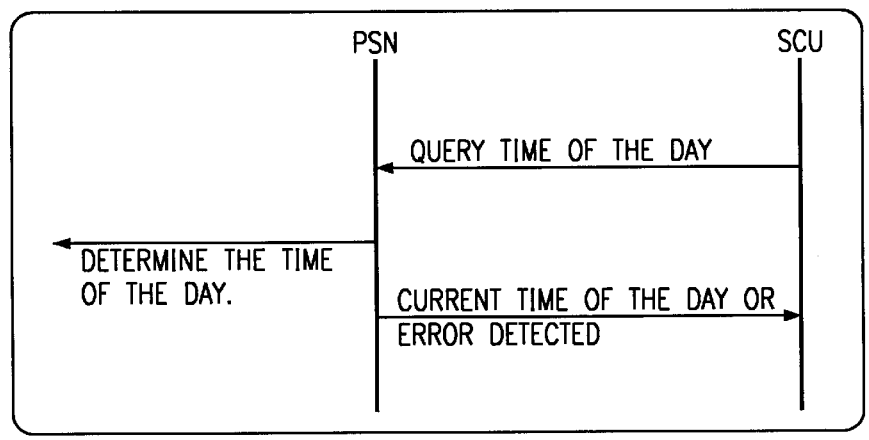
FIG. 24 illustrates a message flow for a Query Time primitive.

Now referring to FIG. 24, there is illustrated a message flow for the Query Time of the Day primitive. The Query Time of the Day primitive instruction is sent to the PSN 28 when the SCU 34 wants to know the time of the day from the PSN 28. The PSN 28 responds with a Current Time of the Day event notification message containing information. The PSN 28 may also send an Error Detected event notification message if an error is detected. The PSN 28 also sends the Current Time of the Day asynchronously whenever the time is changed on the PSN 28.

Figure 25:
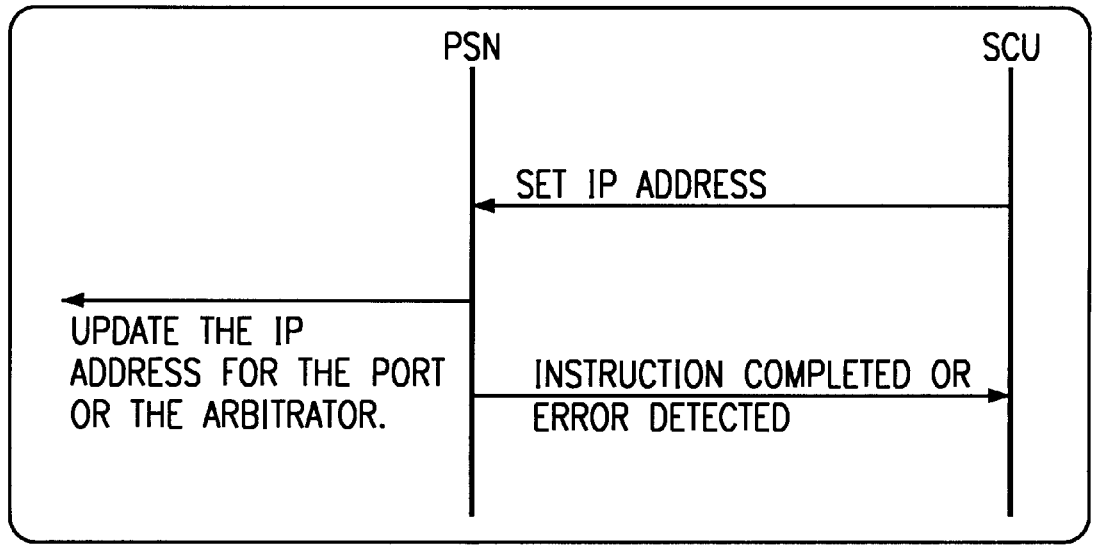
FIG. 25 illustrates a message flow for Set IP Address primitive.

Now referring to FIG. 25, there is illustrated a Set IP Address primitive message flow. The Set IP Address primitive instruction is sent to the PSN 28 when the SCU 34 wants to set either set the IP address (i.e. Port Service Information) of a given port in the service call or set the address of the arbitrator. The PSN 28 stores the IP address for the port to be used to send replies and responses to the SCU 34 in the future. The arbitrator address is used to send the New Call event notification for any port that is to be controlled by the SCU 34. After updating the IP address for the port, the PSN 28 sends an Instruction Completed event notification message to the SCU 34. The PSN 28 may also send an Error Detected event notification message if an error is detected.

Another way to update the IP address of a given port without sending the above primitive is to include the Port Service Information parameter with other primitives that are sent for this port. The Port Service Information parameter is optional in most primitives.

Figure 26:
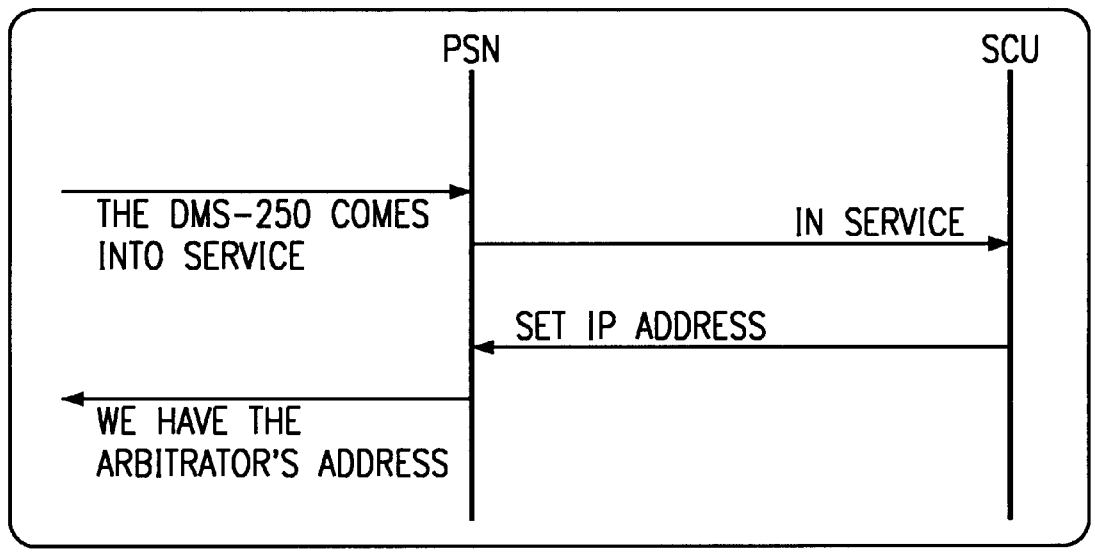
FIG. 26 illustrates a message flow for an In Service event notification.

Now referring to FIG. 26, there is illustrated a message flow for the In Service event notification. When the PSN 28 comes into service it sends the In Service event notification to the SCU 34. This event notification message is also sent when the SCU 34 heartbeat fails or the PSN 28 is just back from a Cold/Reload restart. Upon receipt of this message, the SCU 34 returns the address of the SCU arbitrator using the Set IP Address primitive. The arbitrator is the initial point of contact for all service call ports. In other words, the New Call event notification message for a port is always sent to the arbitrator. Subsequent messages for this port may be routed to the arbitrator or to a new IP address. The new IP address is used if the SCU 34 had sent another Set IP Address primitive to update the IP address of this port.

Figure 27:
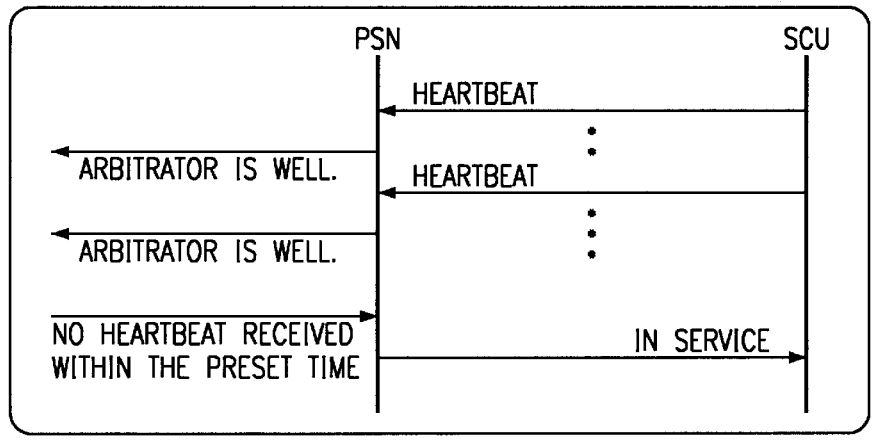
FIG. 27 illustrates a message flow for a Heartbeat primitive.

Now referring to FIG. 27, there is illustrated a message flow for the Heartbeat primitive. Periodically, the SCU 34 sends the Heartbeat primitive to the PSN 28 to indicate that all is well with the arbitrator. If this message is not received within a preset time within the PSN 28, a heartbeat failure occurs and the In Service event notification is sent to the SCU 34 to begin polling for the arbitrator address.

Figure 28:
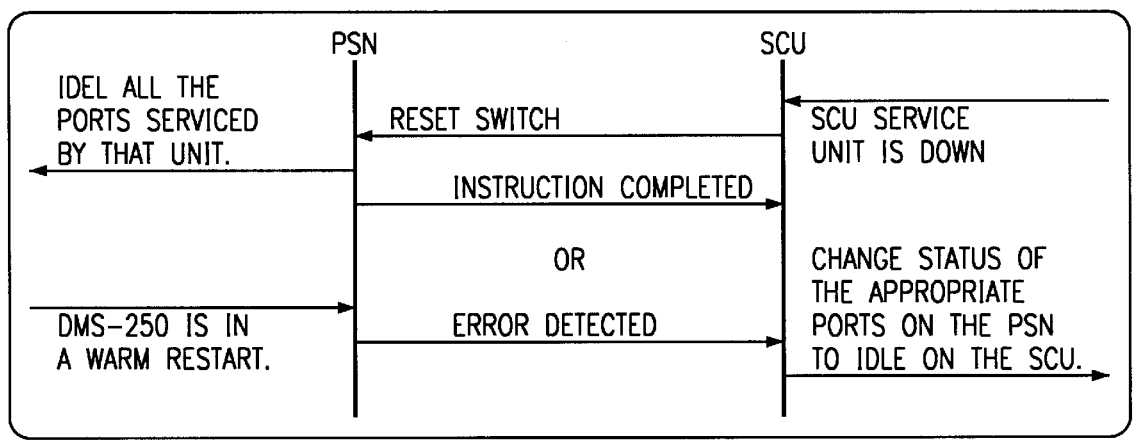
FIG. 28 illustrates a message flow for a Reset Switch primitive.

Now referring to FIG. 28, there is illustrated a Reset Switch primitive message flow. The Reset Switch primitive instruction is sent to the PSN 28 when the SCU 34 wants to reset all the ports that are serviced by certain "service providing units" on the SCU 34. The PSN 28 may or may not idle all the appropriate ports and returns an Instruction Completed event notification message to the SCU 34. The Error Detected event notification may be sent to the SCU 34 after a Warm restart on the PSN 34 when the PSN 34 wants to reset all the PSN ports that are in a non-talking state and controlled by the SCU 34. The SCU 34 resets the status of all these ports to idle. For Cold/Reload restarts, the In Service event notification is sent to the SCU 34 (with the appropriate restart reason). The SCU 34 tags or marks all the ports that it is currently servicing on the PSN 28 as idle. Also, the PSN 28 takes down or idles all the ports that are involved in an SCU-controlled call.

Another aspect of the programmable service architecture is its IP addressing capability. The PSN 28 presents all New Call event notification messages to a single IP address. In order to facilitate the distribution of various services into various processors in the network, the Service Programming Interface protocol provides a field containing a return IP address. This address is used by the PSN 28 to route subsequent response messages (e.g. event notifications) from the PSN 28 to the SCU 34. By employing this routing technique, a service may be executed over multiple SCUs without specific transfer logic in the PSN 28 to accommodate the multiple interfaces.

Now referring to FIGS. 29*a*, 29*b* and 29*c*, there is shown an example of a typical service call, including the steps involved (messages between PSN 28 and SCU 34) and state transitions of the FSM 110.

Although the service control platform 32 is shown in FIG. 1 as being external to the PSTN 20, services may be created and deployed on a platform directly integrated with the various network elements that constitute the backbone PSTN 20. A single programmable switch matrix 24 (and PSN 28) may be controlled by one or more SCUs 34 allowing services to be identified by a first SCU (or other processing node) and then processed by a separate SCU.

Furthermore, the SCU 34 (or SCUs) may interface with multiple PSNs 28 (and multiple programmable switch matrices 24).

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. An apparatus for controlling and processing a service call in a telecommunications system comprising:

a programmable switch matrix, the programmable switch matrix comprising:

a plurality of ports, including a first port and a second port, one or more predetermined triggers for detecting when processing of a service call associated with the first port is desired to be controlled externally, a service node for outputting an event notification message to a service control unit in response to the detection of the service call and for receiving one or more primitives from the service control unit, and call processing circuitry for connecting the first port to the second port in response to control commands of the one or more primitives received by the service node from the service control unit, the service control unit externally controlling the programmable switch matrix and processing of the service call; and a first communications link between the programmable switch matrix and the service control unit.

2. An apparatus in accordance with claim 1 wherein the service control unit includes one or more service application software programs for execution to control processing of the service call.

3. An apparatus in accordance with claim 3 wherein the event notification message includes call information received from the service call and the service control unit uses the call information to identify and select an appropriate one of the one or more service application software programs to control processing of the service call.

4. An apparatus in accordance with claim 4 further comprising means for data interfacing between the programmable switch matrix and the service control unit.

5. An apparatus for controlling and processing a service call in a telecommunications system comprising:

a programmable switch matrix, the programmable switch matrix comprising:

a plurality of ports, including a first port and a second port, one or more predetermined triggers for detecting when processing of a service call associated with the first port is desired to be controlled externally, a service node for outputting an event notification message to a service control unit in response to the detection of the service call and for receiving one or more primitives from the service control unit, and call processing circuitry for connecting the first port to the second port in response to control commands of the one or more primitives received by the service node from the service control unit, the service control unit externally controlling the programmable switch matrix and processing of the service call;

a first communications link between the programmable switch matrix and the service control unit;

a media resource unit for generating and outputting a message to at least one of the plurality of ports;

a second communications link between the media resource unit and the programmable switch matrix for carrying the message to the at least one of the plurality of ports; and a third communications link between the service control unit and the media resource unit for controlling the output of the message from the media resource unit.

6. An apparatus for controlling and processing a service call in a telecommunications system comprising:

a service control unit having one or more application software programs for controlling call processing of the service call;

a programmable switch matrix, the programmable switch matrix comprising:

a plurality of ports, including a first port and a second port, means for generating a service control unit service call request when call control processing of the service call received on the first port is desired to be controlled by the one or more application software programs within the service control unit, the service control unit located external to the programmable switch matrix, means for generating and outputting an event notification message to the service control unit in response to the service call request, the event notification message including call information associated with the service call, means for receiving one or more primitives from the service control unit, and means for connecting the first port to the second port in response to control commands of the one or more received primitives, the service control unit externally controlling the programmable switch matrix and processing of the service call;

a first data link between the programmable switch matrix and the service control unit for carrying the one or more primitives from the service control unit to the programmable switch matrix and for carrying the event notification message from the service control unit to the programmable switch matrix;

a media resource unit for generating and outputting a message to at least one of the plurality of ports;

a second data link between the media resource unit and the programmable switch matrix for carrying the message to the at least one of the plurality of ports; and a third data link between the service control unit and the media resource unit for controlling the output of the message from the media resource unit.

7. An apparatus in accordance with claim 6 wherein the call information of the service call comprises information for selecting a one of the application software programs to control processing of the service call.

8. An apparatus in accordance with claim 6 wherein the means for generating the service call request comprises a trigger database having one or more predetermined triggers.

9. An apparatus in accordance with claim 6 wherein the programmable switch matrix further comprises:

means for generating a service control point service call request when processing of the service call received on the first port is desired to be controlled by a service control point having a first database of information, the service control point located external to the programmable switch matrix and for controlling processing of the service call; and means for generating and outputting a service control point message to the service control point in response to the service call request, the service control point message including call information associated with the service call.

10. An apparatus in accordance with claim 9 wherein the service control point processes the call information and determines that the service call should be controlled by the service control unit, and thereafter sends a first message to the programmable switch matrix, via a fourth data link between the programmable switch matrix and the service control point, to generate the event notification message.

11. A method of controlling and processing a service call in a telecommunications system, comprising the steps of:

receiving a call on a first port of a switch matrix;

determining from call information associated with the received call that processing of the received call should be controlled by a service application program located externally to the switch matrix;

transmitting a new call event notification message to a service control unit notifying the service control unit that the received call should be controlled by the service application program located externally to the switch matrix, the service control unit located externally to the switch matrix and including the service application program;

executing the service application program to control the processing of the received call;

transmitting one or more primitives from the service control unit to the switch matrix; and connecting the first port to a second port of the switch matrix in response to control commands of the one or more primitives.

12. A method in accordance with claim 11 further comprising the steps of:

generating a message and outputting the message to a first output; and connecting the first output to the second port.

13. A method in accordance with claim 11 wherein the step of determining comprises the steps of:

comparing the call information of the received call with call criteria within a trigger database;

suspending in-switch conventional call processing of the received call within the switch matrix; and entering a server mode wherein the switch matrix performs one or more actions for controlling call processing of the received call in response to one or more primitives received from the service control unit.

14. A method of controlling and processing a service call in a telecommunications system, comprising the steps of:

receiving a call on a first port of a switch matrix;

determining from call information associated with the received call that processing of the received call should be controlled by a service application program located external the switch matrix;

transmitting a new call event notification message to a service control unit notifying the service control unit that the received call should be controlled by the service application program located external the switch matrix, the service control unit located externally to the switch matrix and including the service application program;

executing the service application program to control the processing of the received call;

transmitting one or more primitives from the service control unit to the switch matrix;

connecting the first port to a second port of the switch matrix in response to control commands of the one or more primitives; and transmitting, in response to the new event notification message, a new call accepted primitive to the switch matrix, the new call accepted primitive comprising a first set of data defining the first port and a second set of data defining a return address within the service control unit to which one or more subsequent event notification messages will be sent from the switch matrix.

15. A method in accordance with claim 11 wherein the step of connecting the first port to the second port further comprises the steps of:

receiving a connect primitive from the service control unit, the connect primitive comprising, a first set of data defining the first port, and a second set of data defining a destination trunk; and connecting the first port to an idle port of the destination trunk, the idle port defining the second port.

16. A method of controlling and processing a service call in a telecommunications system, comprising the steps of:

receiving a call on a first port of a switch matrix, the received call including call information;

performing in-switch call processing of the received call until a trigger is detected;

triggering when the call information of the received call meets one or more predetermined trigger criteria within a trigger database;

sending a first data message to a service control unit in response to the triggering, the service control unit located external to the switch matrix, the first data message comprising, a first set of data defining a type of the received call, and a second set of data defining an address of the first port;

sending a second data message from the service control unit to the switch matrix notifying the switch matrix that the first data message was received and that processing of the received call will be controlled by the service control unit;

selecting a predetermined service application program to handle control processing of the received call in response to the call type data of the first message;

executing the selected service application program, the selected service application program generating one or more instructions for performing one or more actions within the switch matrix;

sending the one or more instructions to the switch matrix to control processing of the received call; and connecting the first port to a second port of the switch matrix in response to the one or more instructions.

17. A method in accordance with claim 16 wherein the step of triggering comprises the steps of:

comparing the call information of the received call with call criteria within the trigger database;

suspending in-switch processing of the received call within the switch matrix; and entering a server mode wherein the switch matrix performs one or more actions for controlling call processing of the received call in response to one or more instructions received from the service control unit.

18. A method in accordance with claim 17 further comprising the steps of:

generating a message and outputting the message to a first output; and connecting the first output to the second port.

19. A method in accordance with claim 16 further comprising the step of:

sending a second data message from the service control unit to the switch matrix defining a return address within the service control unit to which one or more subsequent data messages will be sent from the switch matrix.

20. A service programming interface protocol for use between a switch matrix and an external service control unit having one or more service application programs for execution for controlling a service call received on one of a plurality of ports of the switch matrix, the interface protocol comprising:

a plurality of primitives for transmission from the service control unit to the switch matrix, the plurality of primitives comprising:
- a bridge primitive for instructing the switch matrix to connect a plurality of predetermined ports to each other within the switch matrix,
- a collect digits and report primitive for instructing the switch matrix to receive a specified number of multifrequency digits at a predetermined port and transmit the received digits to the service control unit,
- a connect primitive for instructing the switch matrix to connect a predetermined first port of the switch matrix to another port of the switch matrix,
- a disconnect primitive for instructing the switch matrix to disconnect a predetermined first port of the switch matrix from another predetermined port of the switch matrix, and
- a new call accepted primitive for instructing the switch matrix that the processing of the service call will be controlled by the service control unit; and a plurality of event notification messages for transmission from the switch matrix to the service control unit, the plurality of event notification messages comprising:
- a digits collected event notification message for informing the service control unit that a specified number of digits have been collected from a predetermined port and the identity of the collected digits,
- an instruction completed event notification message for informing the service control unit that the switch matrix has completed one or more actions in response to one or more primitives previously received from service control unit,
- a new call event notification message for informing the service control unit that a triggering event has occurred for the received call and that the service call is to be controlled by the service control unit,
- an off-hook event notification message for informing the service control unit that a predetermined port is off-hook, and
- an on-hook event notification message for informing the service control unit that a predetermined port is on-hook.

21. The service programming interface protocol in accordance with claim 20 wherein the plurality of primitives further comprises:
- a hold primitive for instructing the switch matrix to put a predetermined port on hold;
- a monitor primitive for instructing the switch matrix to monitor a predetermined port for a predetermined number of digits or tones;
- a mute primitive for instructing the switch matrix to mute or non-mute a voice path between a predetermined port and another predetermined port;
- a play message primitive for instructing the switch matrix to connect a message to a predetermined port;
- a reconnect primitive for instructing the switch matrix to re-establish a connection between a predetermined port and another predetermined port; and
- a stop message primitive for instructing the switch matrix to stop playing a message to a predetermined port.

22. The service programming interface protocol in accordance with claim 21 wherein the plurality of primitives further comprises:
- an error detected primitive for instructing the switch matrix that the service control unit has detected an error with a predetermined port;
- a new call rejected primitive for instructing the switch matrix that the service call identified in the new call event notification message will not be controlled by the service control unit;
- a play prompt, collect digits and report primitive for instructing the switch matrix to play a message to a predetermined port and collect digits on the predetermined port;
- a set billing record primitive for instructing the switch matrix to update billing information for a predetermined port; and
- a transmit siginfo primitive for instructing the switch matrix to transmit signaling information on a predetermined port.

23. The service programming interface protocol in accordance with claim 20 wherein the plurality of event notification messages further comprises:
- an error detected event notification message for informing the service control unit that the switch matrix has detected an error on a predetermined port;
- a message played event notification message for informing the service control unit that a message played to a predetermined port has ended;
- a route not available event notification message for informing the service control unit that no ports of a predetermined trunk are idle;
- a route selected event notification message for informing the service control unit that a port of a predetermined trunk has been found idle and seized;
- a tone detected event notification message for informing that service control unit when a predetermined digit or tone is detected on a predetermined port; and
- a signaling event event notification message for informing the service control unit that a predetermined port has received a signaling message and further identifying the signaling message.

24. A method of communicating, via a communications link, between a switch matrix and an external service control unit having one or more service application programs for controlling a service call received on one of a plurality of ports of the switch matrix, comprising the steps of:

instructing, by transmitting a bridge primitive from the service control unit to the switch matrix, the switch matrix to connect a plurality of predetermined ports to each other within the switch matrix;

instructing, by transmitting a collect digits and report primitive from the service control unit to the switch matrix, the switch matrix to receive a specified number of multifrequency digits at a predetermined port and transmit the received digits to the service control unit;

instructing, by transmitting a connect primitive from the service control unit to the switch matrix, the switch matrix to connect a predetermined first port of the switch matrix to another port of the switch matrix;

instructing, by transmitting a disconnect primitive from the service control unit to the switch matrix, the switch matrix to disconnect a predetermined first port of the switch matrix from another predetermined port of the switch matrix;

instructing, by transmitting a new call accepted primitive from the service control unit to the switch matrix, the switch matrix that the processing of the service call will be controlled by the service control unit;

informing, by transmitting a digits collected event notification message from the switch matrix to the service control unit, the service control unit that a specified number of digits have been collected from a predetermined port and the identity of the collected digits;

informing, by transmitting an instruction completed event notification message from the switch matrix to the service control unit, the service control unit that the switch matrix has completed one or more actions in response to one or more primitives previously received from service control unit;

informing, by transmitting a new call event notification message from the switch matrix to the service control unit, the service control unit that a triggering event has occurred for the received call and that the service call is to be controlled by the service control unit;

informing, by transmitting an off-hook event notification message from the switch matrix to the service control unit, the service control unit that a predetermined port is off-hook; and informing, by transmitting an on-hook event notification message from the switch matrix to the service control unit, the service control unit that a predetermined port is on-hook.

25. The method in accordance with claim 24 further comprising the steps of:

instructing, by transmitting a hold primitive from the service control unit to the switch matrix, the switch matrix to put a predetermined port on hold;

instructing, by transmitting a monitor primitive from the service control unit to the switch matrix, the switch matrix to monitor a predetermined port for a predetermined number of digits or tones;

instructing, by transmitting a mute primitive from the service control unit to the switch matrix, the switch matrix to mute or non-mute a voice path between a predetermined port and another predetermined port;

instructing, by transmitting a play message primitive from the service control unit to the switch matrix, the switch matrix to connect a message to a predetermined port;

instructing, by transmitting a reconnect primitive from the service control unit to the switch matrix, the switch matrix to re-establish a connection between a predetermined port and another predetermined port; and instructing, by transmitting a stop message primitive from the service control unit to the switch matrix, the switch matrix to stop playing a message to a predetermined port.

26. The method in accordance with claim 24 further comprising the steps of:

instructing, by transmitting an error detected primitive from the service control unit to the switch matrix, the switch matrix that the service control unit has detected an error with a predetermined port;

instructing, by transmitting a new call rejected primitive from the service control unit to the switch matrix, the switch matrix that the service call identified in the new call event notification message will not be controlled by the service control unit;

instructing, by transmitting a play prompt, collect digits and report primitive from the service control unit to the switch matrix, the switch matrix to play a message to a predetermined port and collect digits on the predetermined port;

instructing, by transmitting a set billing record primitive from the service control unit to the switch matrix, the switch matrix to update billing information for a predetermined port; and instructing, by transmitting a transmit siginfo primitive from the service control unit to the switch matrix, the switch matrix to transmit signaling information on a predetermined port.

27. The method in accordance with claim 24 further comprising the steps of:

informing, by transmitting an error detected event notification message from the switch matrix to the service control unit, the service control unit that the switch matrix has detected an error on a predetermined port;

informing, by transmitting a message played event notification message from the switch matrix to the service control unit, the service control unit that a message played to a predetermined port has ended;

informing, by transmitting a route not available event notification message from the switch matrix to the service control unit, the service control unit that no ports of a predetermined trunk are idle;

informing, by transmitting a route selected event notification message from the switch matrix to the service control unit, the service control unit that a port of a predetermined trunk has ben found idle and seized;

informing, by transmitting a tone detected event notification message from the switch matrix to the service control unit, the service control unit when a predetermined digit or tone is detected on a predetermined port; and informing, by transmitting a signaling event event notification message from the switch matrix to the service control unit, the service control unit that a predetermined port has received a signaling message and further identifying the signaling message.

* * * * *

UNITED STATES PATENT AND TRADEMARK OFFICE
CERTIFICATE OF CORRECTION

PATENT NO. : 5,991,389
DATED : November 23, 1999
INVENTOR(S) : Ram et al.

It is certified that error appears in the above-indentified patent and that said Letters Patent is hereby corrected as shown below:

Column 1, line 18    Delete "may"
                            Insert --May--

Column 7, line 54    Delete "79"

Column 40, line 14    Delete "RBS"
                            Insert --RES--

Column 40, line 32    Delete ","
                            Insert --.--

Column 49, line 36    Delete "claim 3"
                            Insert --claim 2--

Column 49, line 42    Delete "claim 4"
                            Insert --claim 3--

Signed and Sealed this

Fourth Day of July, 2000

*Attest:*

Q. TODD DICKINSON

*Attesting Officer*            *Director of Patents and Trademarks*